US012595088B2

(12) United States Patent
Owens et al.

(10) Patent No.: US 12,595,088 B2
(45) Date of Patent: Apr. 7, 2026

(54) COTTON MODULE UNWRAPPING SYSTEMS, METHODS, AND APPARATUSES

(71) Applicant: Cherokee Fabrication Company, Inc., Salem, AL (US)

(72) Inventors: Roy Owens, Valley, AL (US); Ira Burge, Brandon, MS (US)

(73) Assignee: Cherokee Fabrication Company, Inc., Salem, AL (US)

( * ) Notice: Subject to any disclaimer, the term of this patent is extended or adjusted under 35 U.S.C. 154(b) by 0 days.

(21) Appl. No.: 19/027,743

(22) Filed: Jan. 17, 2025

(65) Prior Publication Data

US 2025/0236428 A1      Jul. 24, 2025

Related U.S. Application Data

(60) Provisional application No. 63/623,025, filed on Jan. 19, 2024.

(51) Int. Cl.
*B65B 69/00*        (2006.01)
*B65G 47/90*        (2006.01)

(52) U.S. Cl.
CPC .......... *B65B 69/0025* (2013.01); *B65G 47/90* (2013.01)

(58) Field of Classification Search
CPC ........................... B65G 47/90; B65B 69/0025
See application file for complete search history.

(56) References Cited

U.S. PATENT DOCUMENTS

| | | | | |
|---|---|---|---|---|
| 1,449,027 | A | * | 3/1923 | Allen ................. B65G 47/8823 |
| | | | | 198/408 |
| 2,939,569 | A | * | 6/1960 | Roach .................... G01G 11/00 |
| | | | | 177/145 |
| 3,286,854 | A | | 11/1966 | Crawford |
| 3,322,256 | A | * | 5/1967 | Roach .................... B65G 47/24 |
| | | | | 198/414 |
| 3,344,902 | A | * | 10/1967 | Crawford ............... B65G 47/52 |
| | | | | 198/607 |
| 3,612,309 | A | | 10/1971 | Van Doorn et al. |
| 3,923,176 | A | | 12/1975 | Wynn et al. |
| 4,050,598 | A | | 9/1977 | Schurz |
| 4,103,794 | A | | 8/1978 | Shaw |

(Continued)

OTHER PUBLICATIONS

Cherokee Fabrication Youtube Screenshots URL: youtube.com/watch?v=YtM3wBELHr (Year: 2012).*

(Continued)

*Primary Examiner* — Thomas M Wittenschlaeger
(74) *Attorney, Agent, or Firm* — Miller & Martin PLLC

(57) ABSTRACT

Cotton module unwrapping systems, apparatuses, and methods for using the same are disclosed. In using the apparatus disclosed herein, a plurality of cotton modules are conveyed from a first location, such as a truck bed, onto a conveyor in such a way as to reorient the cotton modules from a horizontal to a vertical position. When the cotton modules are ready to be unwrapped, they are moved into a centrally located position within an unwrapper module and the wrap material is removed. Next, the newly unwrapped cotton module is moved forward and fed into the ginning process. The wrap removed from the cotton module is then removed from the proximity of the disclosed apparatus using an automated or semi-automated process involving a wrap disposal arm and optional wrap winding unit.

20 Claims, 63 Drawing Sheets

(56)                References Cited

U.S. PATENT DOCUMENTS

| | | | | |
|---|---|---|---|---|
| 4,179,017 | A | 12/1979 | Tilley | |
| 4,592,698 | A * | 6/1986 | Semp | A24B 3/00 |
| | | | | 414/412 |
| 5,318,399 | A * | 6/1994 | Marom | B65B 69/0025 |
| | | | | 414/412 |
| 5,371,938 | A * | 12/1994 | Martin | B65B 69/0033 |
| | | | | 414/412 |
| 5,540,534 | A | 7/1996 | Wolf et al. | |
| 6,811,367 | B2 | 11/2004 | Ellis | |
| 8,596,944 | B2 * | 12/2013 | England | B65G 47/252 |
| | | | | 414/770 |
| 9,550,597 | B2 * | 1/2017 | McLellan | B23P 19/04 |
| 9,663,262 | B2 * | 5/2017 | Ballentine | B65B 69/0008 |
| 10,647,463 | B2 * | 5/2020 | Steenhoek | A01D 87/127 |
| RE50,454 | E * | 6/2025 | Callahan | B65B 69/0025 |
| 2004/0005208 | A1 | 1/2004 | Ellis | |

| | | | | |
|---|---|---|---|---|
| 2008/0159830 | A1 * | 7/2008 | Haugstad | B65B 69/0033 |
| | | | | 414/412 |
| 2009/0202327 | A1 * | 8/2009 | Cory | B65B 69/0033 |
| | | | | 414/412 |
| 2010/0024617 | A1 * | 2/2010 | Stover | D01B 1/04 |
| | | | | 83/107 |
| 2012/0219392 | A1 * | 8/2012 | Leven | D01G 7/10 |
| | | | | 414/810 |
| 2013/0149082 | A1 * | 6/2013 | Sheedy | A01F 29/005 |
| | | | | 414/412 |
| 2016/0362214 | A1 * | 12/2016 | Steenhoek | A01D 87/127 |

OTHER PUBLICATIONS

Cherokee Fabrication Company, Inc., Round up II, URL: https://cherokeefab.com/round-up-ii/, Jan. 16, 2025.

* cited by examiner

110

COTTON MODULE UNWRAPPING SYSTEMS, METHODS, AND APPARATUSES

CROSS-REFERENCE TO RELATED APPLICATION

The present application claims the benefit of priority under 35 U.S.C. § 119(e) to U.S. Provisional Application No. 63/623,025, entitled "Cotton Module Unwrapper Apparatus and Method" filed Jan. 19, 2024, which is hereby incorporated by reference in its entirety as if fully set forth herein.

TECHNICAL FIELD

The systems, methods, and apparatuses of the present disclosure generally relate to cotton ginning and, more particularly, relate to novel systems, methods, and apparatuses for automatically re-orienting and unwrapping cotton modules traveling along a conveyor towards downstream ginning processes.

BACKGROUND

While the systems, methods, and apparatuses of the present invention can be employed with equal utility for unwrapping a wide variety of wrapped objects having different sizes and shapes not easily unwrapped using conventional unpackaging equipment, it will mainly be described in conjunction with an exemplary preferred application, which is the handling and unwrapping of cotton modules.

Prior to entering a cotton gin and undergoing the ginning process, raw cotton is picked on a farm and transported from the field to the cotton gin. Conventionally, cotton picking machines are run through the fields of fully mature cotton plants to machine harvest the fibrous raw cotton material from the stalks of the cotton plants. Oftentimes, modern cotton harvesters have on-board raw-cotton processing machines, referred to as module builders. Once picked, the raw cotton may be fed to the module builder, which then compacts and wraps the raw cotton to create compact, wrapped modules of cotton. These wrapped modules are typically shaped either cylindrically or similar to a giant loaf of bread and tightly bound in some form wrapping (e.g., plastic wrapping) to aid their transportation from the field to the cotton gin for processing and to minimize the loss of raw cotton along the way.

Upon their arrival at the cotton gin, typically on the back of a specialized module truck, every cotton module must first be unloaded and unwrapped before entering the cotton ginning machinery. Cotton-module handling systems should be capable of efficiently unloading and unwrapping the cotton modules prior to their entry into the ginning machinery. Existing methods for unloading and unwrapping cotton modules typically involve some human intervention to either manually cut or slit the wrap, in whole or in part, to release the raw cotton contained therein onto a module feeder responsible for feeding the gin, and/or to manually remove the wrap from the conveyor and dispose of it.

If the technique is imprecise, cutting or slitting the wrap oftentimes has the potential to cause plastic contamination of the cotton, which in turn may cause plastic contamination of the entire ginning system. Where any amount of plastic-wrap material remains in the raw cotton fed to the gin, such contaminated cotton is detrimental because it can pollute the inner workings of the gin and the final processed cotton that exits the gin. Cotton thread made with contamination of any kind has a high potential for being rejected by the purchaser, which could cause lost profits, and being therefore thrown out, which would cause material waste. Potentially expensive losses to the cotton growers and ginners are undesirable and should be avoided where possible.

Conventional methods are also significantly labor-intensive, requiring multiple laborers to either manually maneuver the round cotton modules and cut their wraps or operate the machinery responsible for doing the same. Additionally, after the wraps are removed, laborers are required to manually collect and dispose of the wraps. For instance, Applicant's prior product, the Roundup II, required a laborer to operate machinery to reposition cotton modules from a horizontal to a vertical orientation and then manually remove the wrap from the machinery after the wrap was removed from the cotton modules. Having multiple laborers involved in this process increases the associated labor costs, the potential for contamination of the raw cotton, and the potential for workplace injuries.

The presently disclosed embodiments of the present invention are directed to these and other considerations.

SUMMARY OF THE INVENTION

The disclosed embodiments of the present invention provide improved systems, methods, and apparatuses for unwrapping wrapped items, such as cotton modules, while minimizing the risks associated with wrap contamination, increasing operator safety, decreasing the number of operators by semi-automating or automating the unwrapping process, and increasing ease of operation of the item-unwrapping systems, methods, and apparatuses. While the disclosed embodiments may refer to unwrapping cotton modules, it is understood that they may be employed with respect to other types of wrapped items having different sizes and shapes that may not be easily unwrapped using conventional unpackaging equipment. As used in the disclosed exemplary embodiments, a cotton module can more generally refer to compact and wrapped modules of any wrapped materials having any shapes and sizes. Additionally, in some exemplary embodiments, the cotton modules may comprise round cotton modules being wrapped in modules having substantially round or cylindrical shapes. Many possible wrapping materials may be used in the disclosed embodiments, including but not limited to woven and/or non-woven plastics or fabric materials.

In one exemplary embodiment, a module unwrapping system, method, or apparatus may comprise one or more of a module reorientation unit and a module unwrapping unit positioned along one or more conveyors leading to one or more cotton ginning processes. In an exemplary embodiment, the module reorientation unit may comprise a first conveyor (which may be referred to also as an "unloading conveyor"), such as on or coupled to a module truck or other vehicle used to transport the cotton modules, and a second conveyor (which may be referred to also as an "intermediate conveyor" or an "unload bed conveyor") comprising a plurality of unload-bed sensors. For instance, in some embodiments, wrapped cotton modules may be transported in a horizontal orientation (e.g., sideways or laying on their side) by a truck or other vehicle to the cotton gin. When the truck or vehicle reaches the cotton gin, the modules can be unloaded using the first conveyor, which may comprise a roller conveyor, a conveyor belt, or other conveying system, for example located on, or coupled to, the truck or vehicle. The first conveyor may be positioned at a height above the unload bed conveyor such that, when the modules are bUS 12,595,088 B2

3 conveyed from the first conveyor onto the unload bed conveyor, they are dropped or tipped such that gravity causes them to reposition from a horizontal orientation to a vertical orientation (e.g., upright) on the unload bed conveyor.

Because precise positioning of the modules on the unload bed conveyor may be desirable for downstream processing in some disclosed embodiments, reorientation of the cotton modules can be further facilitated by the plurality of unload-bed sensors, (e.g., one or more photo-eye sensors, vision sensors, proximity sensors, other known sensors, or combinations thereof). For instance, the plurality of unload-bed sensors can be used to sense the presence of one or more modules along the unload-bed conveyor and inform control machinery to start and stop the unload-bed conveyor to facilitate the reorientation of sequential cotton modules and to control the advance of the reoriented cotton modules on the unload-bed conveyor to downstream processes, such as the module unwrapping unit.

In some exemplary embodiments, the module-unwrapping system may further comprise an intermediate bed conveyor comprising an intermediate bed sensor and a pair of centering walls located downstream from the module reorientation unit. The intermediate bed conveyor may be the same conveyor as the unload bed conveyor or another conveyor system positioned downstream from the unload bed conveyor. Intermediate bed conveyor may comprise a roller conveyor, a conveyor belt, or other conveyor system and may be configured to transport one or more cotton modules from the unload belt conveyor to the module unwrapping unit. For instance, after the wrapped modules are unloaded from the truck or other vehicle and reoriented from a horizontal to a vertical position, they may be conveyed along an intermediate bed conveyor and through the pair of centering walls. In such exemplary embodiments, the pair of centering walls and intermediate bed sensors may cooperate to ensure that the module is centered on the intermediate bed conveyor before entering the module unwrapping unit.

Further to the disclosed embodiments, the module unwrapping system may further comprise a module unwrapping unit for unwrapping or removing wraps (e.g., plastic wraps) used to contain the modules during transport. In some embodiments, the module unwrapping unit may further comprise one or more of an unwrapping bed conveyor (which may be the same as intermediate conveyor or a separate conveying system) comprising unwrapping bed sensors and a module-lift apparatus configured to lift the module off the unwrapping bed conveyor and remove the wrap from the module. In an exemplary embodiment, the module-lift apparatus comprises one or more main support columns, one or more carriages connected to the main support columns, an unwrapper frame coupled to the one or more carriages, one or more wrap gripping elements (e.g., one or more clamp pad assemblies) coupled to the unwrapper frame and configured to engage with and removably grip the wrap of a module, and a drive motor connected to a drive shaft and operably connected to a plurality of ball screw jacks to enable control of the movement of the one or more carriages and unwrapper frame in a vertical direction along the main support columns. In some embodiments, the one or more wrap-gripping elements may further comprise a plurality of retractable spikes for engaging the wrap of the module to be unwrapped. including a plurality of retractable spikes for engaging with and removably gripping the wrap of the module to be unwrapped.

In an exemplary embodiment, after a wrapped module has been positioned within the module-unwrapping unit, the unwrapper frame can be moved in a downward vertical direction along the one or more support columns such that it surrounds the module. The one or more wrap gripping elements can engage with the wrap (e.g., via one or more retractable spikes). The unwrapper frame can then be moved in an upward vertical direction and pull the wrap off the module allowing the cotton to fall down onto the conveyor and the wrap to be pulled upward for removal and disposal.

In some exemplary embodiments, to remove the wrap from the module-unwrapping unit, the module-unwrapping unit can further comprise a wrap-disposal arm with at least one wrap-removal grip configured for automated disposal of the wrap. Some embodiments of an exemplary wrap-disposal arm may comprise a rotating column which rotates and moves the arm towards the unwrapper frame where the at least one wrap-removal grip engages with the wrap. The rotating column then may rotate and/or move the arm away from the unwrapper frame, removing the wrap from the unwrapper frame. Thereafter, in such exemplary embodiments, the wrap-removal grip may disengage with the wrap, releasing and disposing of the wrap into a disposal vessel or onto the floor for manual disposal.

Other disclosed embodiments of the wrap-disposal arm may be part of a wrap-disposal unit positioned proximate to the module unwrapping unit. In an exemplary embodiment, the wrap disposal unit may comprise a trolley affixed to the wrap-disposal arm. The trolley may be configured to extend and retract the wrap-disposal arm toward and away from the module wrapping unit by moving in a horizontal direction towards and away from the module unwrapping unit. For instance, the trolley may be movable in a horizontal direction along a track to cause the wrap disposal arm to extend to retrieve the wrap from the module unwrapping unit using wrap-removal grip and then may move along the track in an opposite direction to retract and pull the wrap back into the wrap-disposal unit.

In some exemplary embodiments, the wrap-disposal unit may further comprise a winder carriage comprising a winder paddle and tramper configured to engage with the removed wrap and then rotate the wrap to create a bundle of wrap for disposal. For instance, after a wrap is retrieved from the module unwrapping unit using the wrap-disposal arm, the winder carriage can be moved to position the paddle in line with the wrap, and the paddle can be rotated to bundle the wrap. After the wrap is bundled, the tramper can be used to remove the wrap, such as by pushing the wrap down a removal chute to make room for the next operation. In some embodiments, the wrap-disposal unit can be controlled by an operator executing one or more controls operatively coupled to the various components of the wrap winding assembly.

In some embodiments, the module unwrapping system may further comprise an operator platform including operator controls.

One exemplary advantage of the disclosed embodiments provides systems, methods, and apparatuses for unloading and unwrapping cotton modules that more effectively removes and disposes of wrap from a module and therefore reduces a potential source of contamination to the cotton or other material contained therein. Another exemplary advantage of the disclosed embodiments provides systems, methods, and apparatuses for unloading and unwrapping round cotton modules in a manner that is fully or almost-fully automated and includes minimal human interaction. In some embodiments, for added safety, all personnel may be removed from near the operation of the systems, methods, and apparatuses while they are in operation.

These and other advantages of the disclosed embodiments will be apparent to those skilled in the art in light of the description above and the following detailed description and drawings directed to illustrative embodiments of the present disclosure.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF DISCLOSED EMBODIMENTS

Reference will now be made in detail to various disclosed embodiments, including the examples illustrated in the accompany drawings. Wherever possible, the same reference numbers will be used throughout the drawings to refer to the same or like parts.

In utilizing the systems and methods of the disclosed embodiments, a plurality of cotton modules (e.g., round cotton modules) are conveyed from a first location, such as a truck bed, onto a conveyor (e.g., a roller conveyor) in such a way as to reorient the cotton modules from a horizontal to a vertical position. After they are in a vertical orientation on the conveyor, the cotton modules are moved to a next position along the conveyor just prior to the unwrapping process, where they can be centered in order to prepare for unwrapping. When the cotton module is ready to be unwrapped, the cotton module is moved into a position in the module unwrapping unit and the wrap material is removed from the module. In some embodiments, the wrap material (e.g., "wrap") may comprise one or more woven or non-woven plastic materials, although those skilled in the art will appreciate that any suitable wrap material may be used consistent with the disclosed embodiments including woven non-plastic materials. After the wrap is removed from the cotton module, the newly unwrapped cotton module is moved forward to be fed into the ginning process. The wrap that was removed from the cotton module is then removed entirely from the conveying/unwrapping/feeding operation using a wrap disposal arm, and in some embodiments, a wrap winding assembly.

Figure 1A:
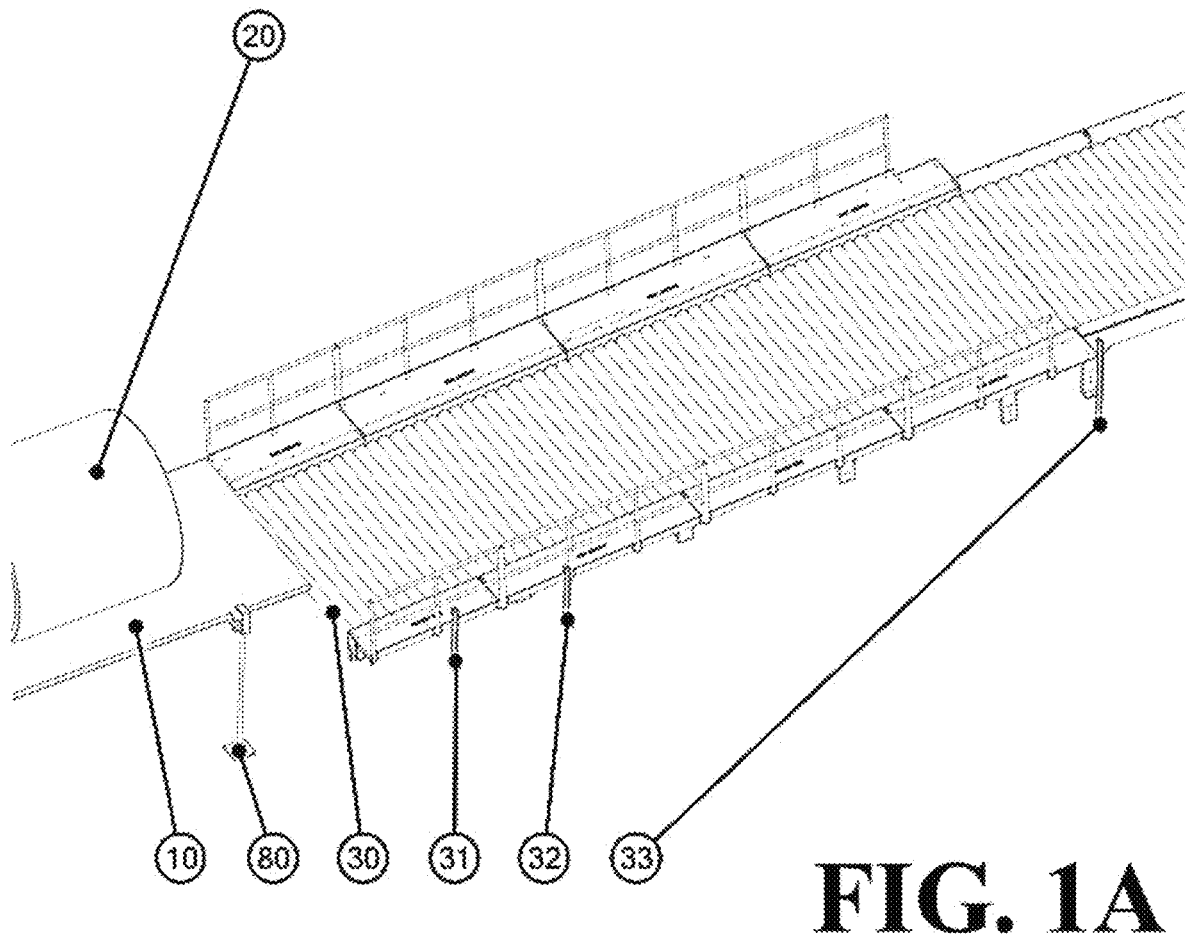
FIGS. 1A-1P are a sequence of exemplary plan and elevation views depicting a cotton module unloading and reorientation sequence, in accordance with certain exemplary embodiments of the present disclosure.

FIG. 1A shows a plan view of a first step in an exemplary cotton module unloading sequence consistent with certain disclosed embodiments. In FIG. 1A, a cotton module enveloped with a wrap (20) is conveyed from a conveyor or truck bed (10) to an unload bed conveyor (30). In an exemplary embodiment, the top surface of conveyor or truck bed (10) is located at a height that is above that of the top surface of the unload bed conveyor (30). In such embodiments, the height difference must be such that a wrapped cotton module (20) being conveyed along the conveyor or truck bed (10) towards the unload bed conveyor (30) in the horizontal orientation is tipped upright to the vertical orientation when crossing from the conveyor or truck bed (10) to the unload bed conveyor (30) as a result of gravity acting on the cotton module (20). In some embodiments where the conveyor or truck bed (10) is manually started or stopped by an operator, the conveyor or truck bed (10) may further comprise a signal light (80) or other audible and/or visual indicator capable of signaling the operator to start or stop conveyor (10).

In the exemplary embodiment depicted in FIG. 1A, the unload bed conveyor (30) may further comprise a first sensor (31), a second sensor (32), and a third sensor (33). While in an exemplary embodiment, these sensors comprise photo-eye sensors, although they may also comprise vision sensors, proximity sensors, other known sensors, or combinations thereof, in other embodiments of the present disclosure. In the exemplary embodiment of FIG. 1A, these three sensors determine the location of cotton modules (20) along the unload bed conveyor (30). First sensor (31) determines if there is an upright cotton module (20) that has just been unloaded from the truck bed (10) onto the unloading bed conveyor (30). After the first sensor (31) senses that there is a cotton module (20) at the beginning of the unload bed conveyor (30), the unload bed conveyor (30) is automatically activated and moves the unloaded module (20) to the second sensor (32) and then automatically stops after it is sensed by the second sensor (32). From here, another cotton module (20) can be moved from the truck bed or conveyor (10) onto the unload bed conveyor (30). This operation will continue, with the various sensors (coupled to a controller not shown) automatically starting and stopping the unload bed conveyor (30), and the signal light (80) automatically giving visual signals if required to the truck bed (10) operator preferably via a green light (e.g., when the unload bed conveyor is moving) and a red light (e.g., when the unload bed conveyor is not moving). In this exemplary embodiment, when a cotton module (20) is sensed by the third sensor (33), the initial phase of the unwrapping process stops until the cotton module (20) is ready to proceed to the next phase of processing.

Figure 1B:
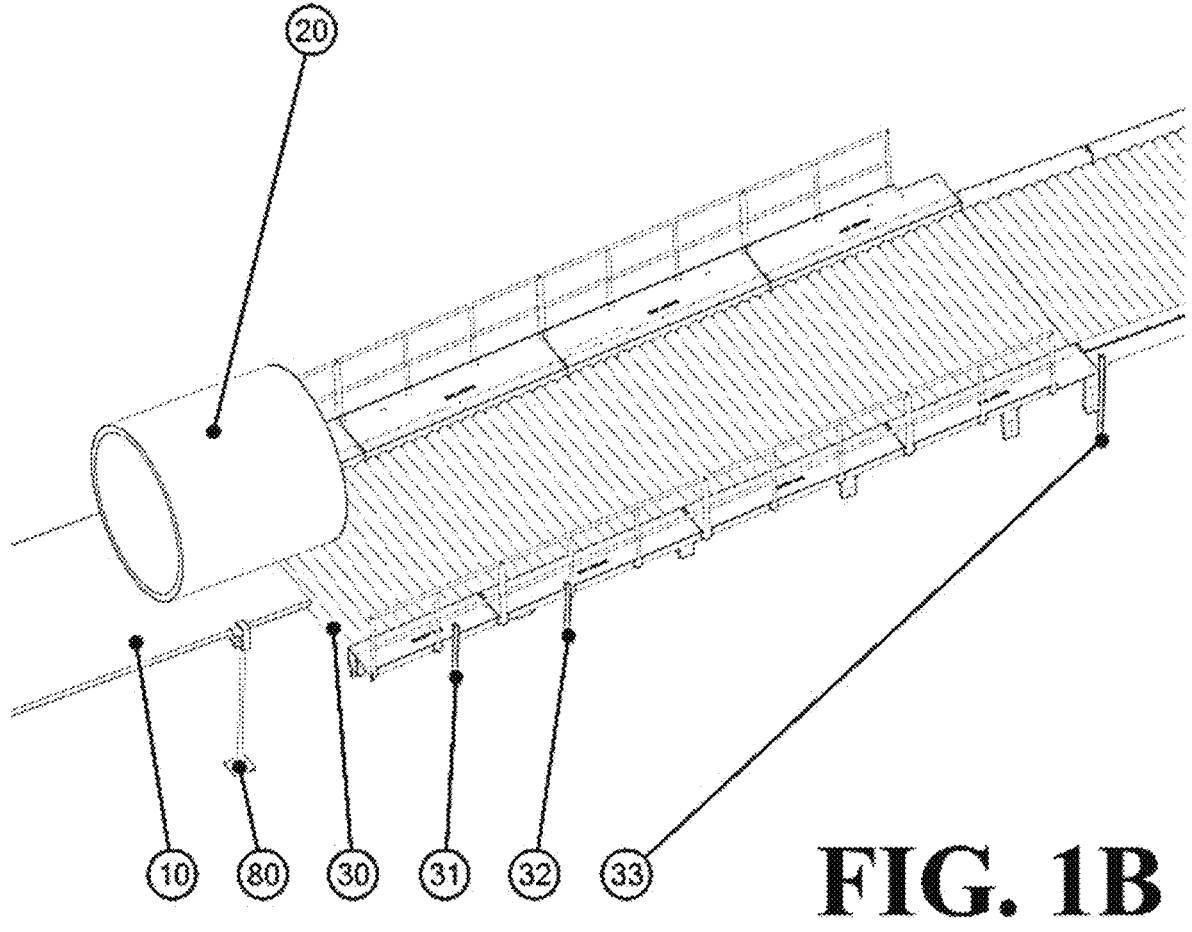
Figure 1C:
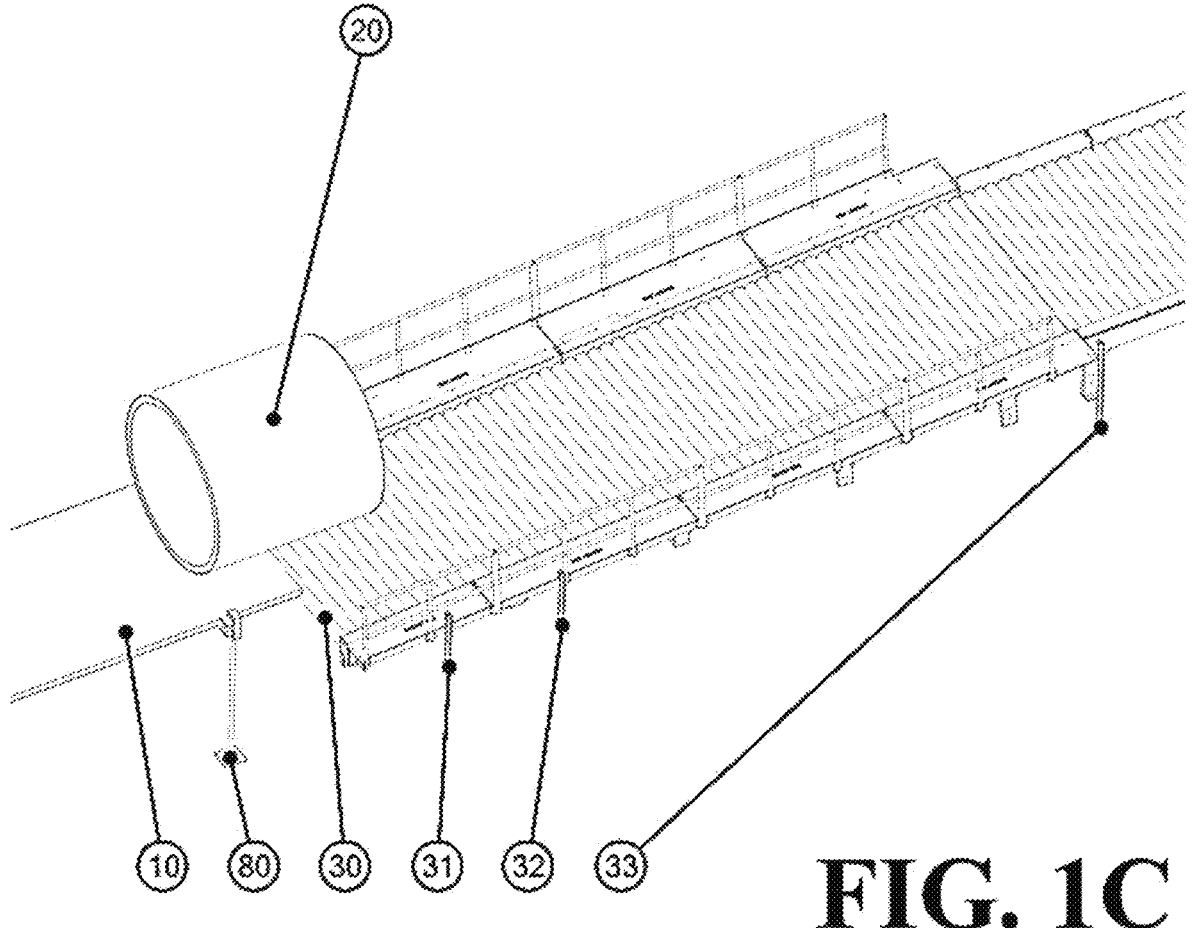
Figure 1D:
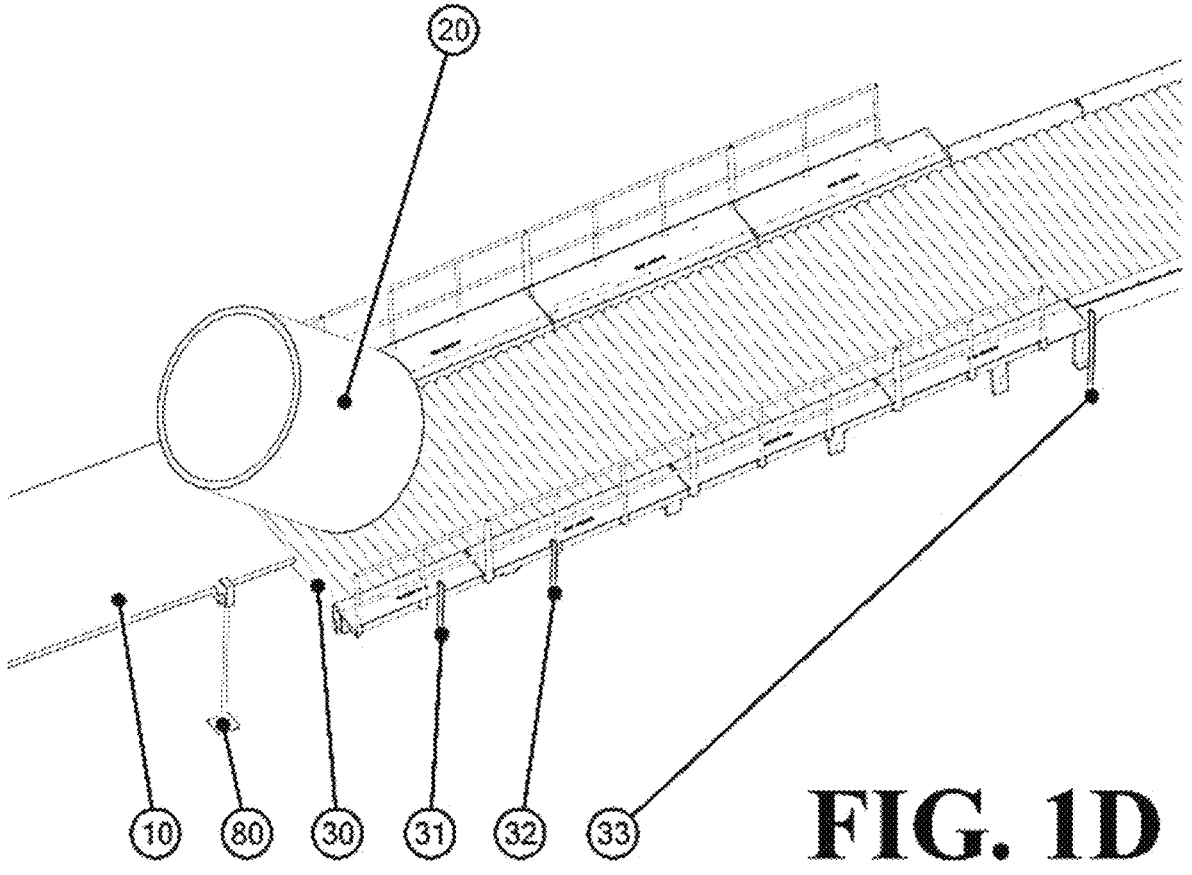

FIG. 1B shows a cotton module (20) moving to an end portion of a conveyor (10), but not yet to the end of the conveyor (10). In this figure, the unload bed conveyor (30) is stopped. In this moment, nothing is being sensed by any of the first, second, or third sensors (31, 32, 33) on the unload bed conveyor (30). In an embodiment where the conveyor (10) is operated manually, then a start signal, such as a green light, may be displayed on the signal light (80). FIG. 1C depicts cotton module (20) at the tipping point of the conveyor (10), partially hanging off of the end of the conveyor (10). FIG. 1D shows cotton module (20) being tipped from the horizontal orientation on the conveyor (10) to a vertical orientation on the unload bed conveyor (30), e.g., due to gravity and the height difference between the conveyors (10) and (30).

Figure 1E:
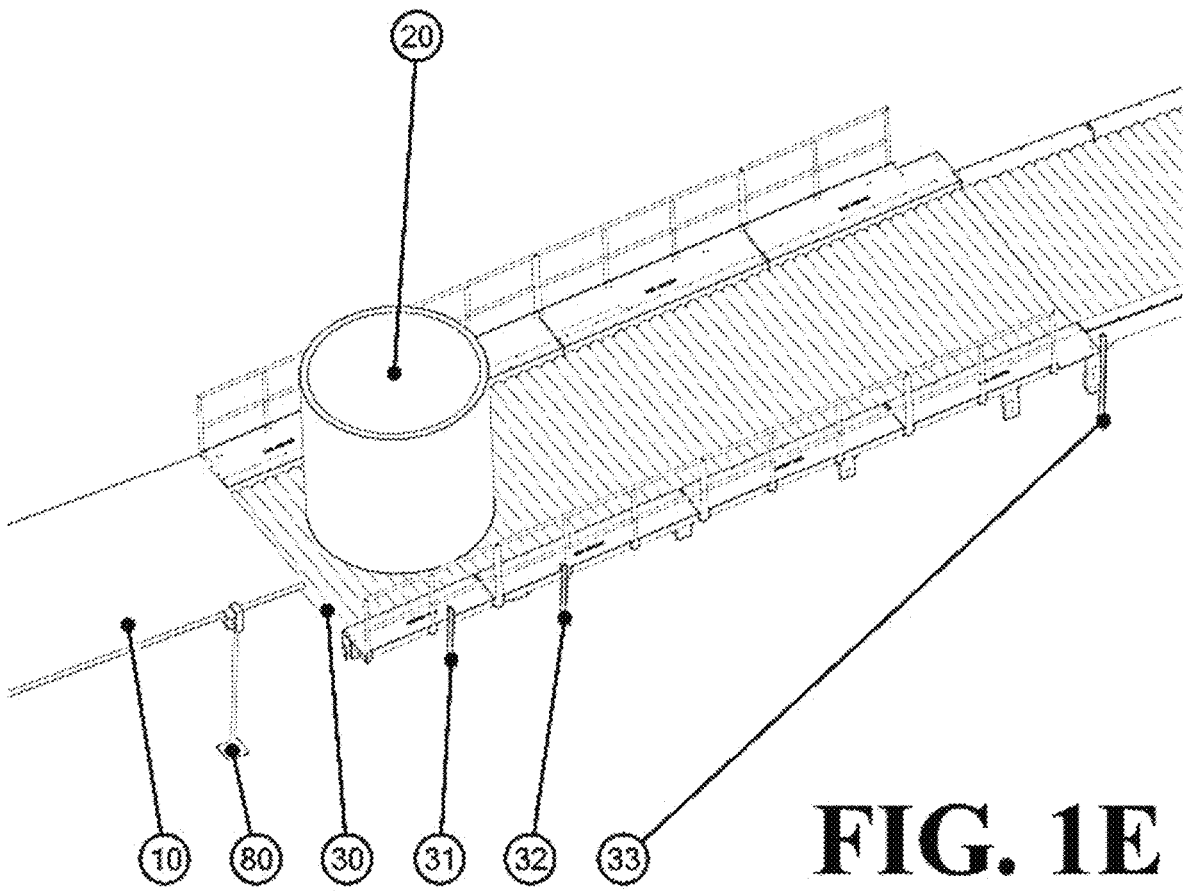
Figure 1F:
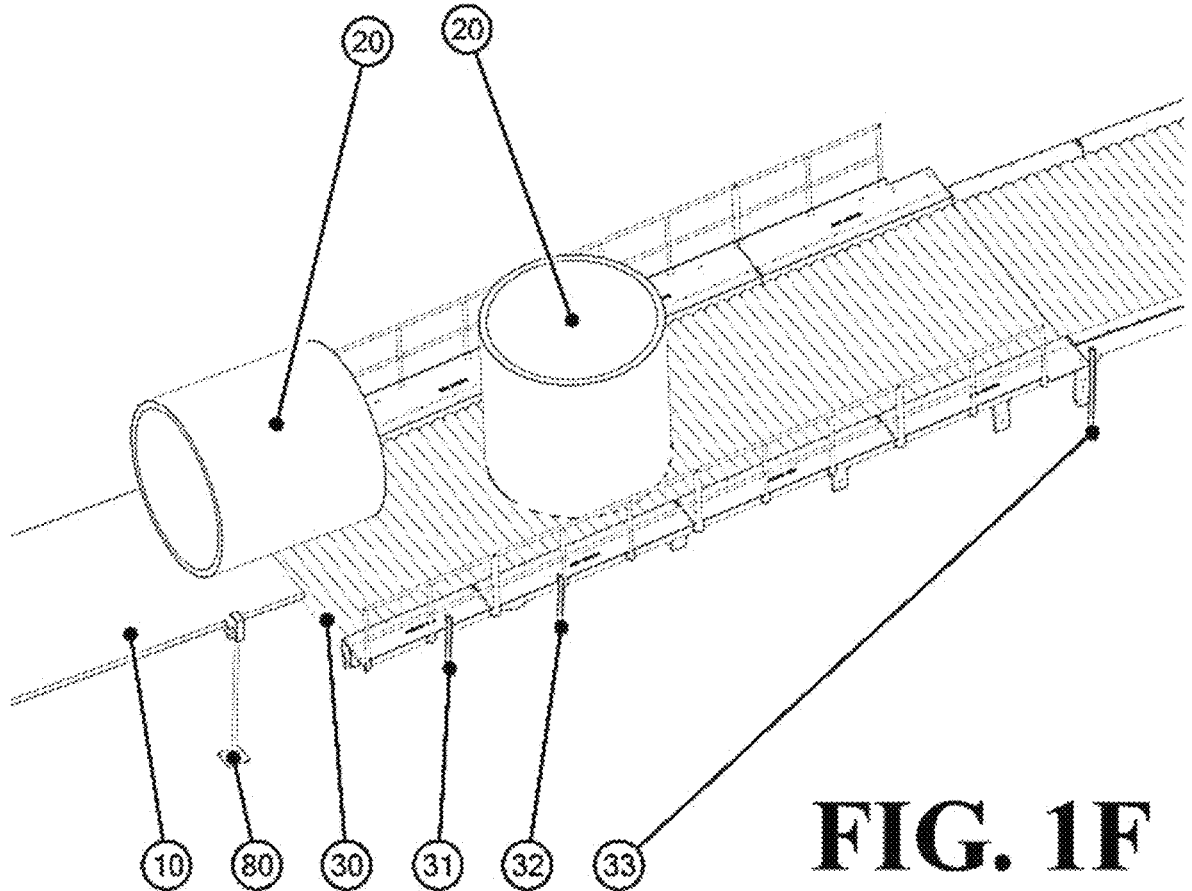
Figure 1G:
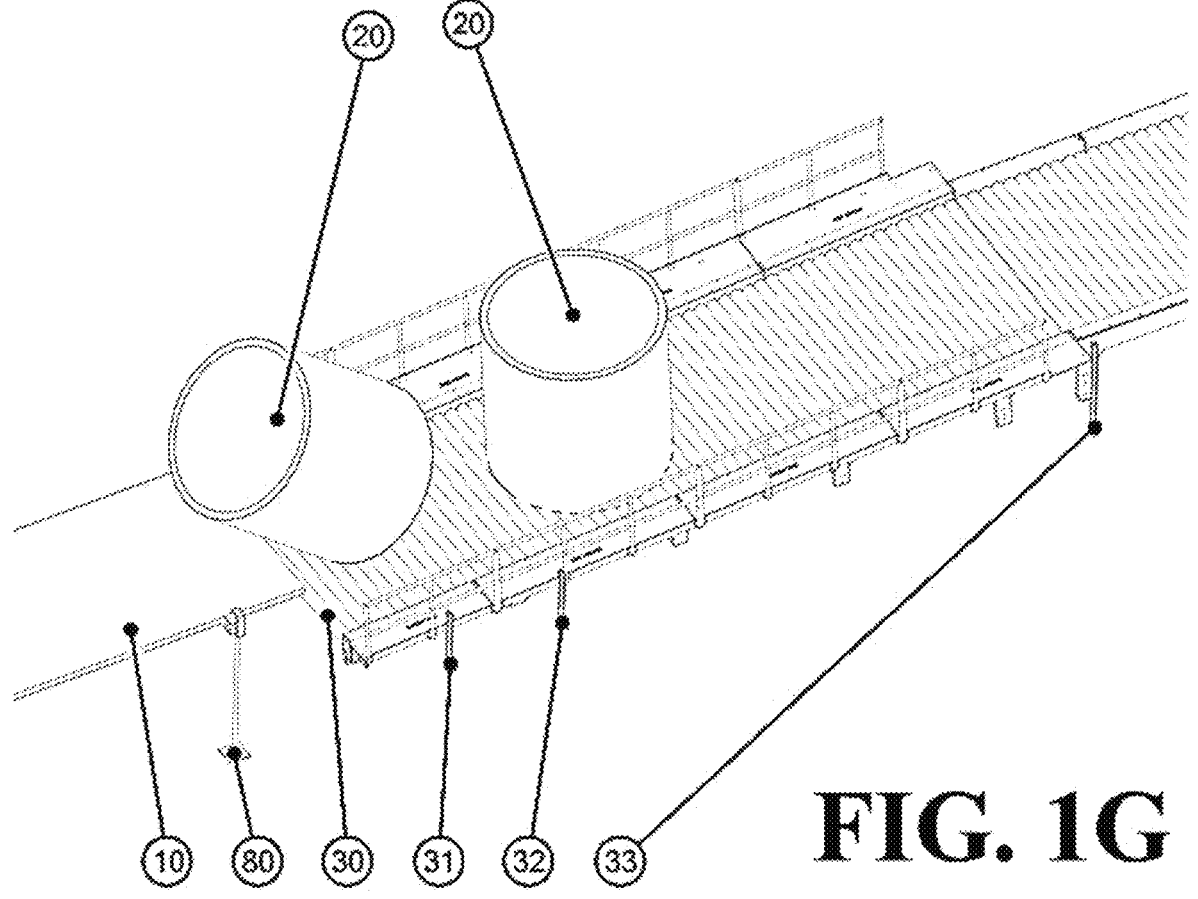
Figure 1H:
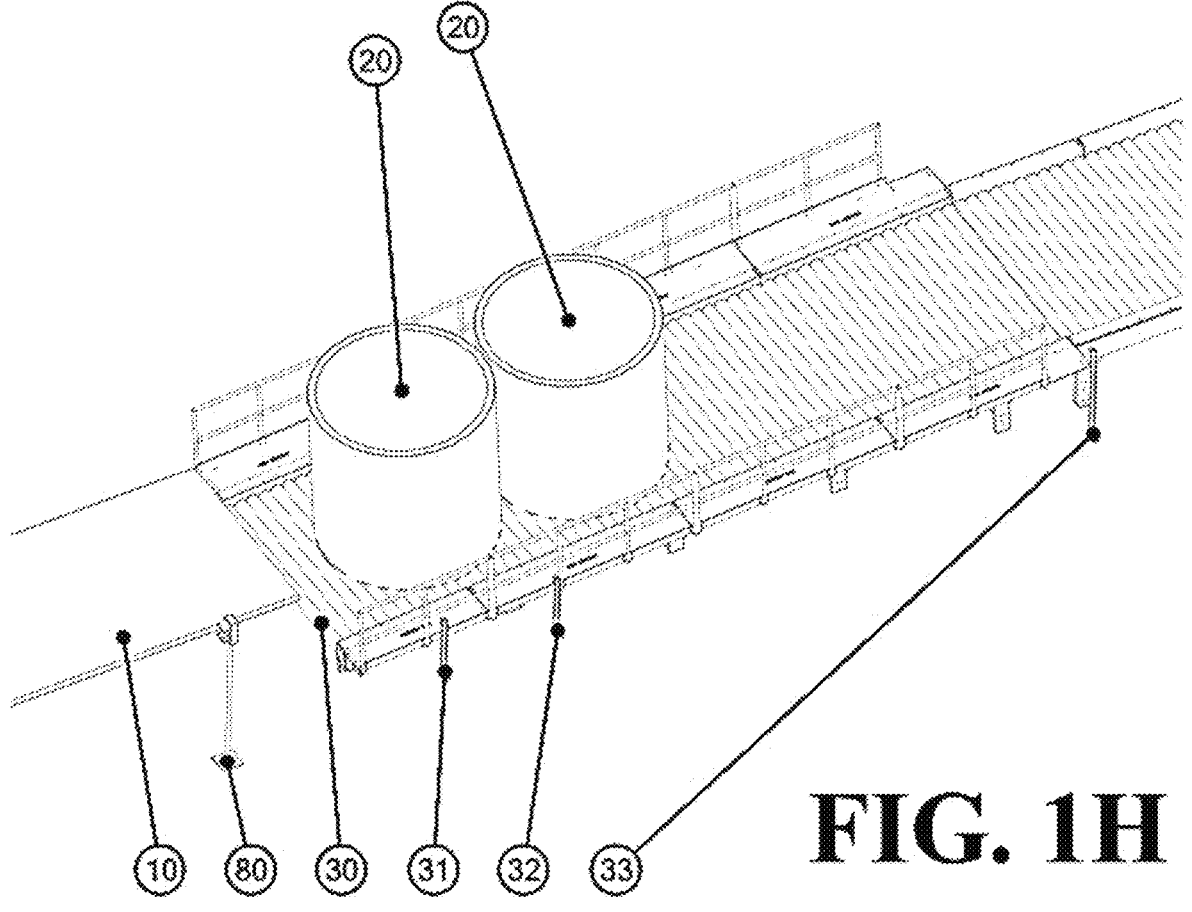
Figure 1I:
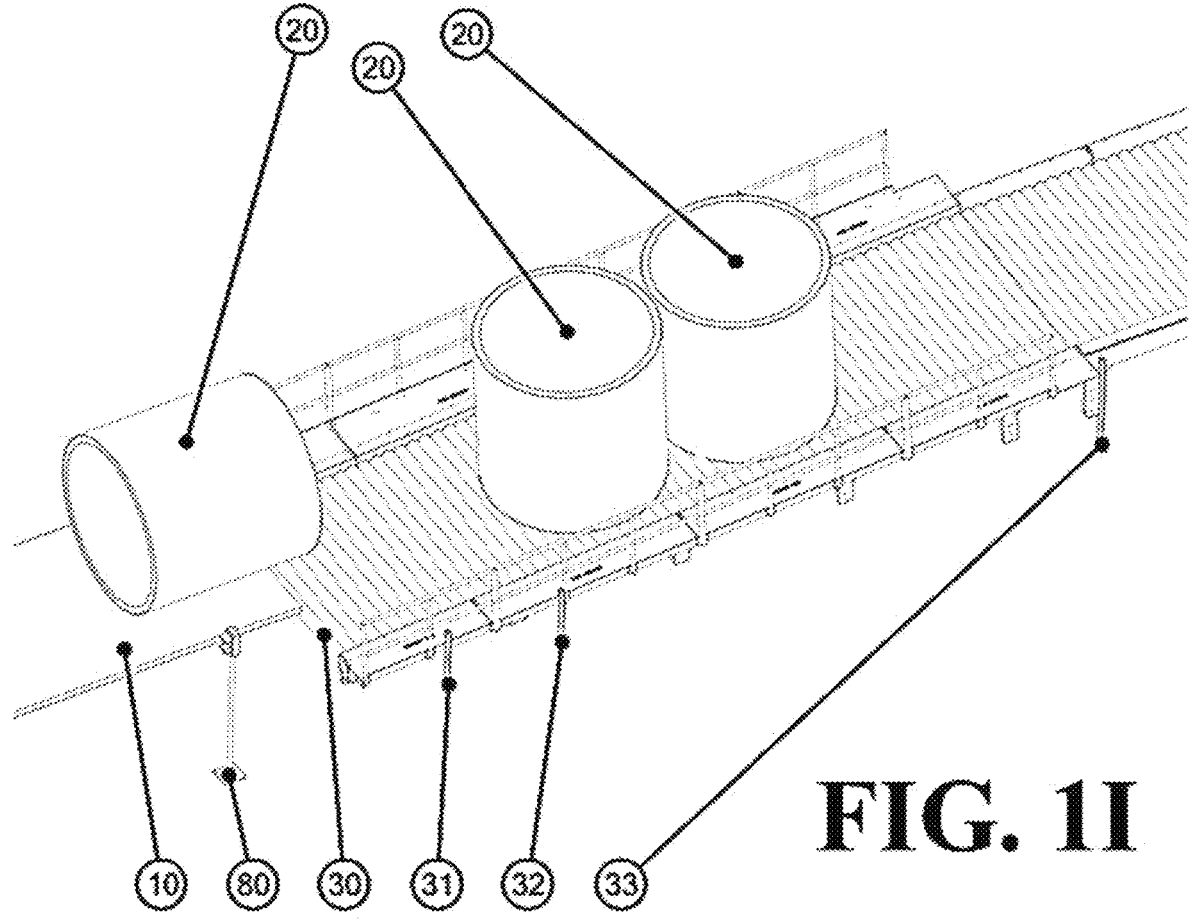
Figure 1J:
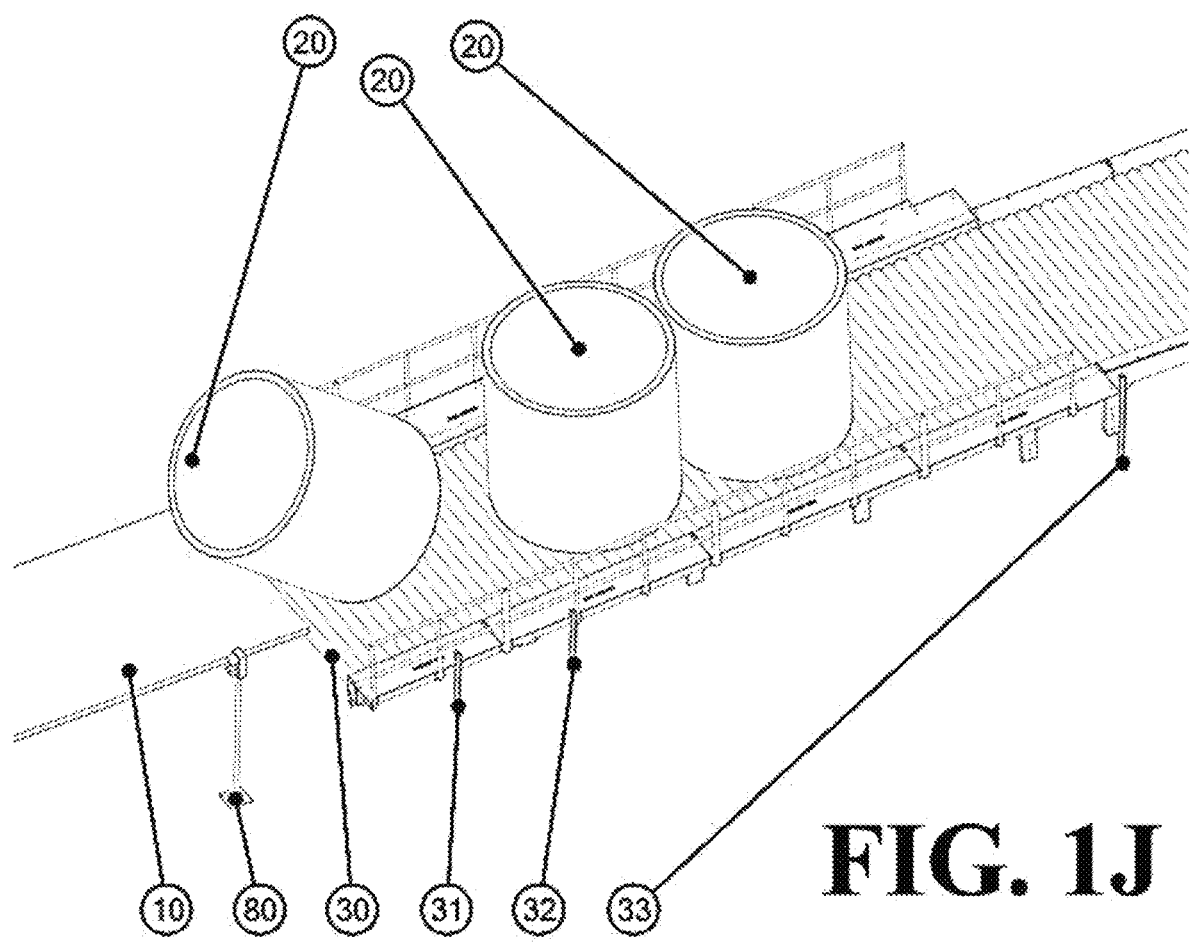
Figure 1K:
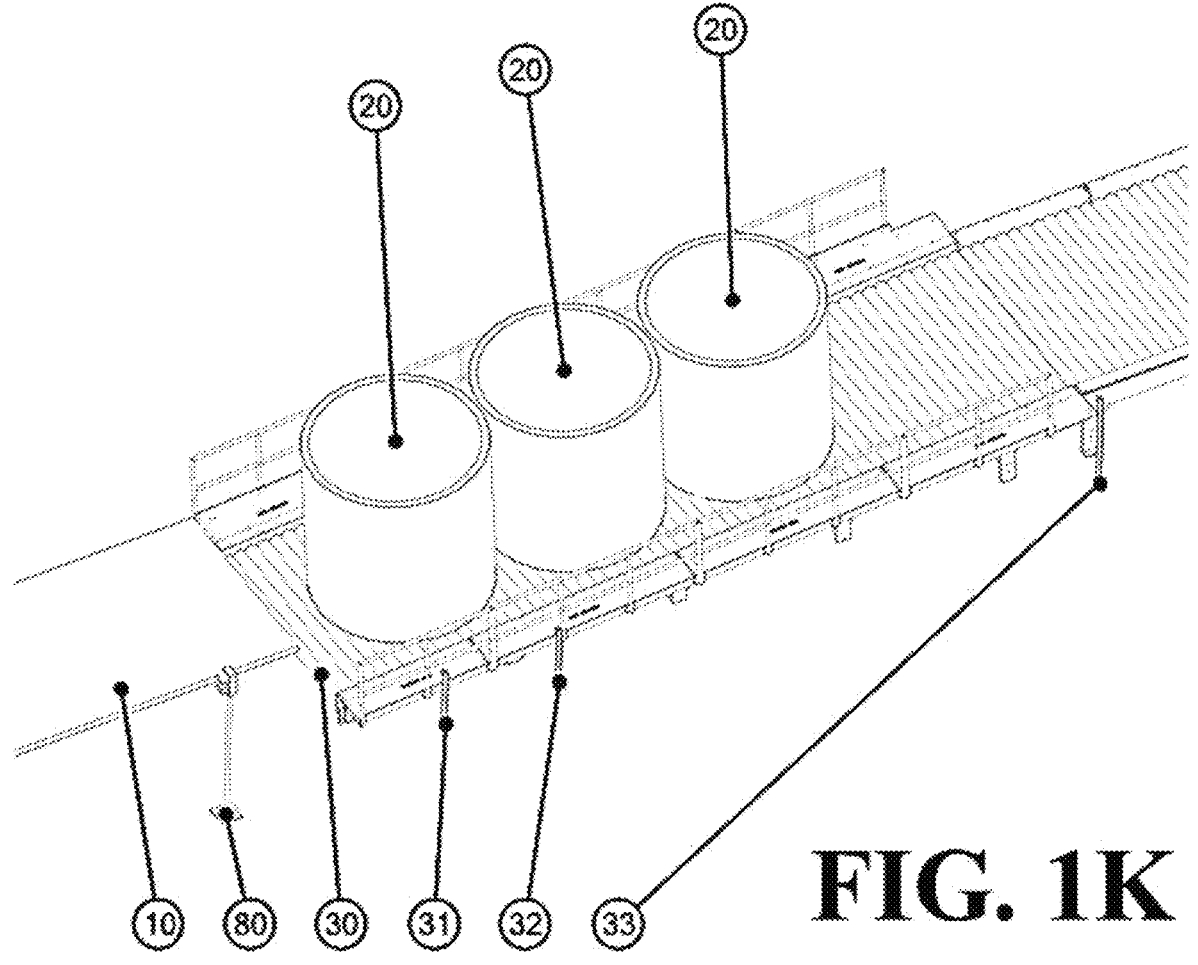
Figure 1L:
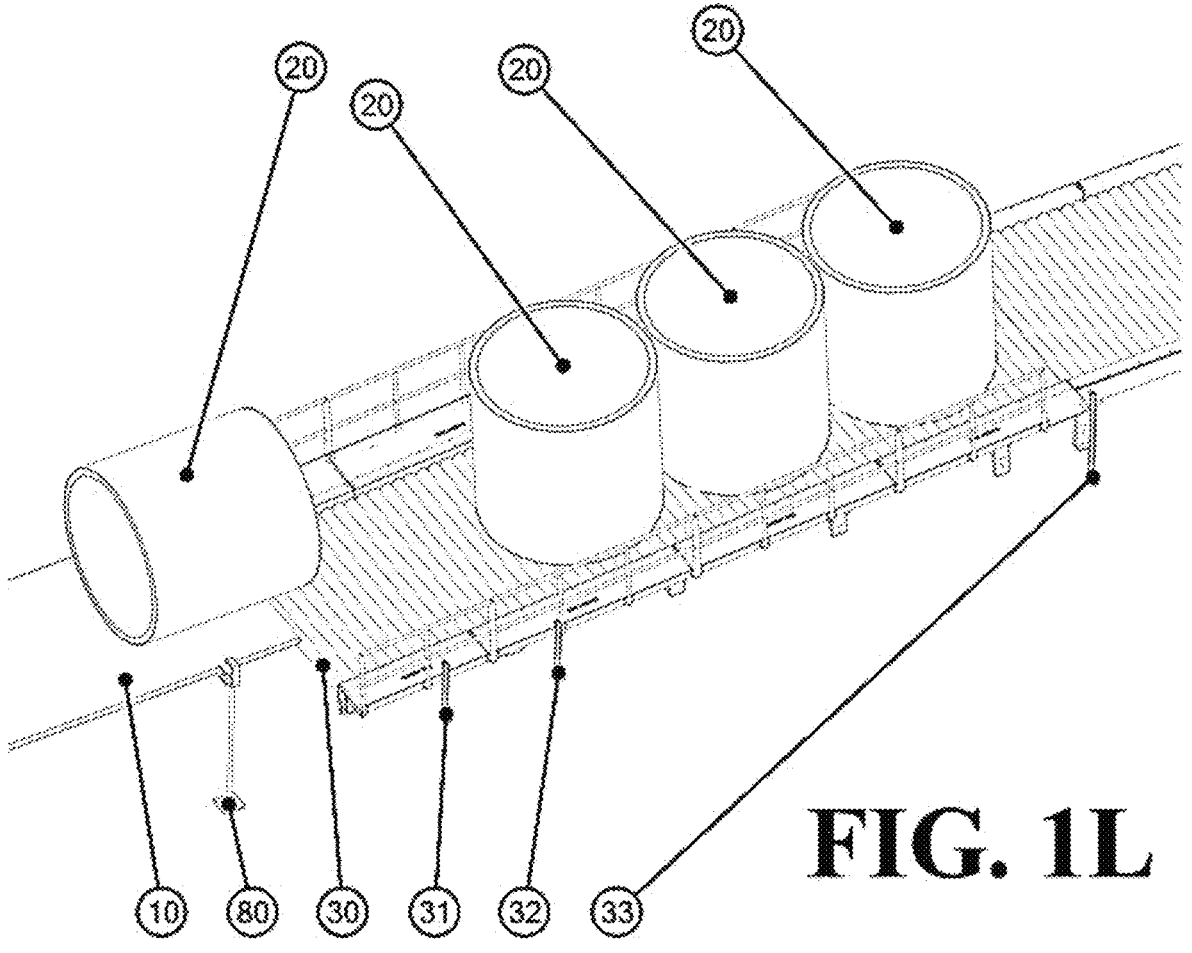
Figure 1M:
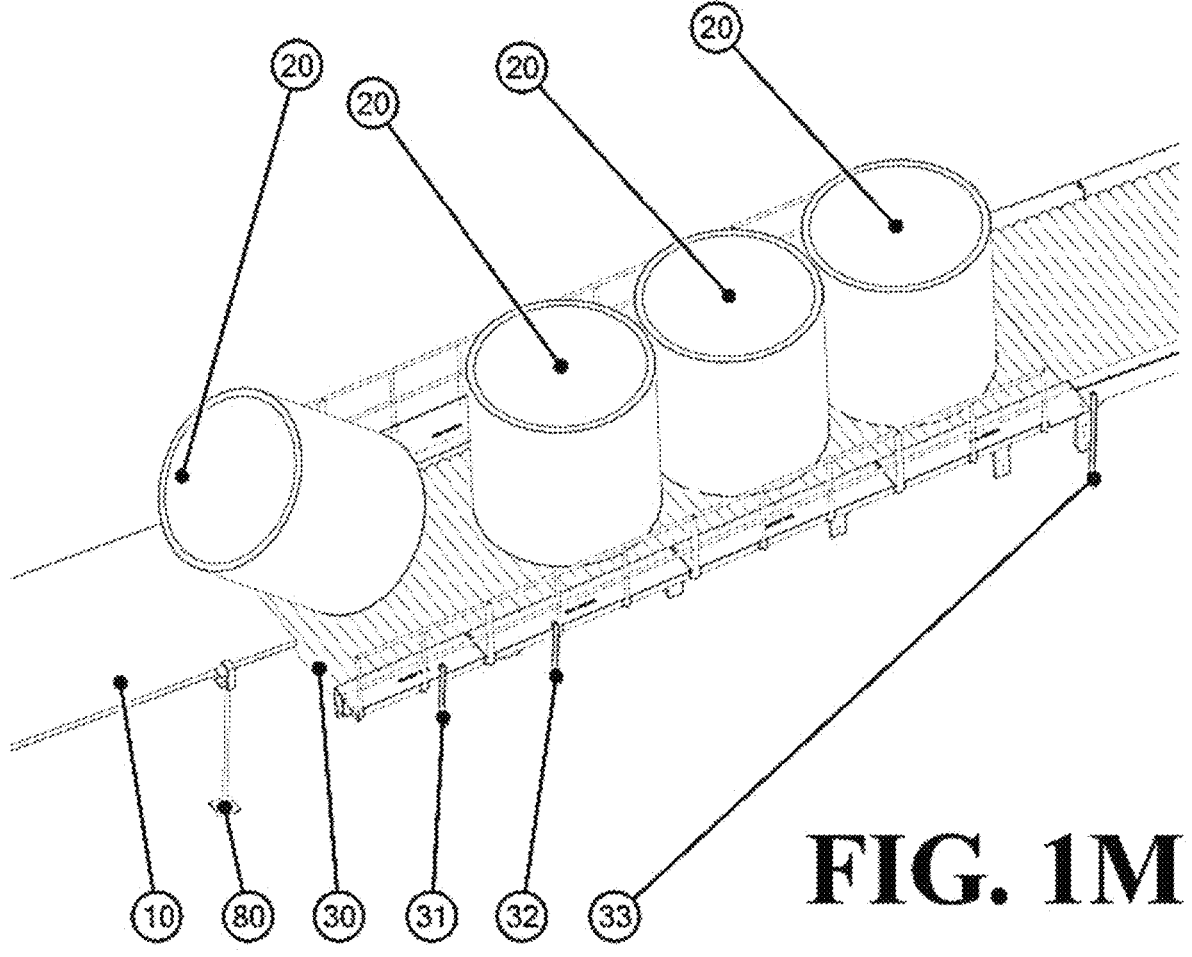
Figure 1N:
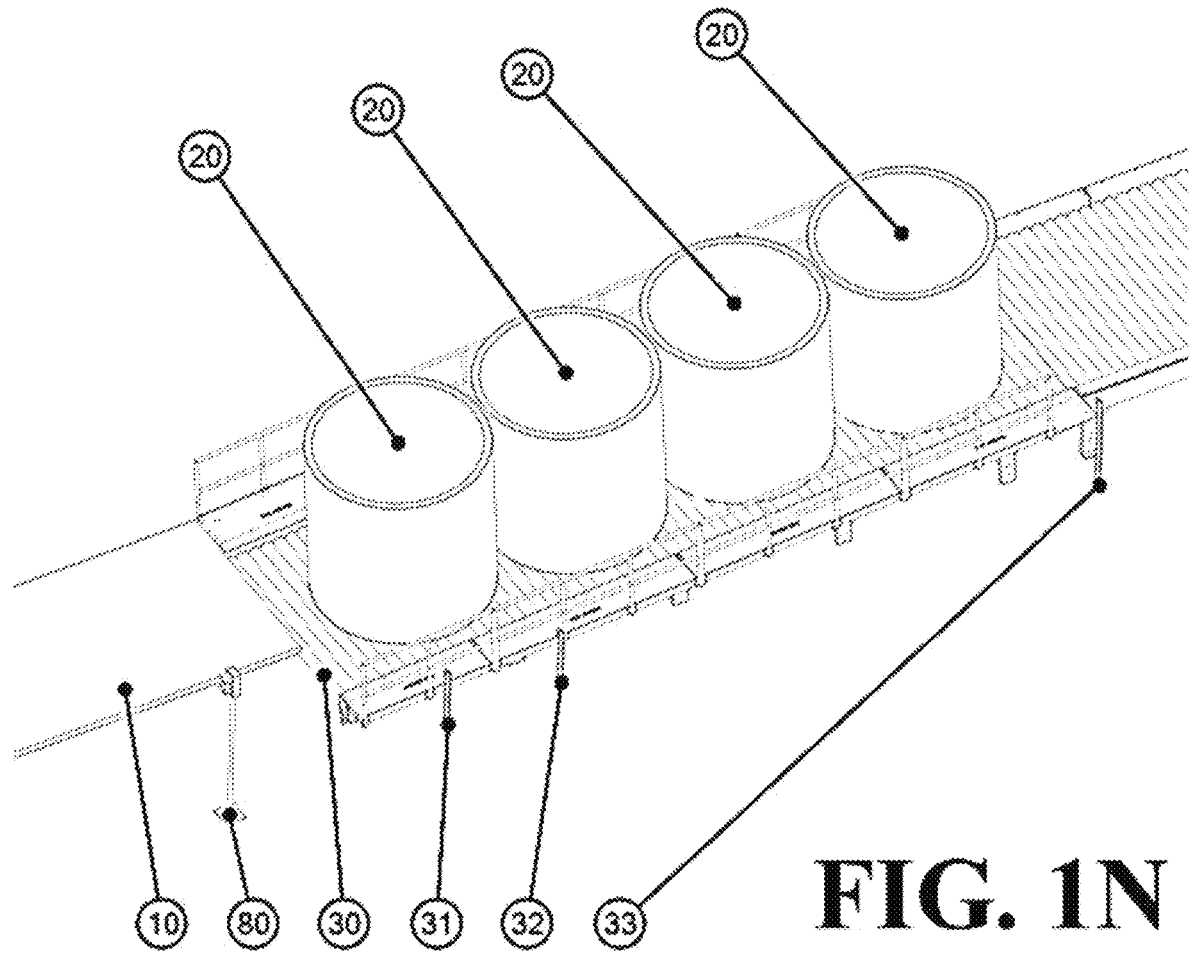
Figure 10:
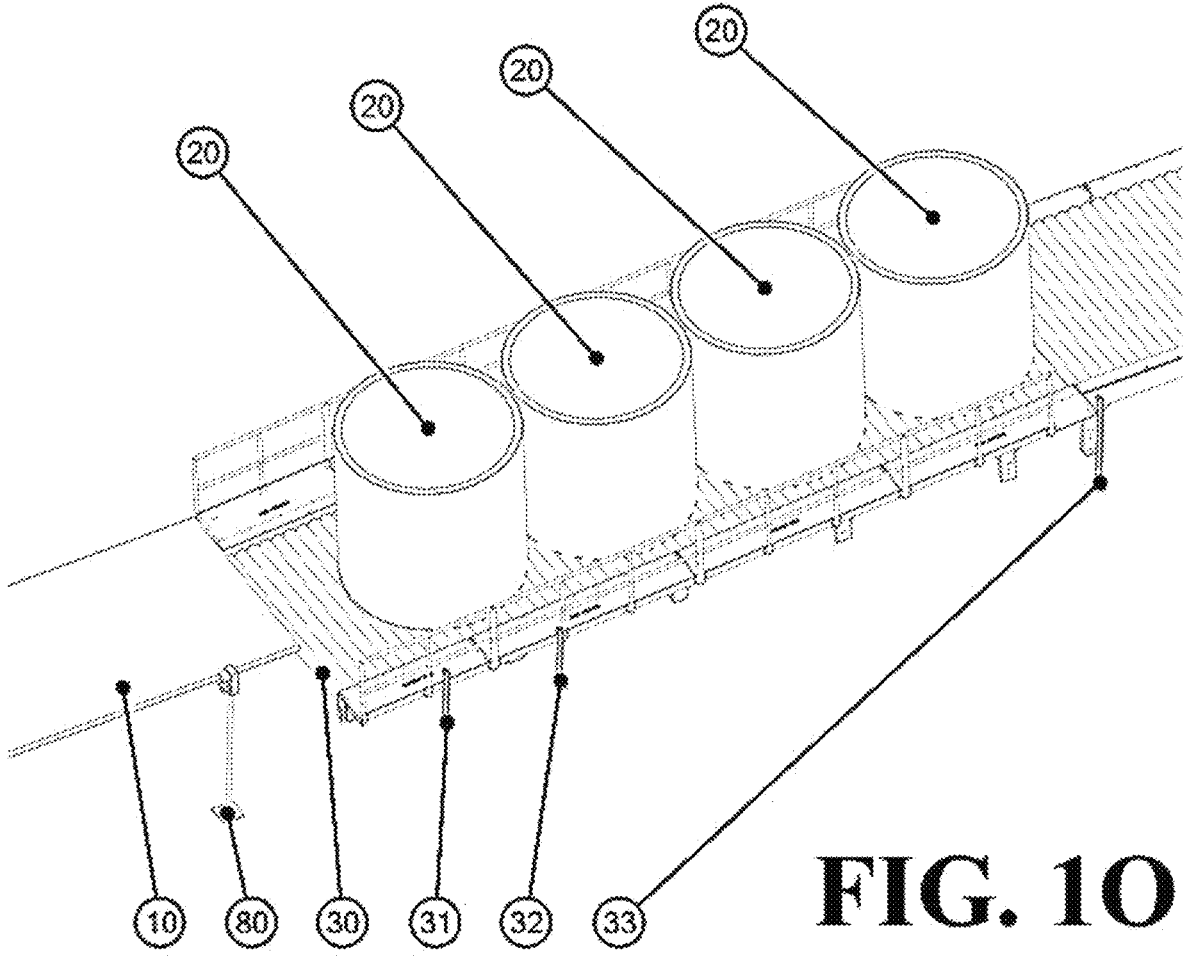

FIG. 1E shows the cotton module (20) in the vertical orientation on the unload bed conveyor (30). In this position shown in FIG. 1E, the first sensor (31) senses the cotton module (20) and the conveyor (10) is stopped. In embodiments where the conveyor (10) is manually operated, then a stop signal, such as a red light, may be displayed on the signal light (80). FIG. 1F shows the first cotton module (20) having been moved automatically forward on the unload bed (30) and past the second sensor (32). At this point, second sensor (32) detects the position of the first cotton module (20) and automatically stops the unload bed conveyor (30). With the first cotton module (20) in this position in FIG. 1F, neither the first sensor (31) nor the third sensor (33) sense a cotton module (20). From here, the conveyor (10) moves another cotton module (20) into position, towards the end portion of the conveyor (10). In some embodiments, the signal light (80) may be configured to next display the start signal for a manually operated conveyor (10). FIG. 1G shows a second cotton module (20) on the conveyor (10) reaching the tipping point and tipping from the horizontal position to the vertical position. In FIG. 1H, each of the two cotton modules (20) are in the vertical position on the unload bed conveyor (30). Here, the first sensor (31) senses the second cotton module (20) and the third sensor (33) does not sense any cotton module. Thus, the signal light (80) displays the stop signal again, and the unload bed conveyor (30) automatically moves the cotton modules (20) forward to the next position, as seen in FIG. 1I.

Figure 1P:
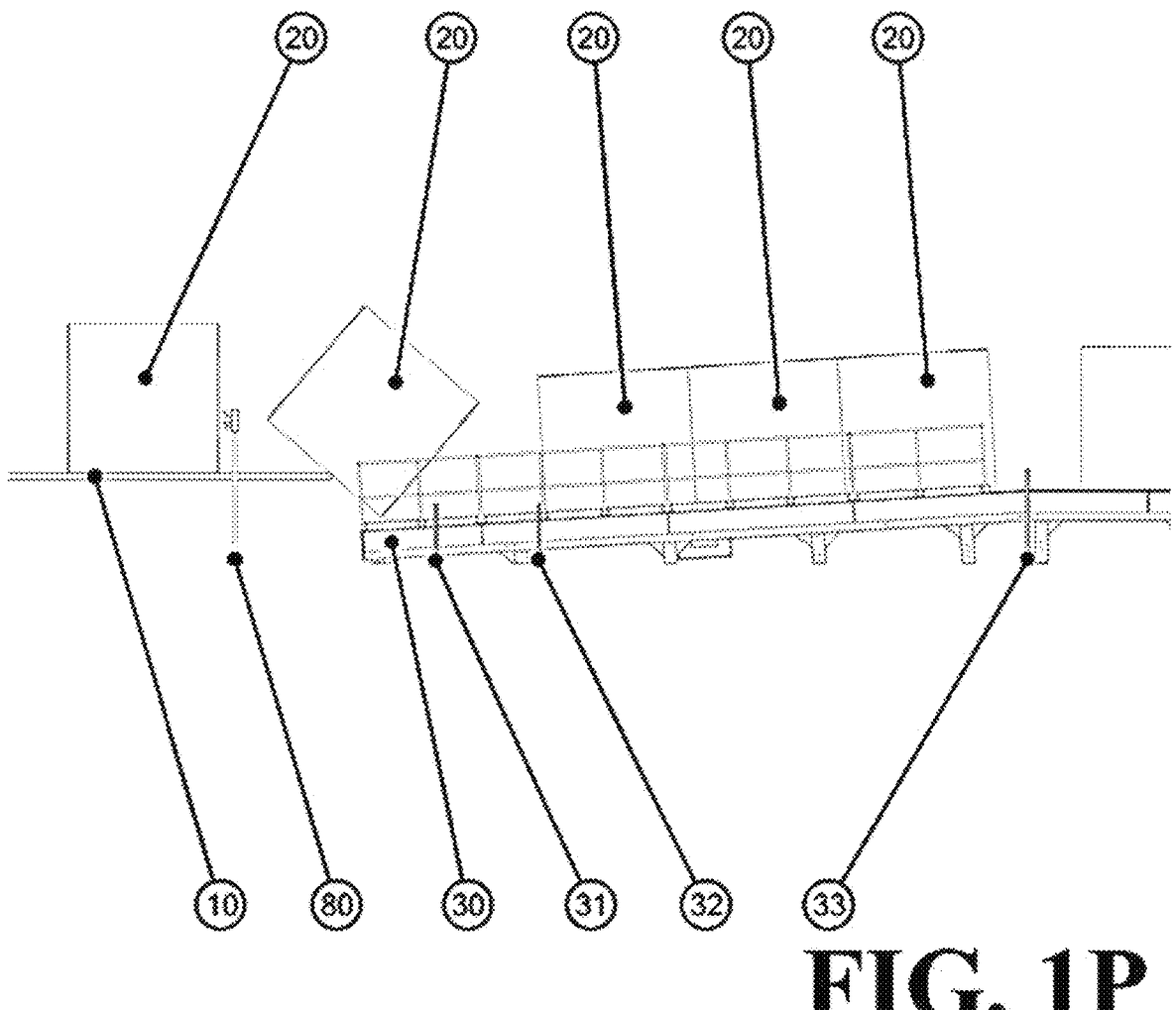

FIGS. 1J-1O show the continued operation of this exemplary system. In the same manner as before, using the first, second, and third sensors (31, 32, 33) and a controller (not shown), the unload bed conveyor (30) automatically starts and stops as required for the conveyor (10) to transport each of its cotton modules (20) sequentially onto the unload bed conveyor (30). Lastly, FIG. 1P depicts an elevation view of an exemplary embodiment of the cotton modules (20) moving from the conveyor (10) to the unload bed conveyor (30) and towards an intermediate bed conveyor (40), located after the third sensor (33).

Figure 2A:
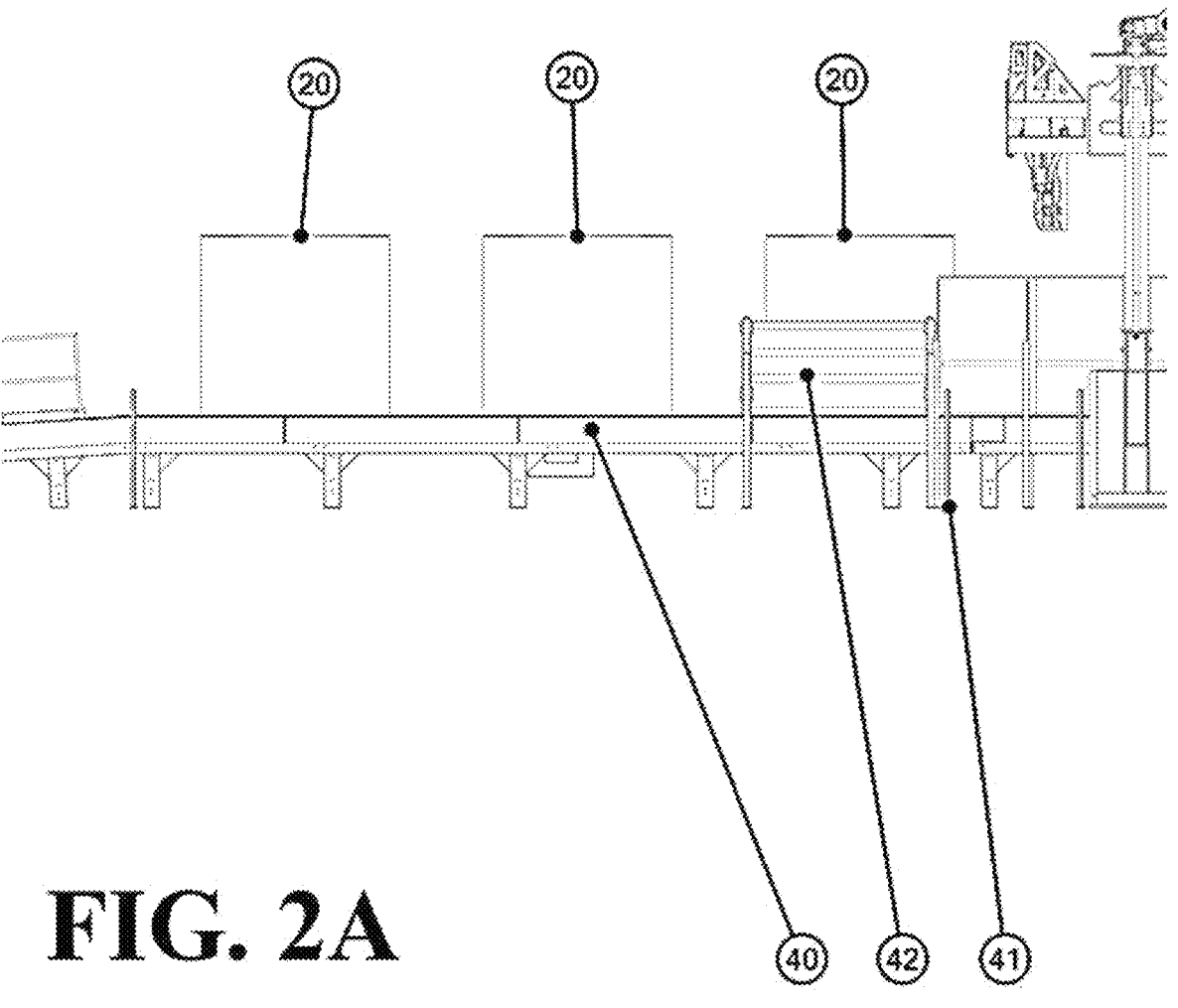
FIGS. 2A-2K are a sequence of exemplary plan and elevation views showing a cotton module intermediate bed and centering sequence, in accordance with certain exemplary embodiments of the present disclosure.

FIG. 2A is an elevation view showing an exemplary intermediate bed conveyor and centering sequence, in accordance with certain exemplary embodiments of the present disclosure. FIG. 2A shows the general layout of the cotton modules (20) coming from the unload bed conveyor (30) to the intermediate bed conveyor (40) with centering walls (42) located at its discharge end. In this exemplary embodiment, the cotton modules (20) ride on the top surface of the intermediate bed conveyor (40). In an exemplary embodiment, the intermediate bed conveyor (40) comprises a roller conveyor. However, in other embodiments, the intermediate bed conveyor (40) may comprise a belt conveyor, a chain conveyor, or any other applicable conveyor system known in the art. Intermediate bed conveyor (40) may comprise a fourth sensor (41) responsible for sensing the position of the cotton module (20) at the discharge end of the intermediate bed conveyor (40). Similar to the first, second, and third sensors (31, 32, 33), the fourth sensor (41) may comprise a photo-eye sensor in the exemplary embodiment, but alternatively may comprise any other applicable sensor(s) known in the art. In FIG. 2A, the cotton modules (20) are each in the vertical position, while the centering walls (42) are fixed in an angled position to ensure that each of the vertical cotton modules (20) traveling along the intermediate bed conveyor (40) are centered on the discharge end of the intermediate bed conveyor (40).

Figure 2B:
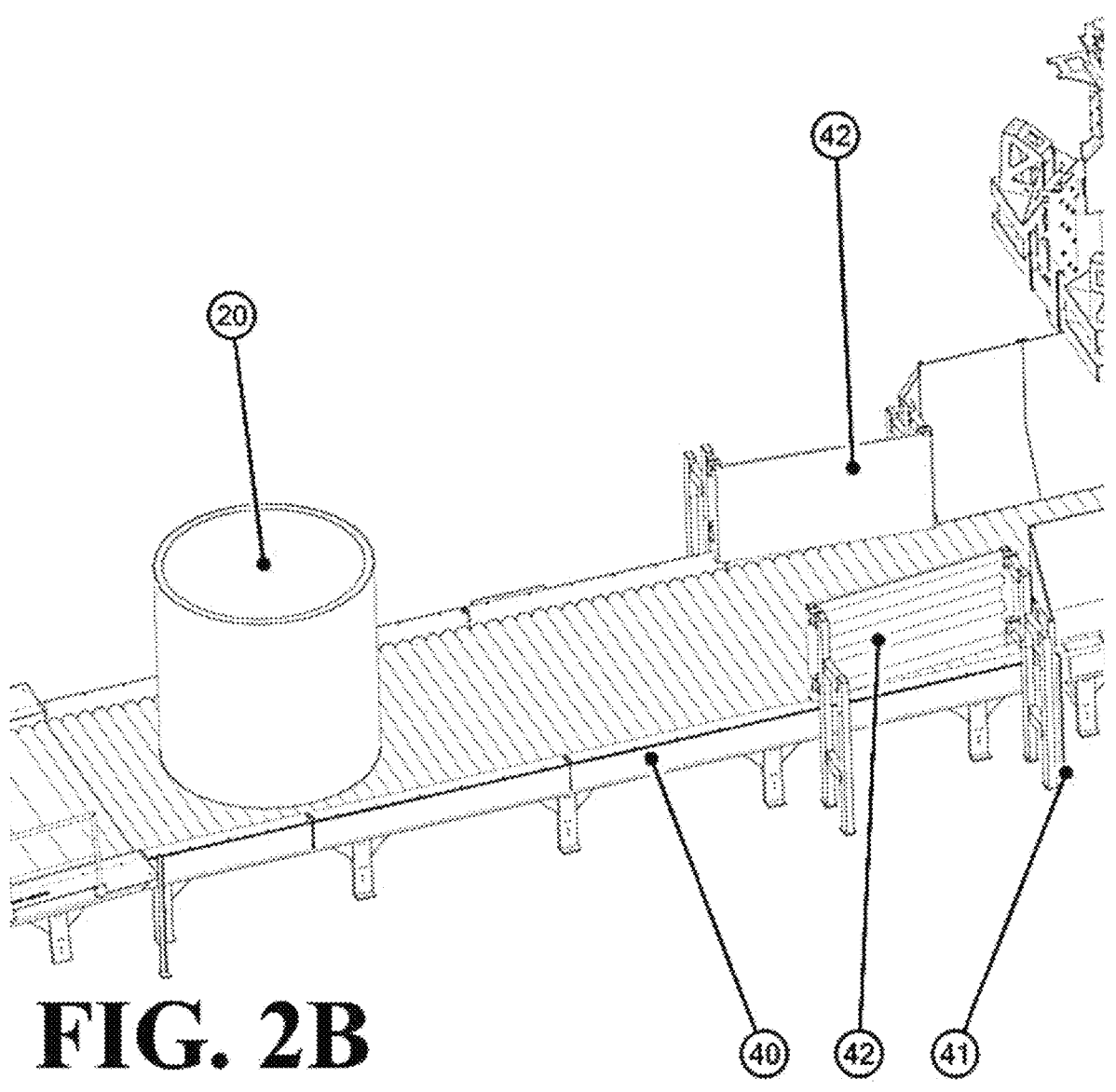

FIG. 2B is a plan view showing the exemplary cotton module intermediate bed conveyor and centering sequence according to the disclosed embodiments. FIG. 2B portrays a first vertical cotton module (20) located near the receiving end of the intermediate bed conveyor (40). In such an embodiment, the vertical cotton module (20) may be fed from a previous conveyor, like the unload bed conveyor (30) seen in FIGS. 1A-1P. The next step of the exemplary embodiment is shown in FIG. 2C, wherein the cotton module (20) is traveling forward along the intermediate bed conveyor (40) toward its discharge end and the centering walls (42), but has not yet been sensed by the fourth sensor (41).

Figure 2C:
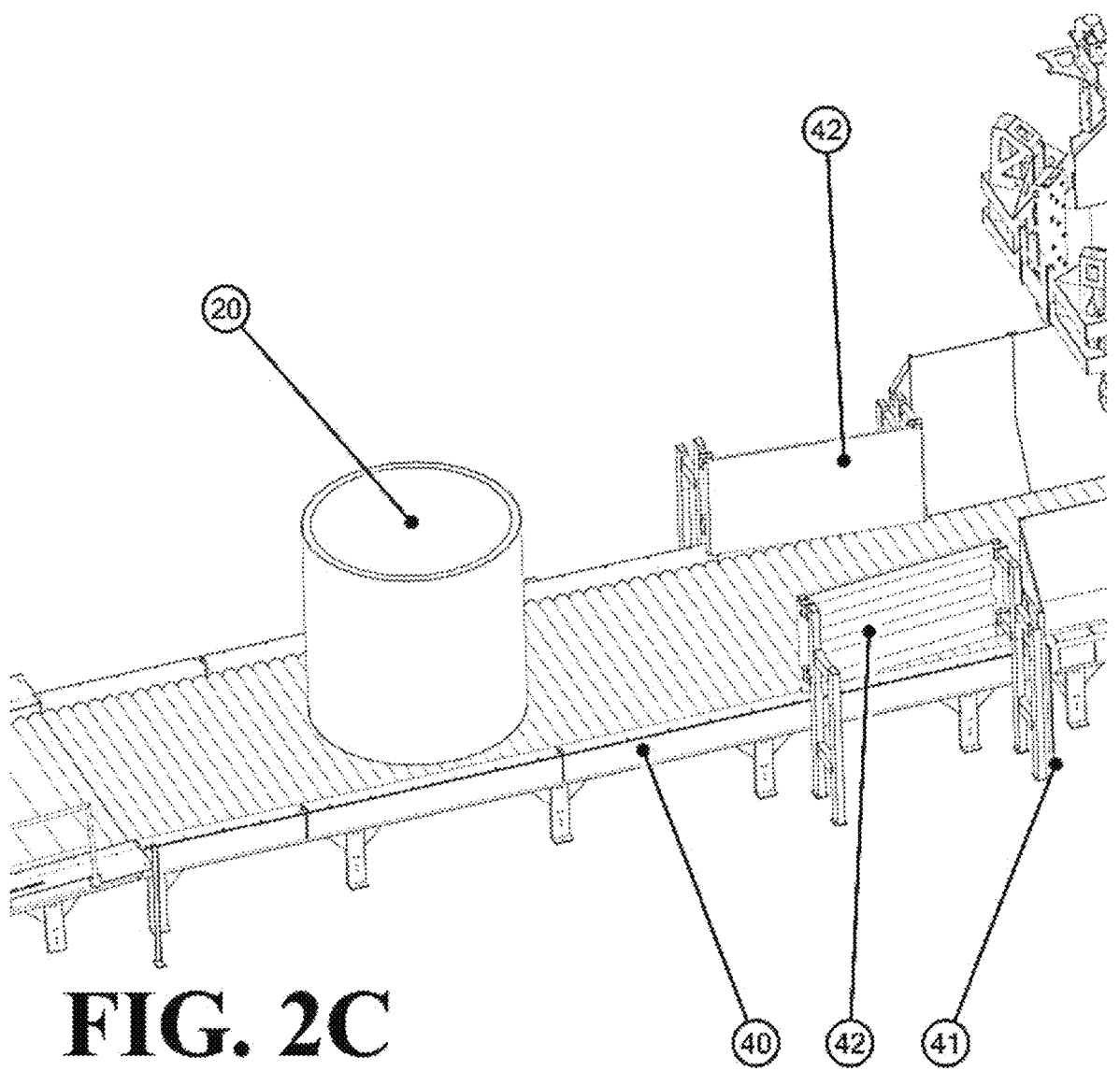
Figure 2D:
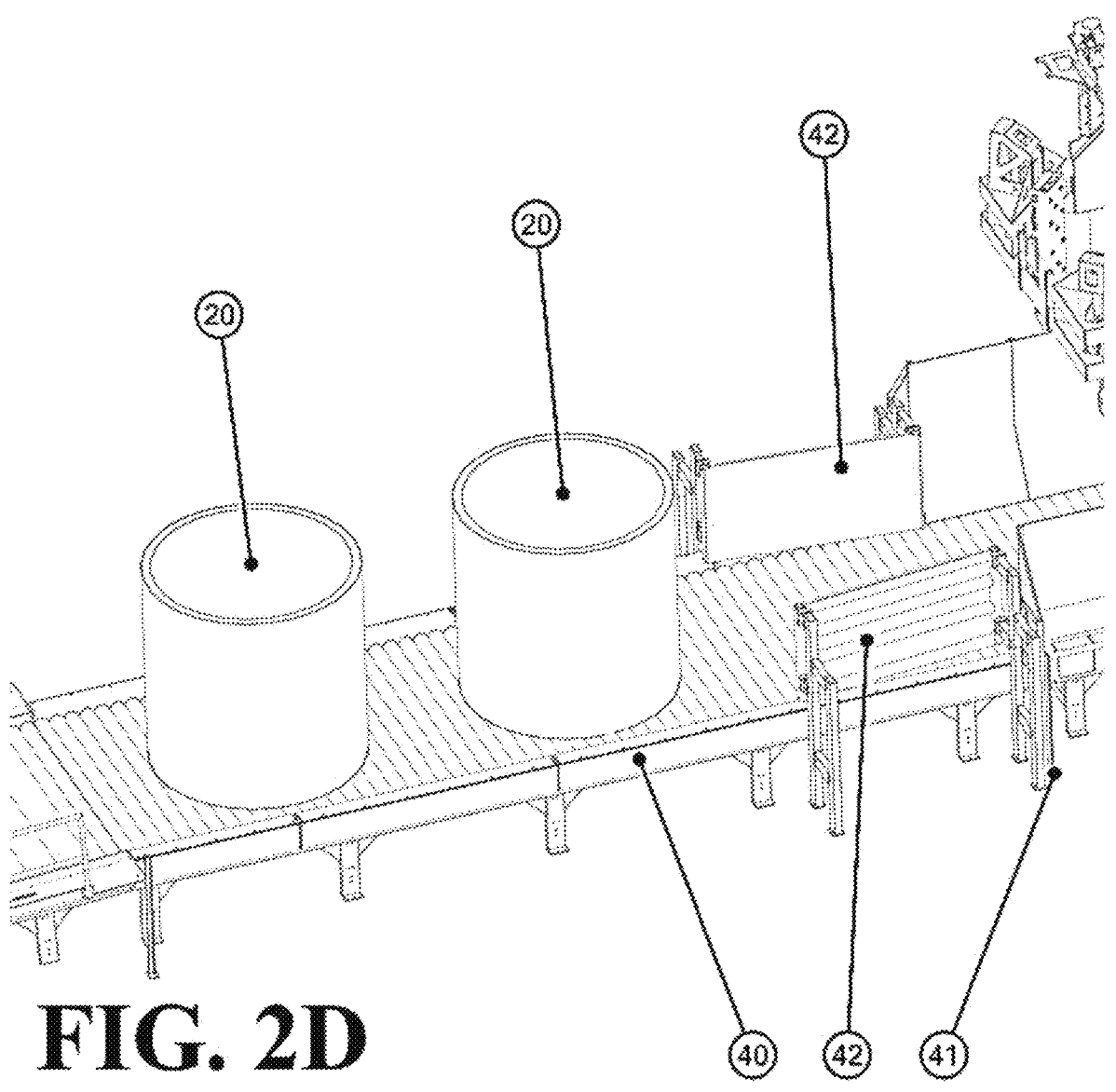
Figure 2E:
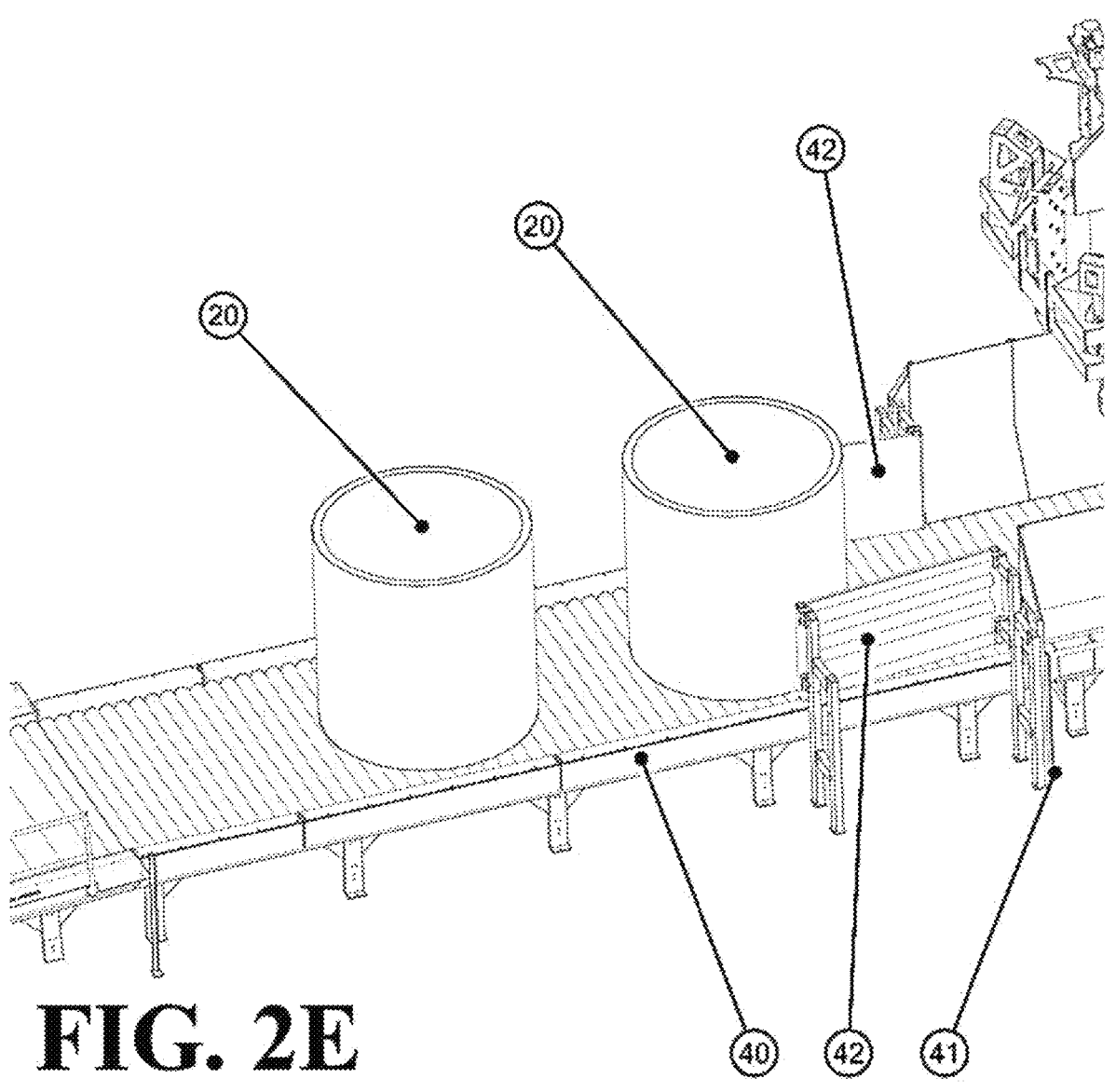
Figure 2F:
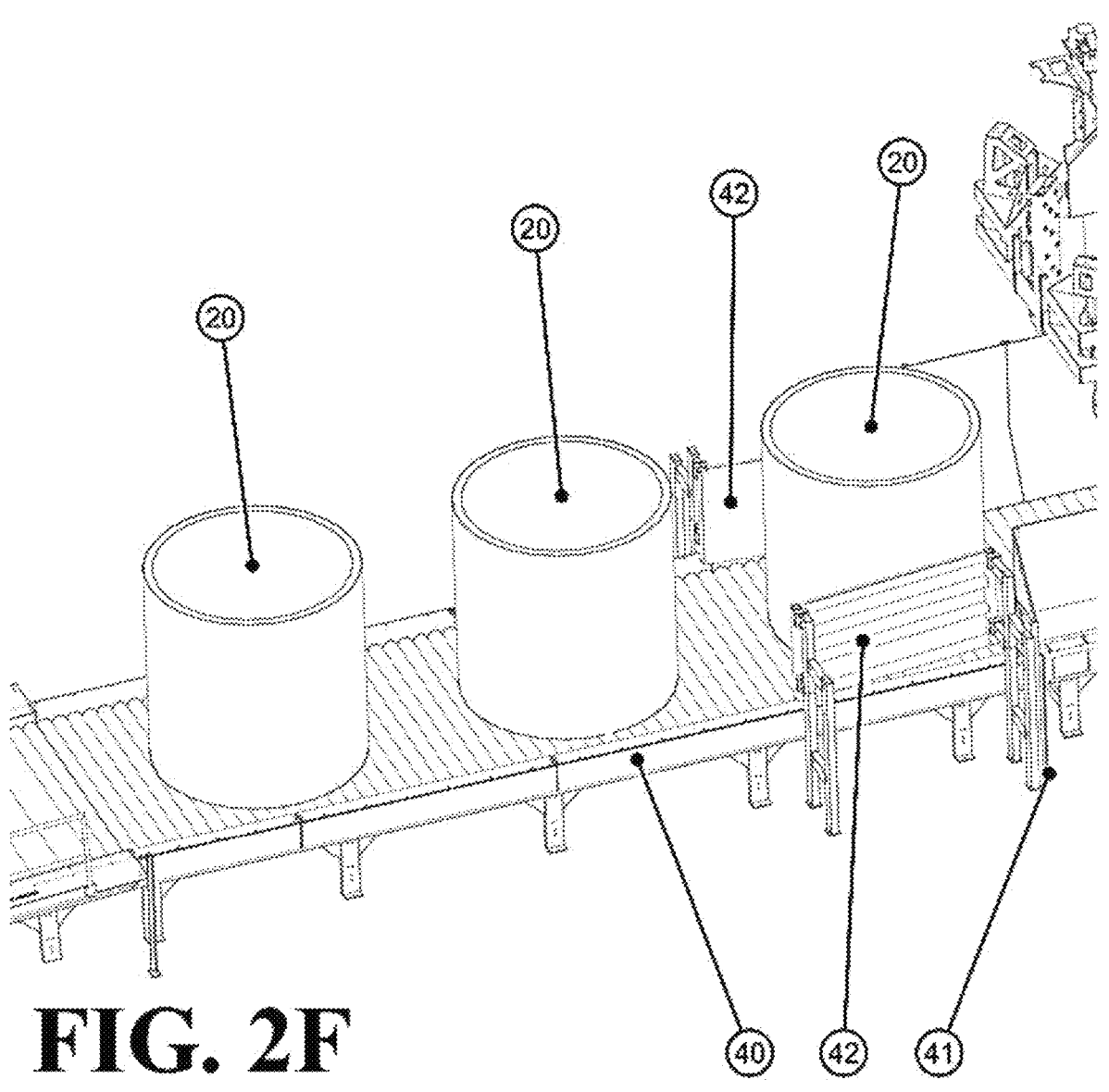
Figure 2G:
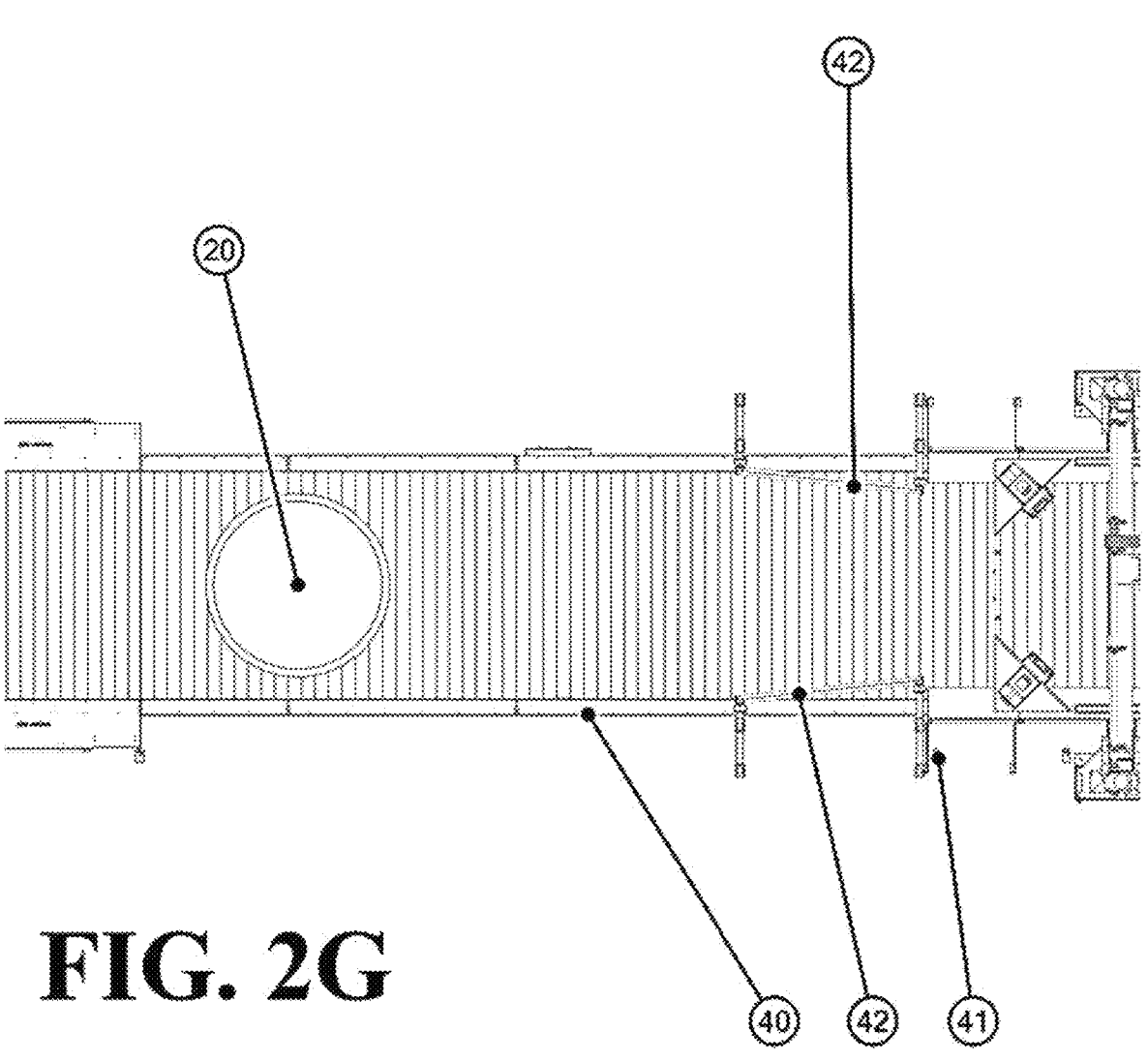
Figure 2H:
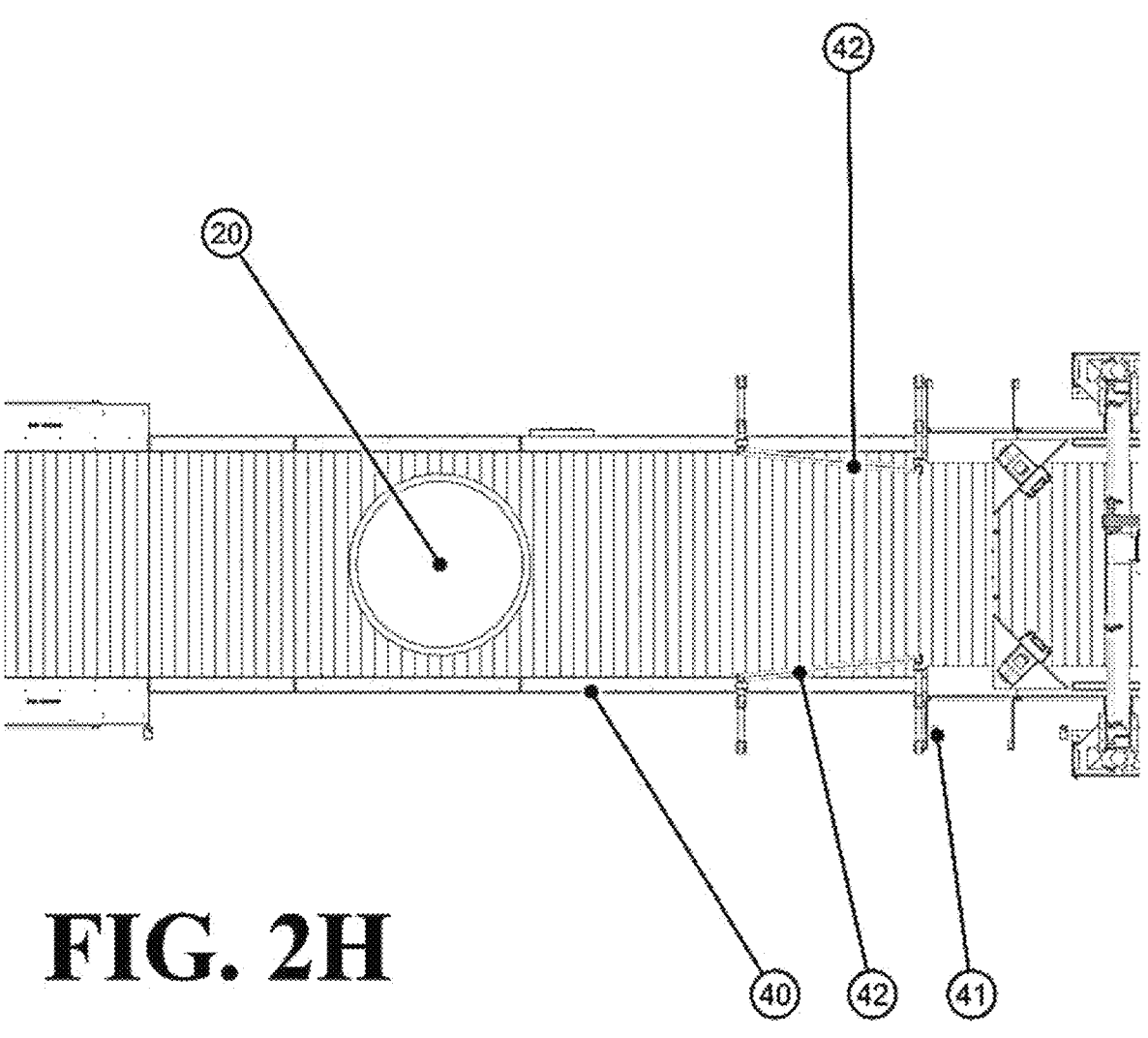
Figure 2I:
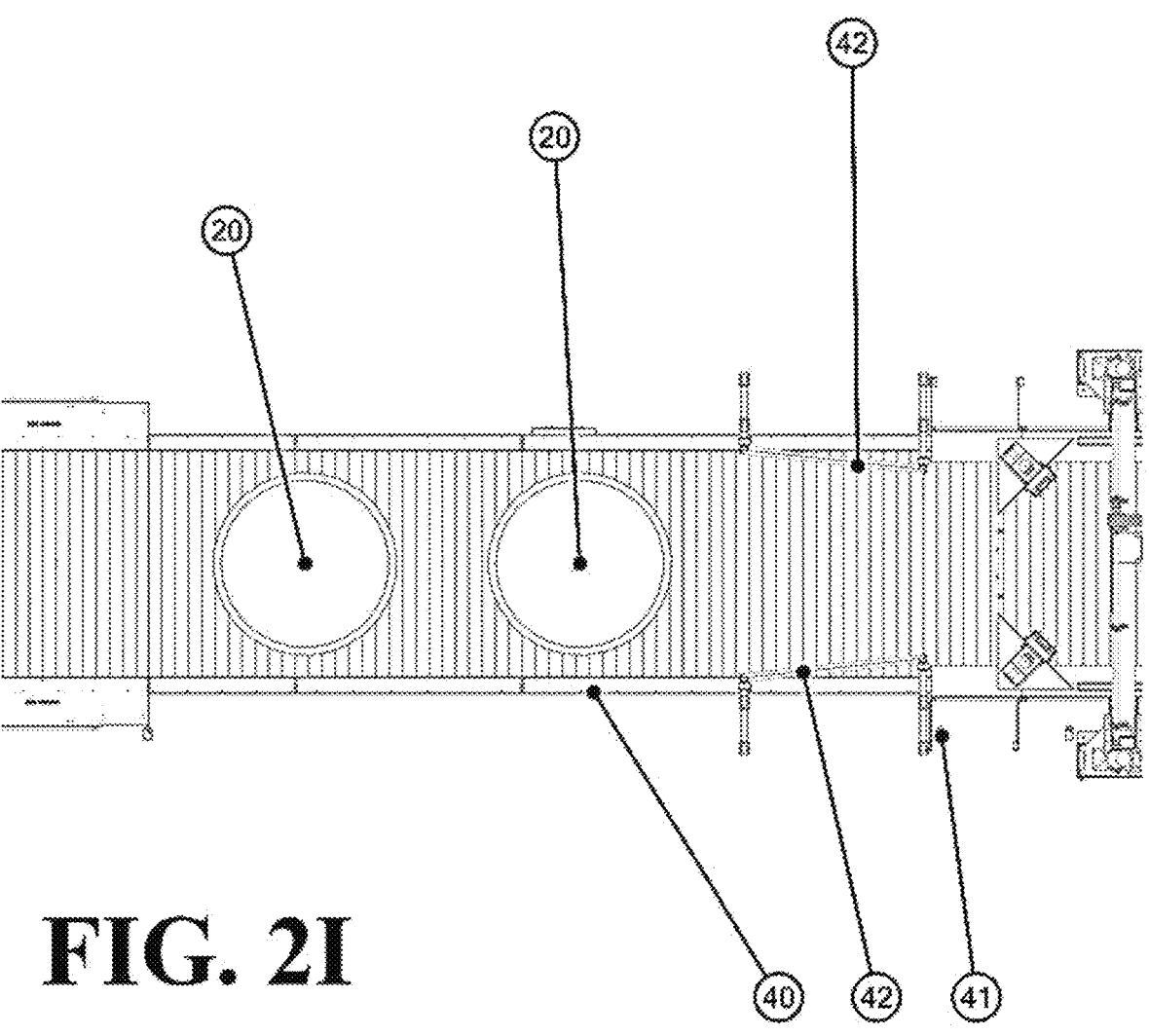
Figure 2J:
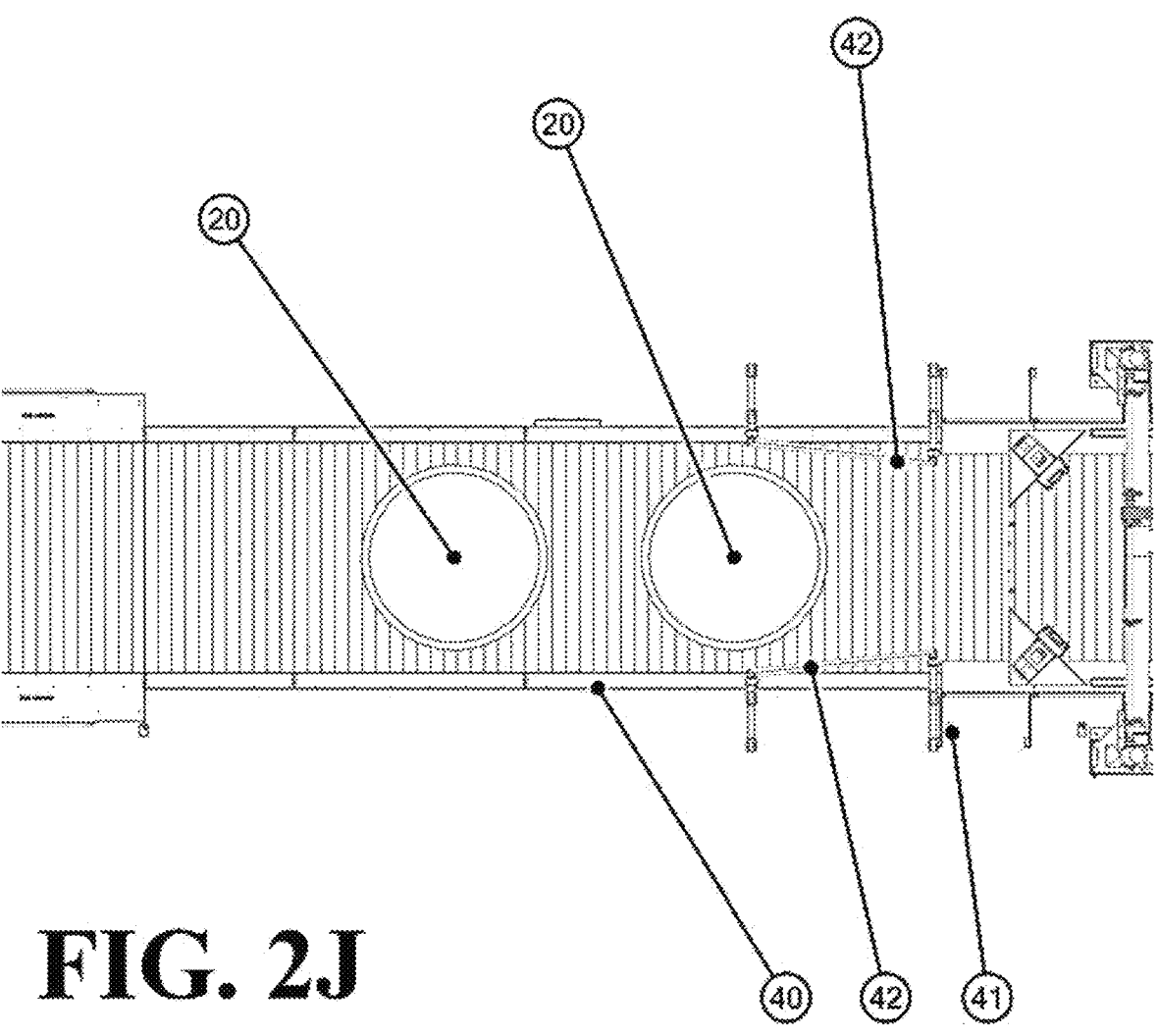
Figure 2K:
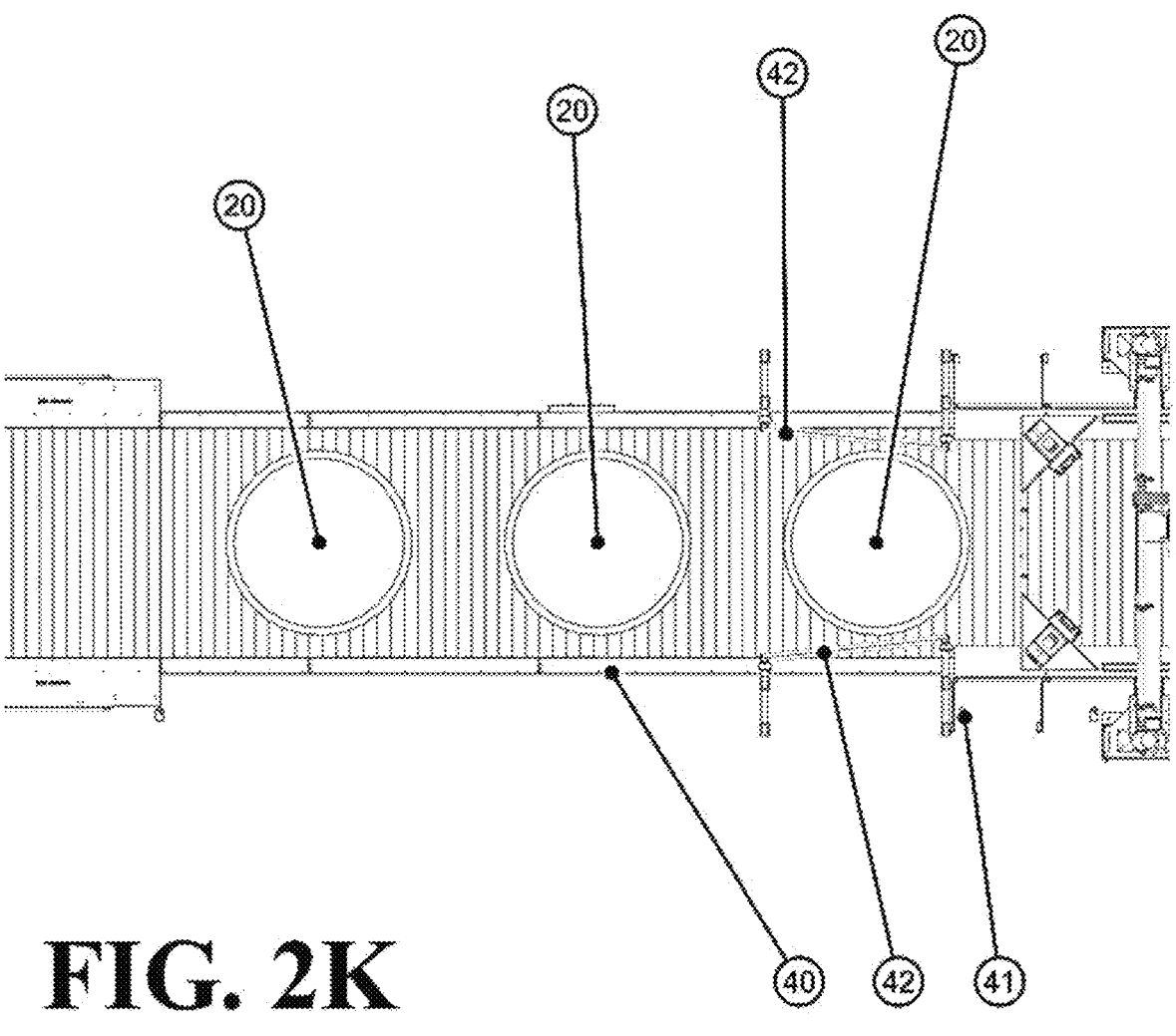

FIGS. 2D-2F are similar to FIGS. 2B and 2C, except that the second and third cotton modules (20) have been added to the intermediate bed conveyor (40). In FIG. 2E, the first cotton module (20) is entering the centering wall (42) section, but has not yet been sensed by the fourth sensor (41). Where cotton modules (20) are not centered on the intermediate bed conveyor (40), then the fixed centering walls (42) apply physical pressure on the sides of the cotton modules (20) passing through, thereby pushing the cotton modules (20) toward the center of the intermediate bed conveyor (40). FIG. 2F shows a third cotton module (20) on the intermediate bed conveyor (40). At this point, the first cotton module (20) has moved forward enough to be sensed by the fourth sensor (41) located at the end of the intermediate bed conveyor (40). After fourth sensor (41) senses a cotton module (20), the fourth sensor (41) automatically instructs a controller (not shown) to stop the intermediate bed conveyor (40), thereby halting the forward progress of each of the proceeding cotton modules (20). Here, the centering walls (42) have pushed the leading cotton module (20) toward the center of the intermediate bed conveyor (40) at the discharge end of the conveyor (40). Also, at this point in the exemplary embodiment, the second and third cotton modules (20) are held in place until needed past the intermediate bed conveyor (40).

FIGS. 2G-2K correspond with and depict alternative plan views of the exemplary embodiments shown in FIGS. 2B-2F.

Figure 3A:
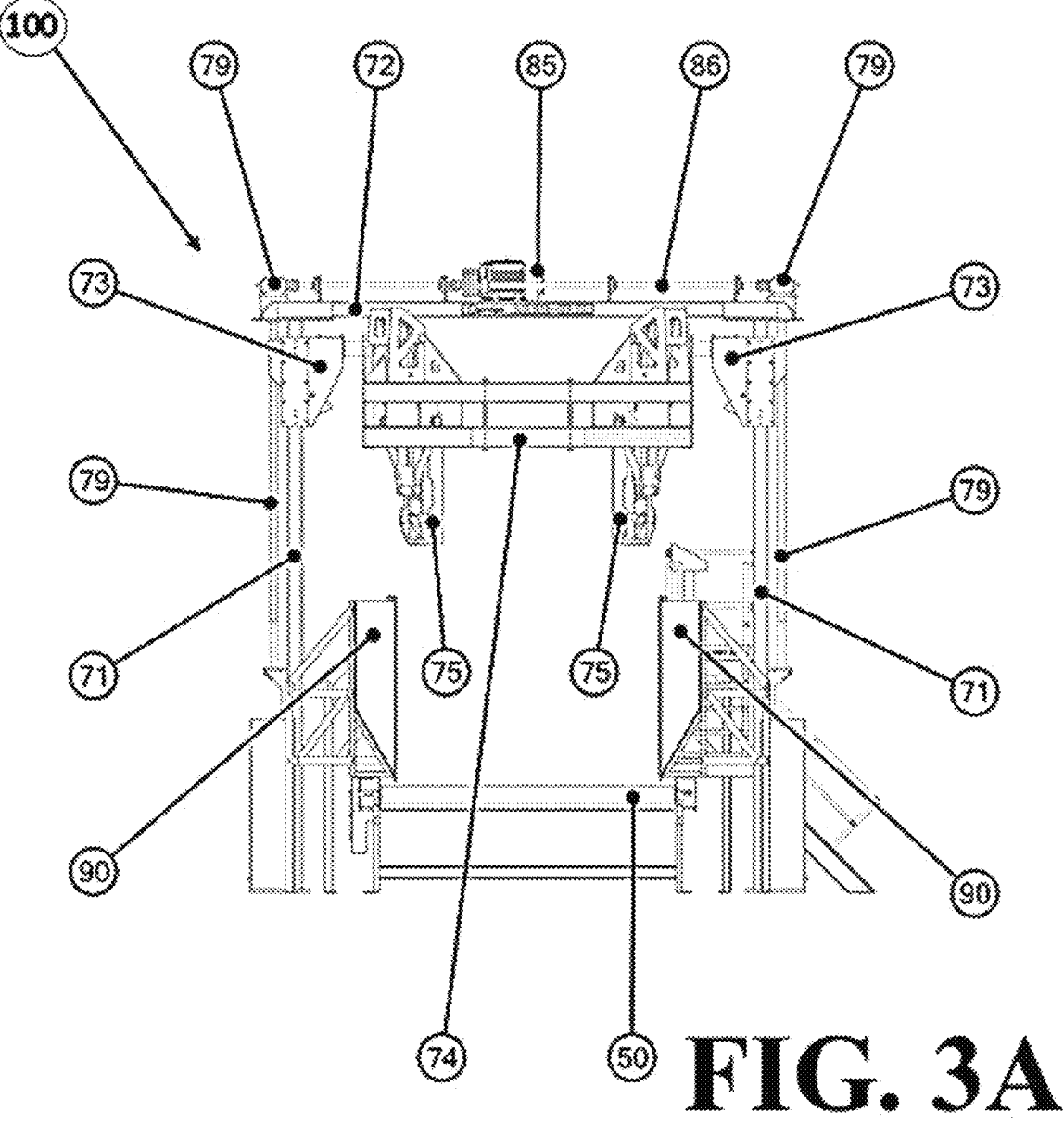
FIGS. 3A-3T are a sequence of exemplary plan and elevation views depicting a cotton module stage and strip sequence, in accordance with certain exemplary embodiments of the present disclosure.

FIG. 3A provides a front elevation view of an exemplary embodiment of a module unwrapping unit (100) capable of performing a cotton module stage and strip sequence. In the exemplary embodiment, the intermediate bed conveyor (40) positions the vertically-oriented cotton module (20) onto the unwrapping bed conveyor (50) to be unwrapped. The main column (71) and the crossbeam (72) are the stationary framework of the module unwrapping unit (100) in this embodiment. The module unwrapping unit (100) comprises a pair of carriages (73) that are controlled to move up and down a main column (71) by a pair of ball screw jacks (79). The ball screw jacks (79) of module unwrapping unit (100) are controlled to move by the combination of a drive motor (85) and a drive shaft (86). The pair of carriages (73) moves an unwrapper frame (74) up and down, along a vertical axis. In this exemplary embodiment, the unwrapper frame (74) is directly connected to and carries a plurality of clamp pad assemblies (75). Module unwrapping unit (100) may further comprise a plurality of walls (90) responsible for containing the loose cotton after the wrap is removed from the wrapped cotton module (20).

Figure 3B:
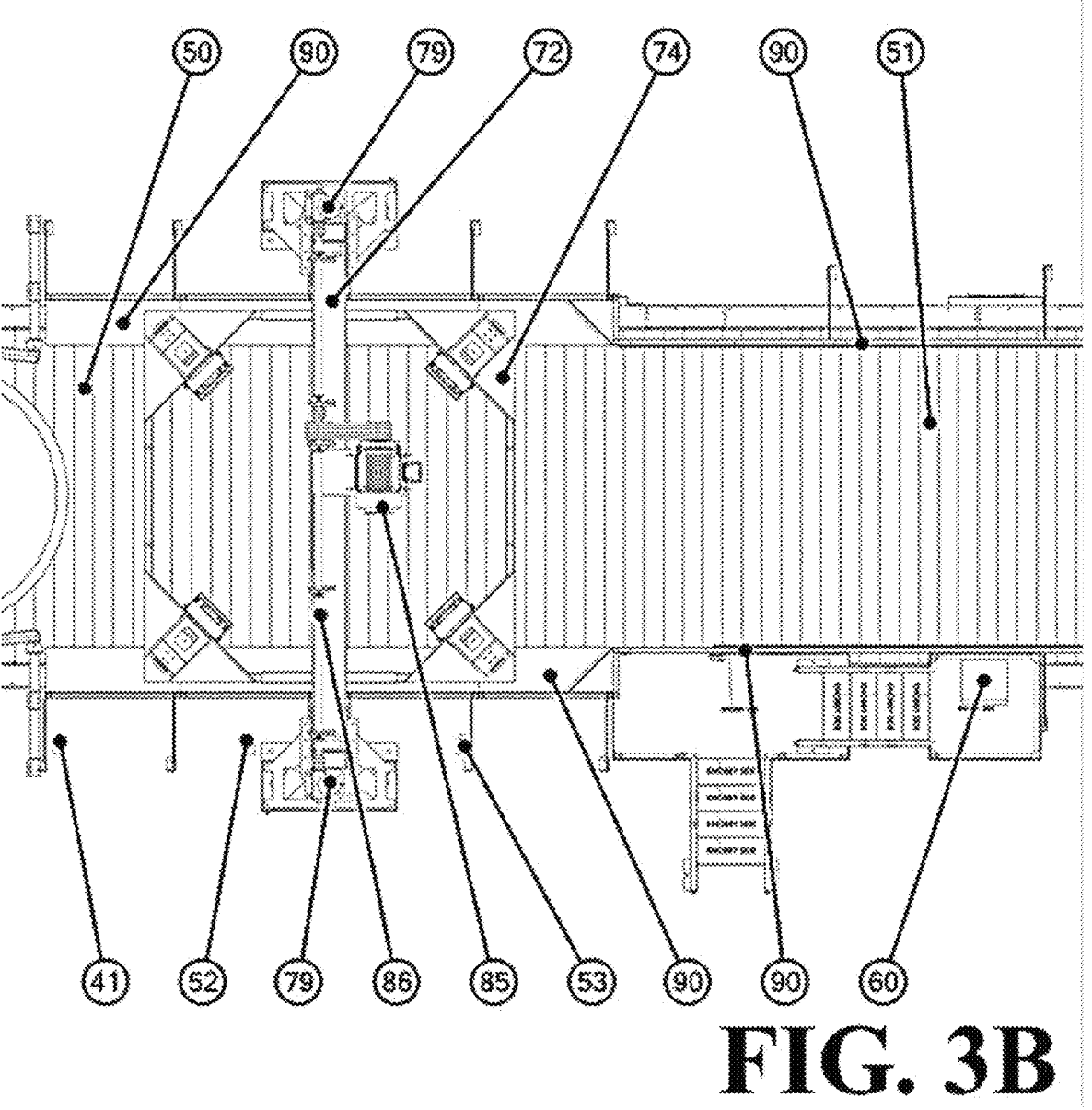

FIG. 3B provides a plan view of the exemplary embodiment of a module unwrapping unit (100) capable of performing a cotton module stage and strip sequence. The plan view of FIG. 3B more fully illustrates the areas surrounding the module unwrapping unit (100). The unwrapper bed conveyor (50) receives cotton modules from the previous intermediate bed conveyor (40) located at the fourth sensor (41) and moves the modules to their next position in the module unwrapping unit (100). In an exemplary embodiment, this next position is preferably a central location along the unwrapper bed conveyor (50), centered with the unwrapper frame (74) and clamp pad assemblies (75). The wall sections (90) contain loose cotton therebetween after the wrap is removed from the wrapped cotton module (20). In an exemplary embodiment, the module unwrapping unit (100) may further comprise first and second unwrapping sensors (52, 53) responsible for sensing the cotton modules (20). Similar to the first, second, third and fourth sensors (31, 32, 33, 41), the first and second unwrapping sensors (52, 53) may comprise photo-eye sensors in the exemplary embodiment, but may comprise any other applicable sensors known in the art. In this disclosed embodiment, the unwrapper drive motor (85) moves the unwrapper drive shaft (86), which in turn moves the ball screw jacks (79). In turn, this moves the unwrapper frame (74) up and down, along a vertical axis. In some embodiments, the apparatus disclosed herein may further comprise an operator platform (60), which provides a location for a module unwrapper operator to view and operate the machinery.

Figure 3C:
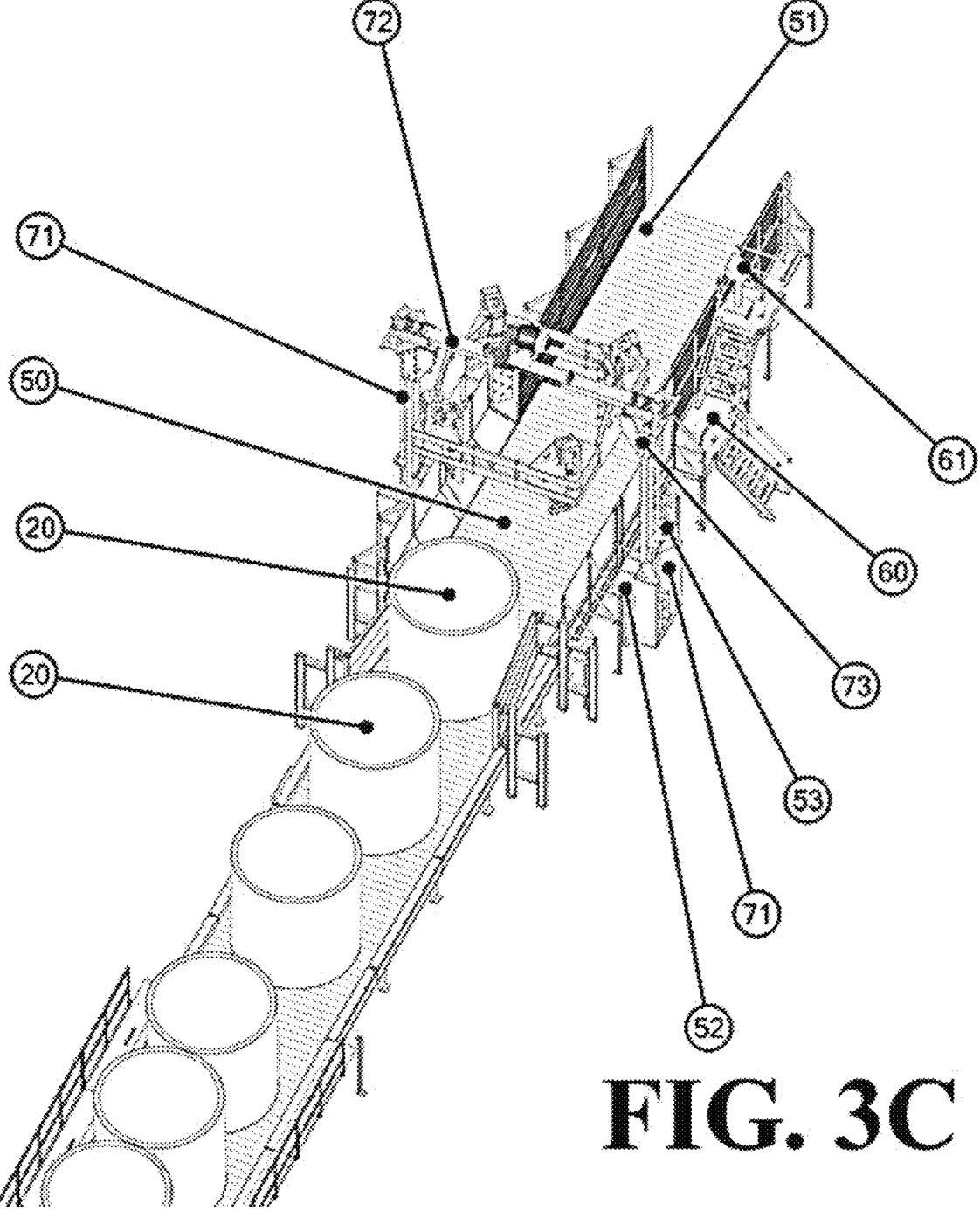
Figure 3D:
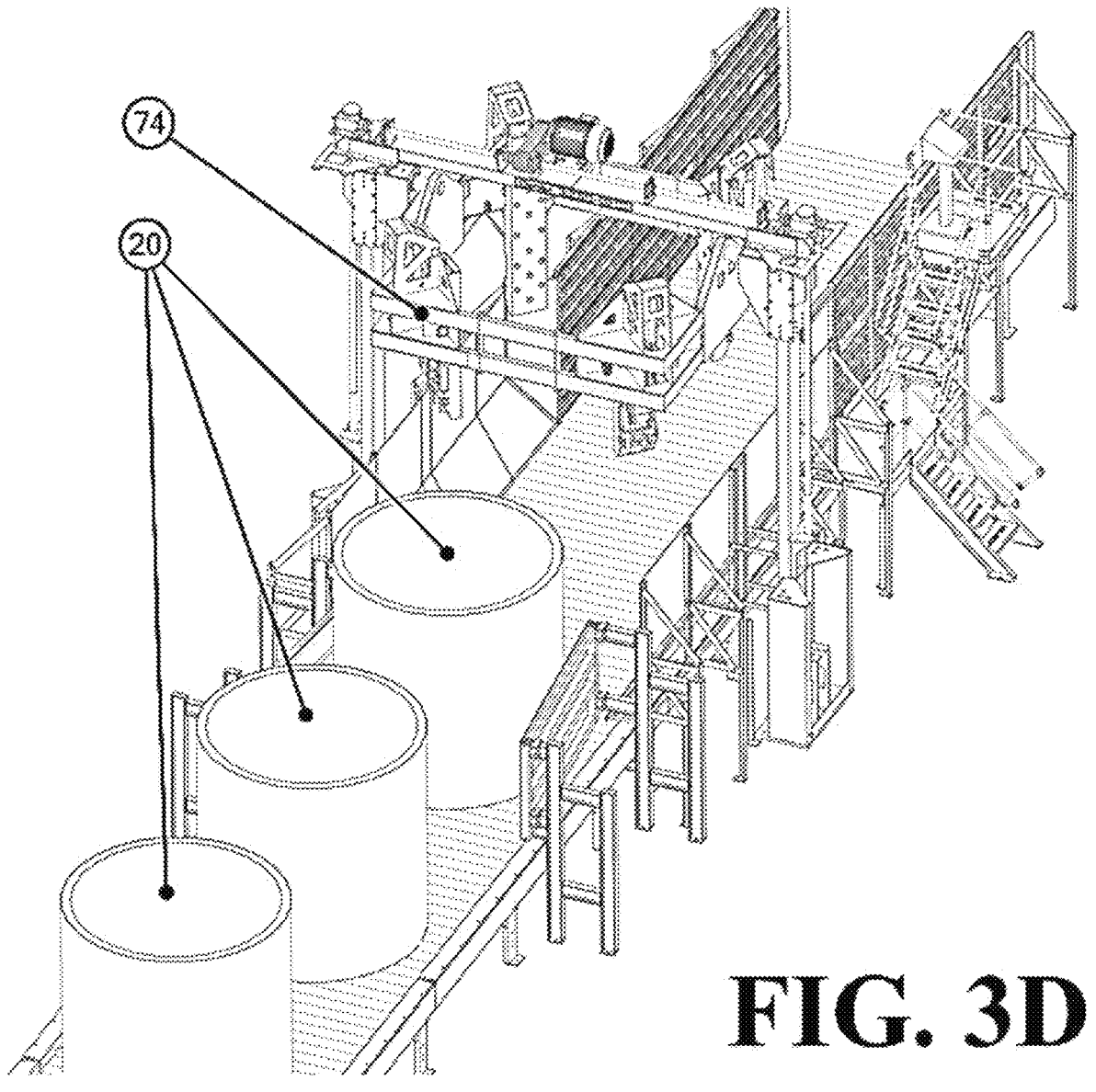
Figure 3E:
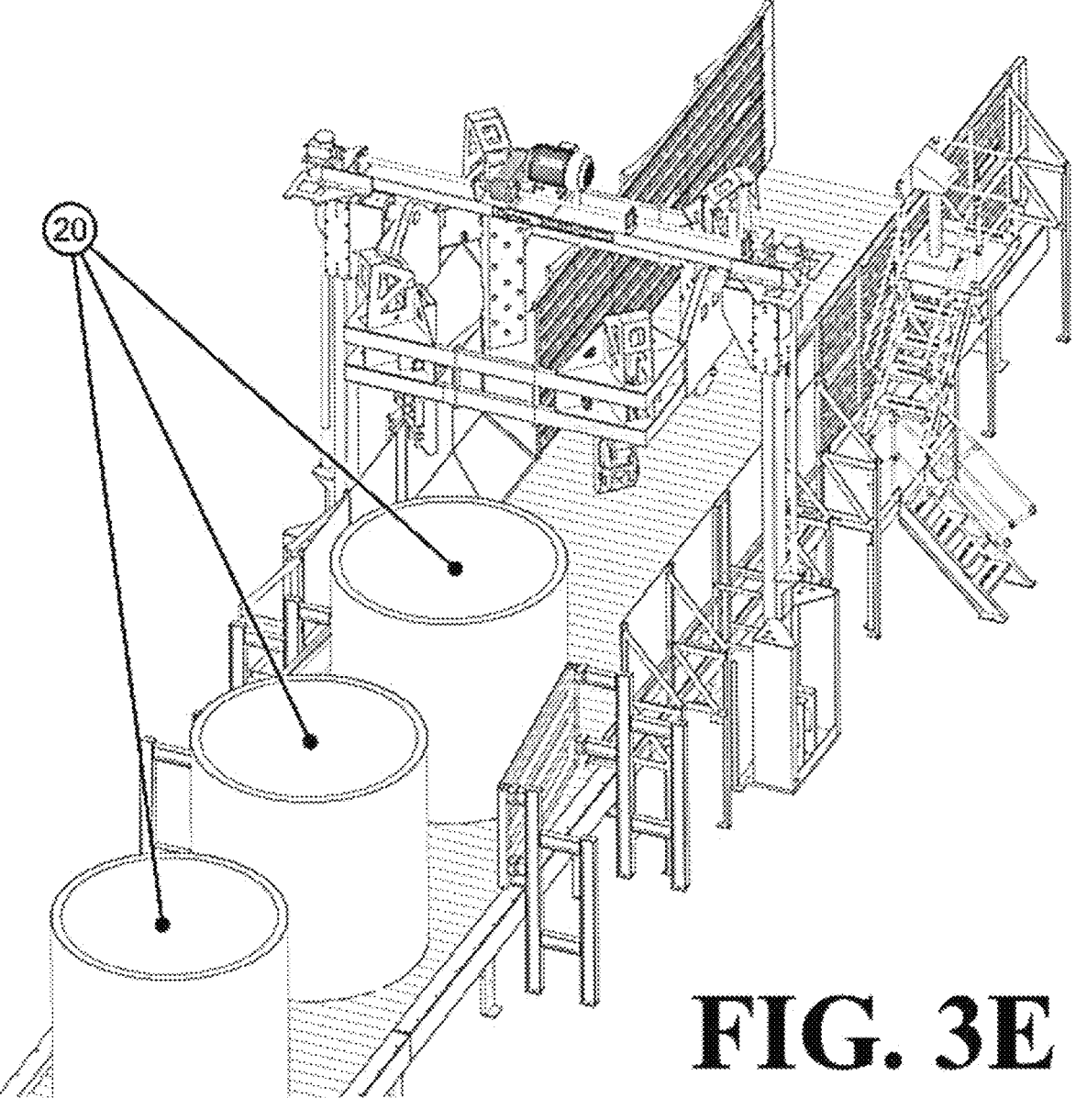
Figure 3F:
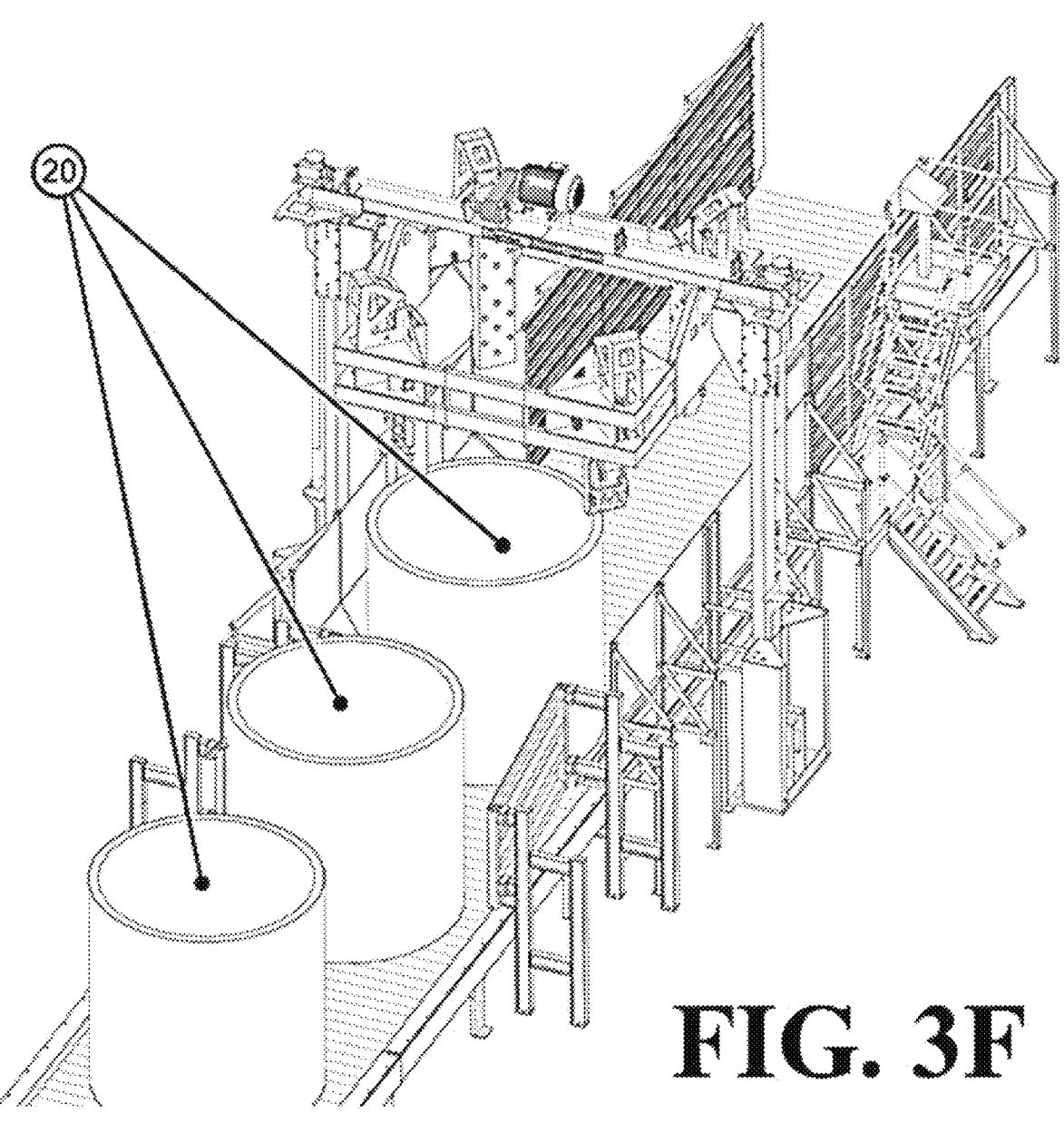
Figure 3G:
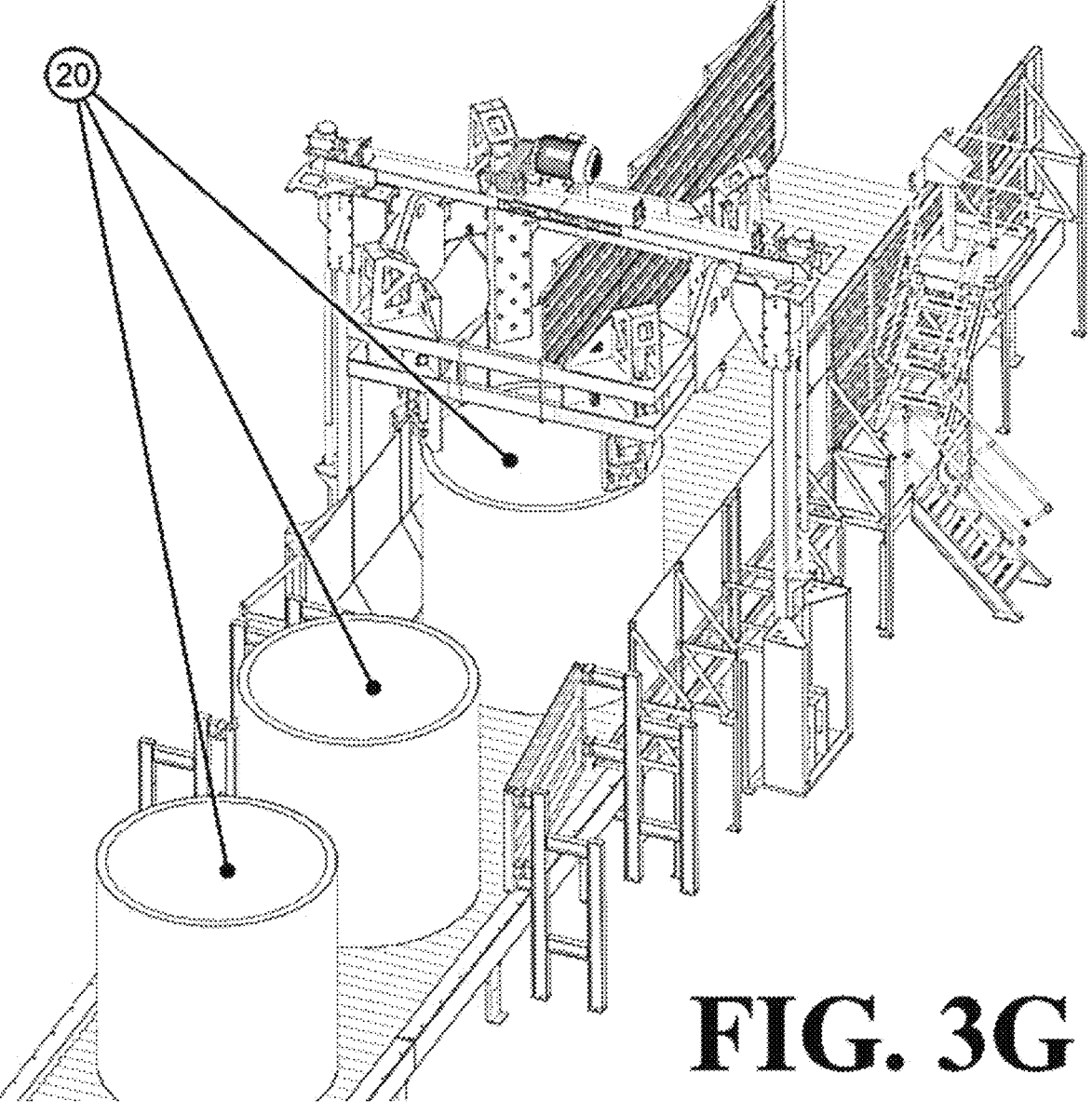
Figure 3H:
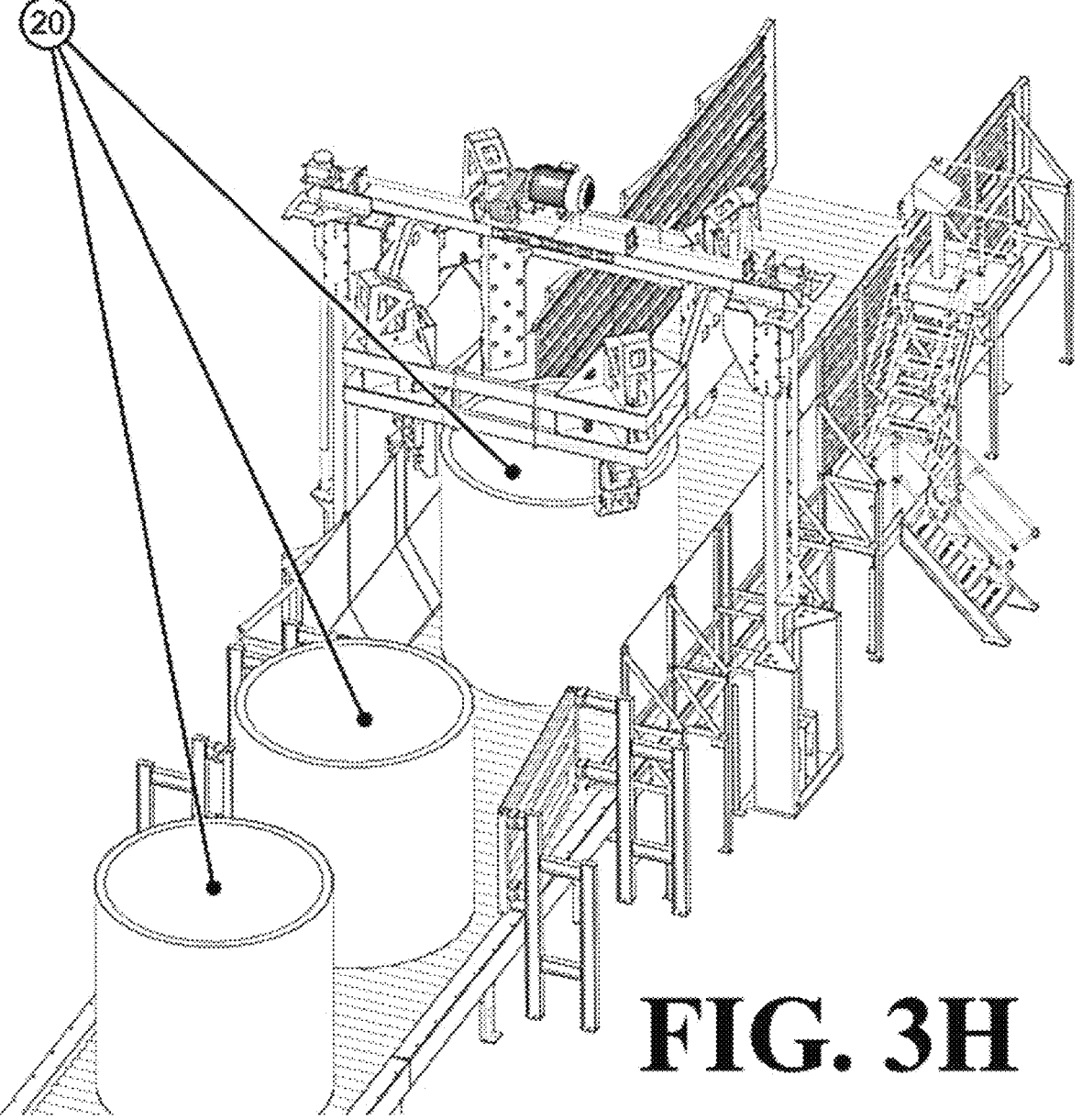
Figure 3I:
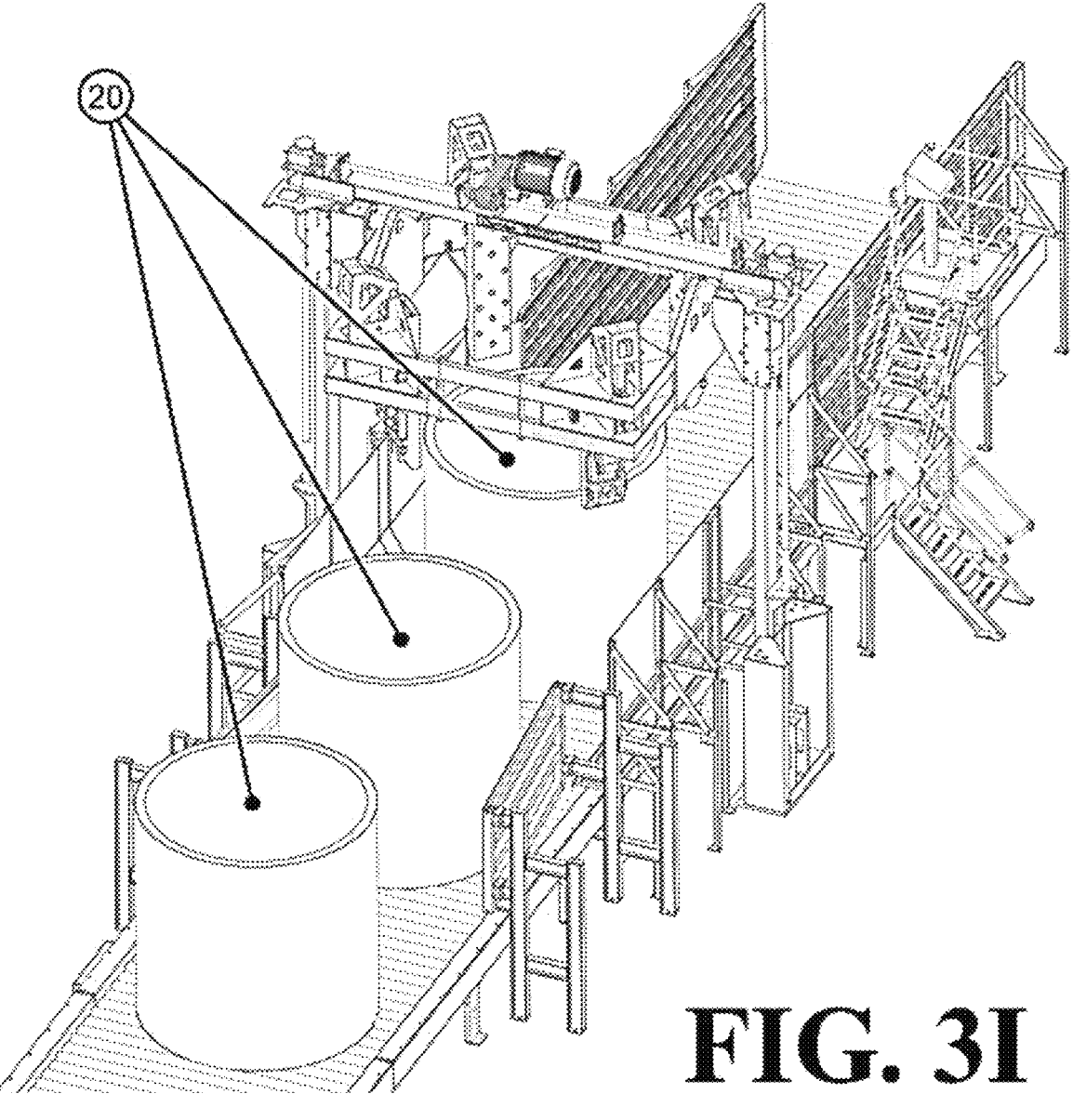
Figure 3J:
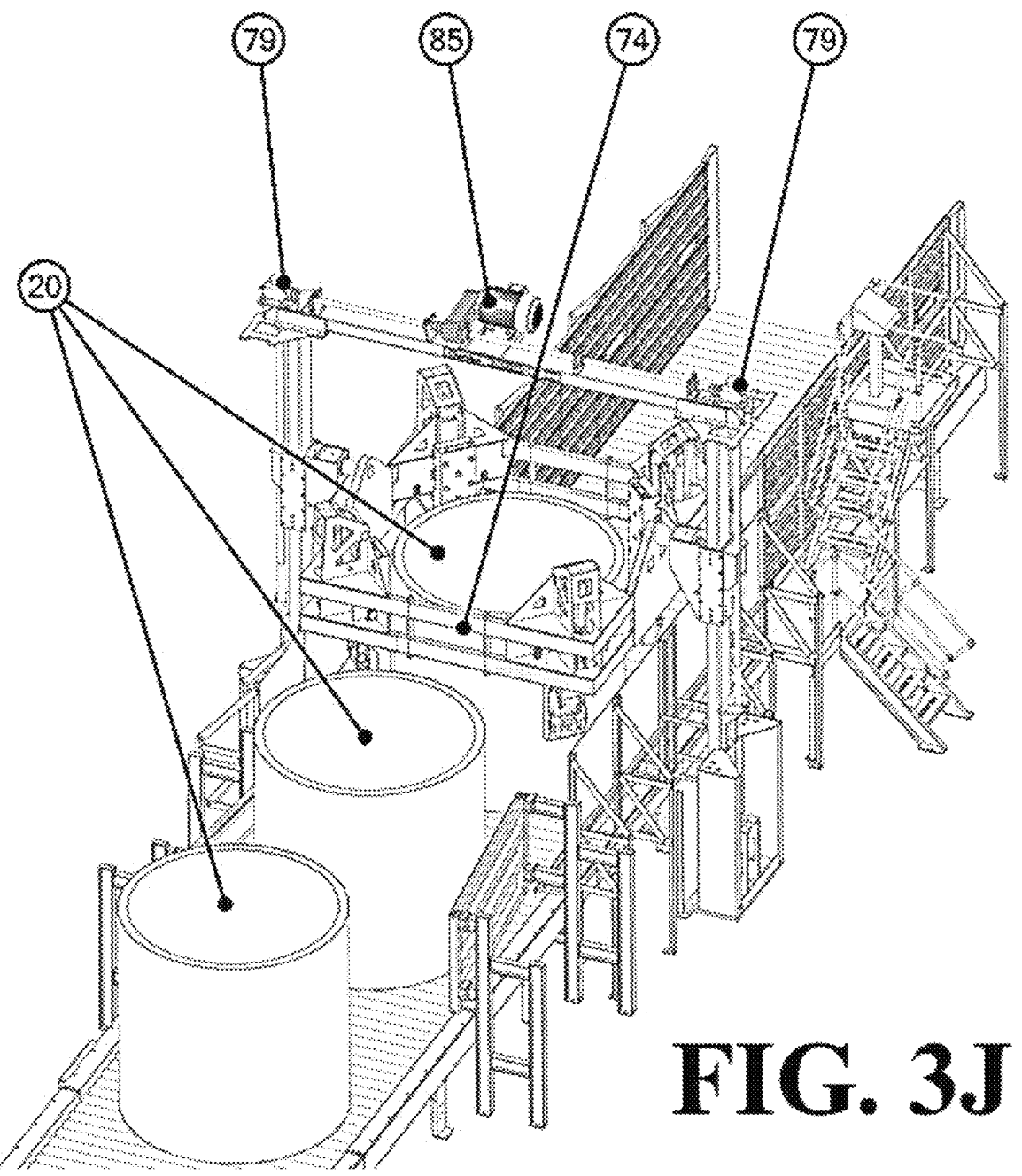
Figure 3K:
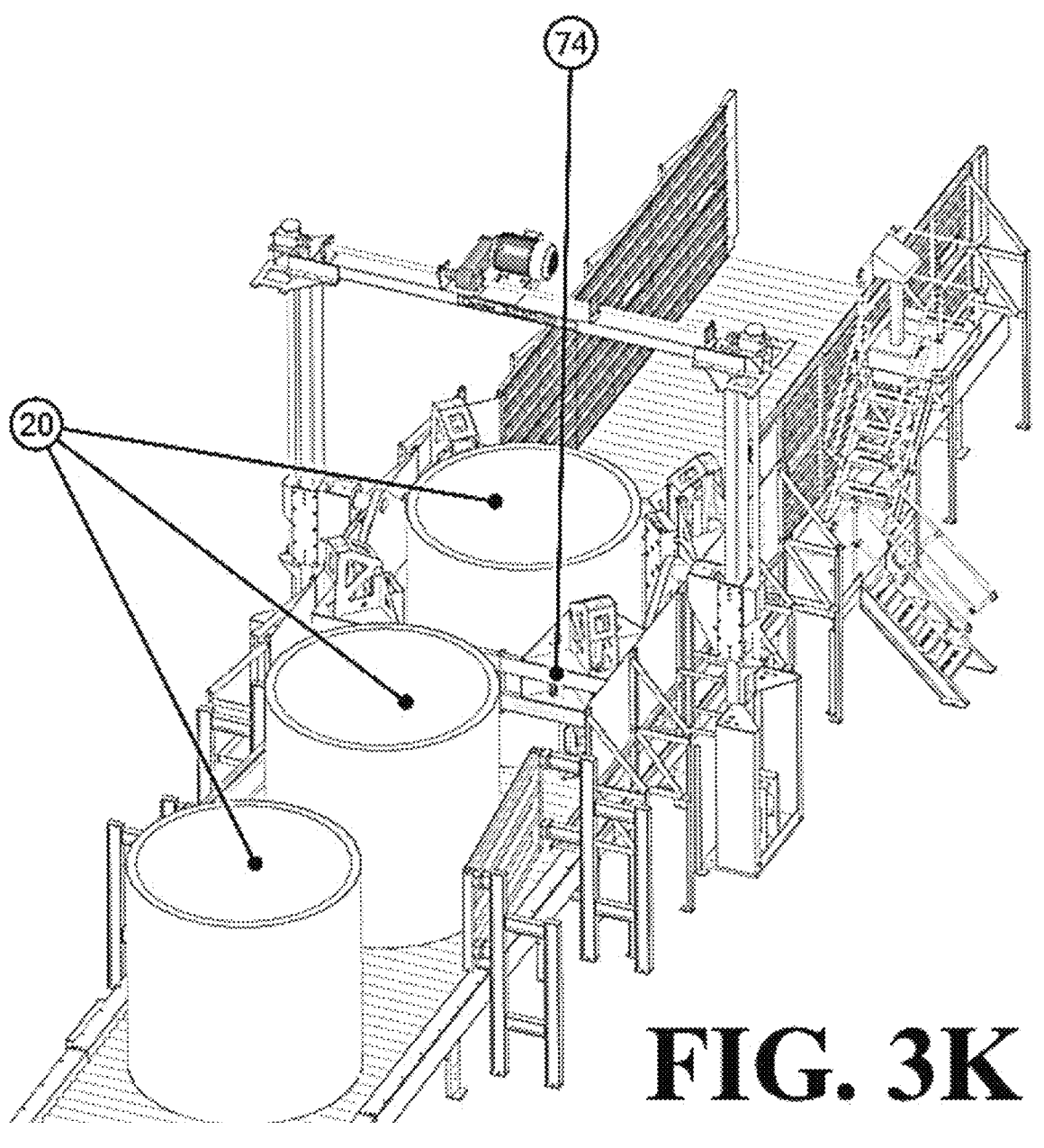
Figure 3L:
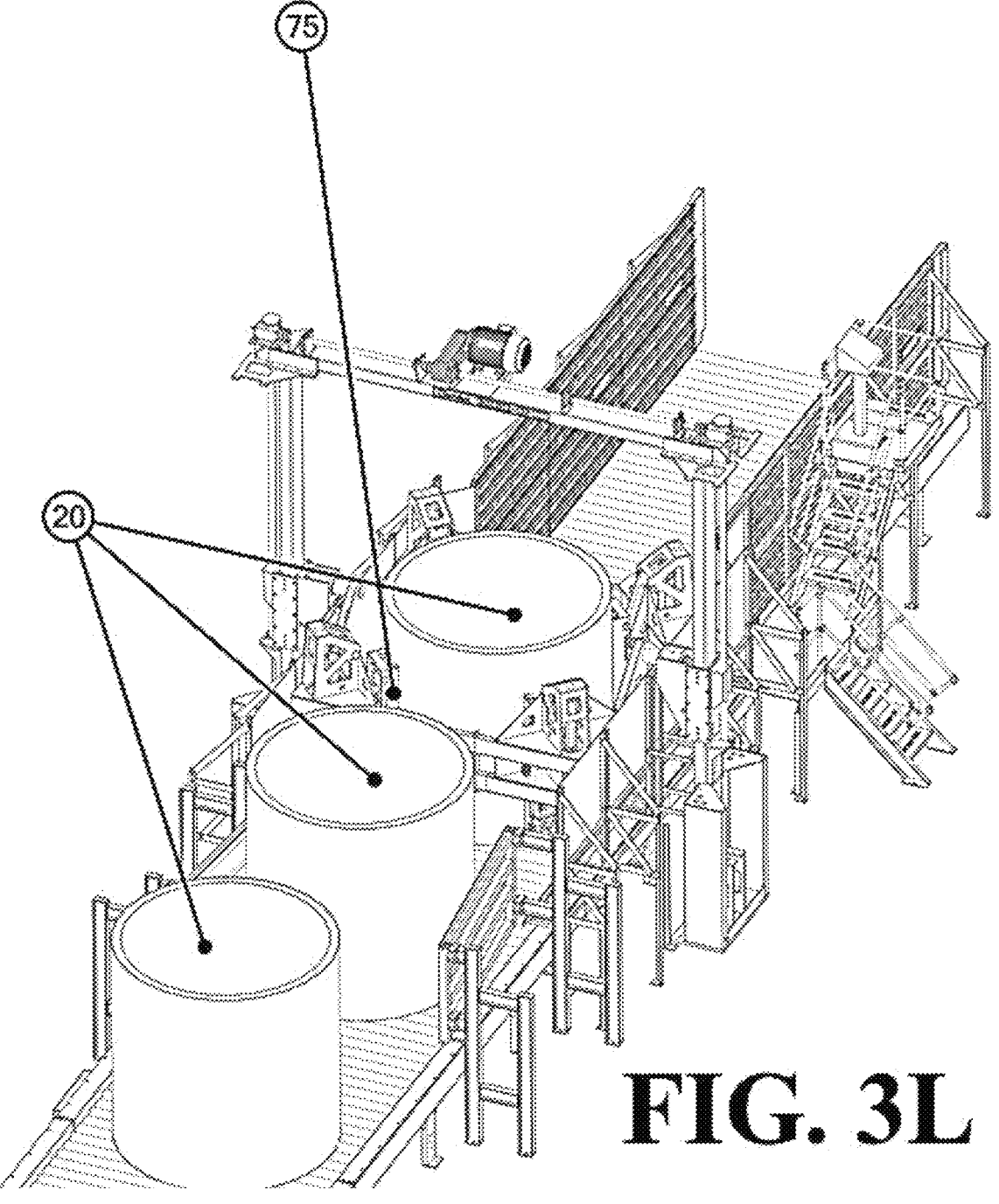
Figure 3M:
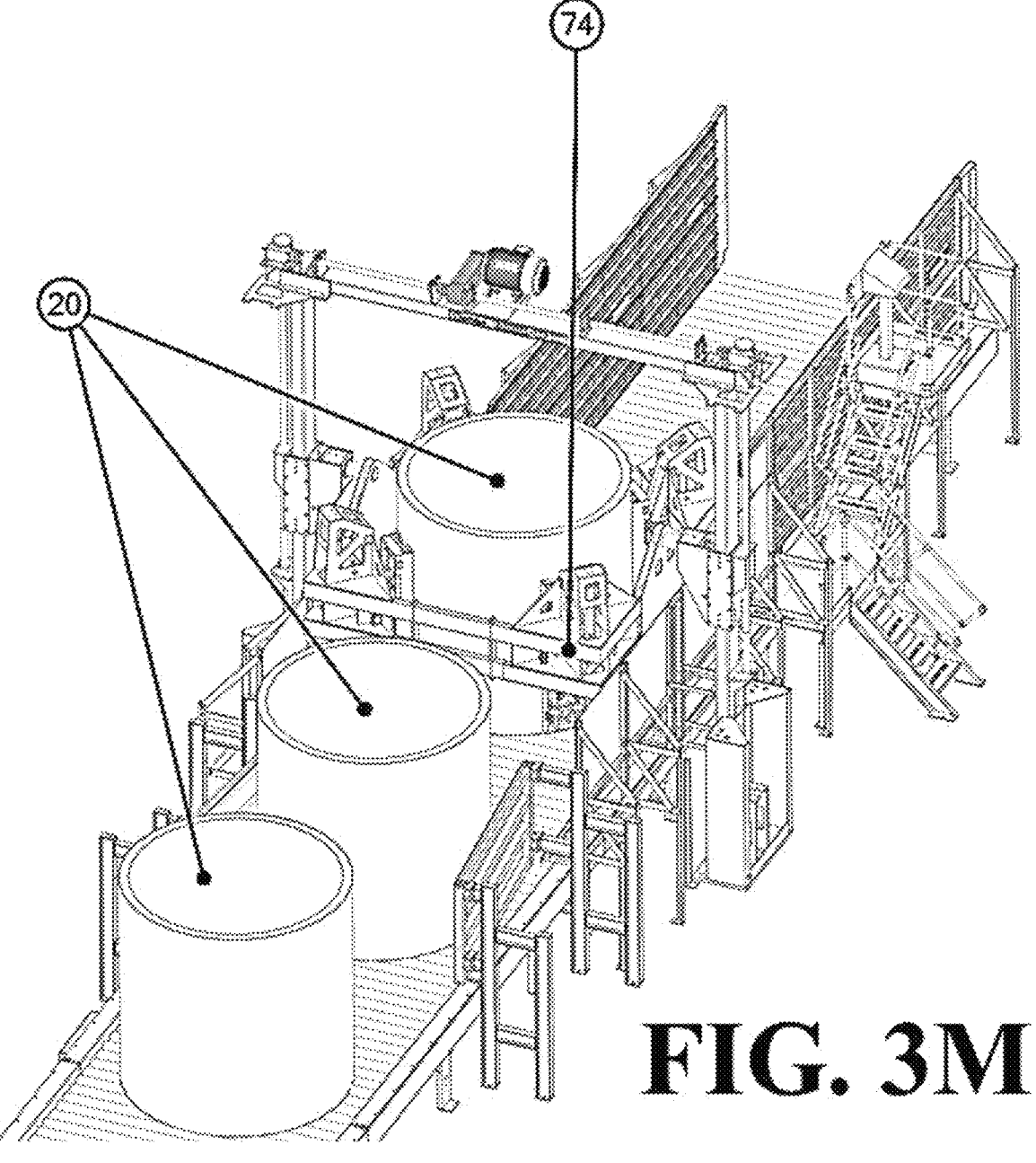
Figure 3N:
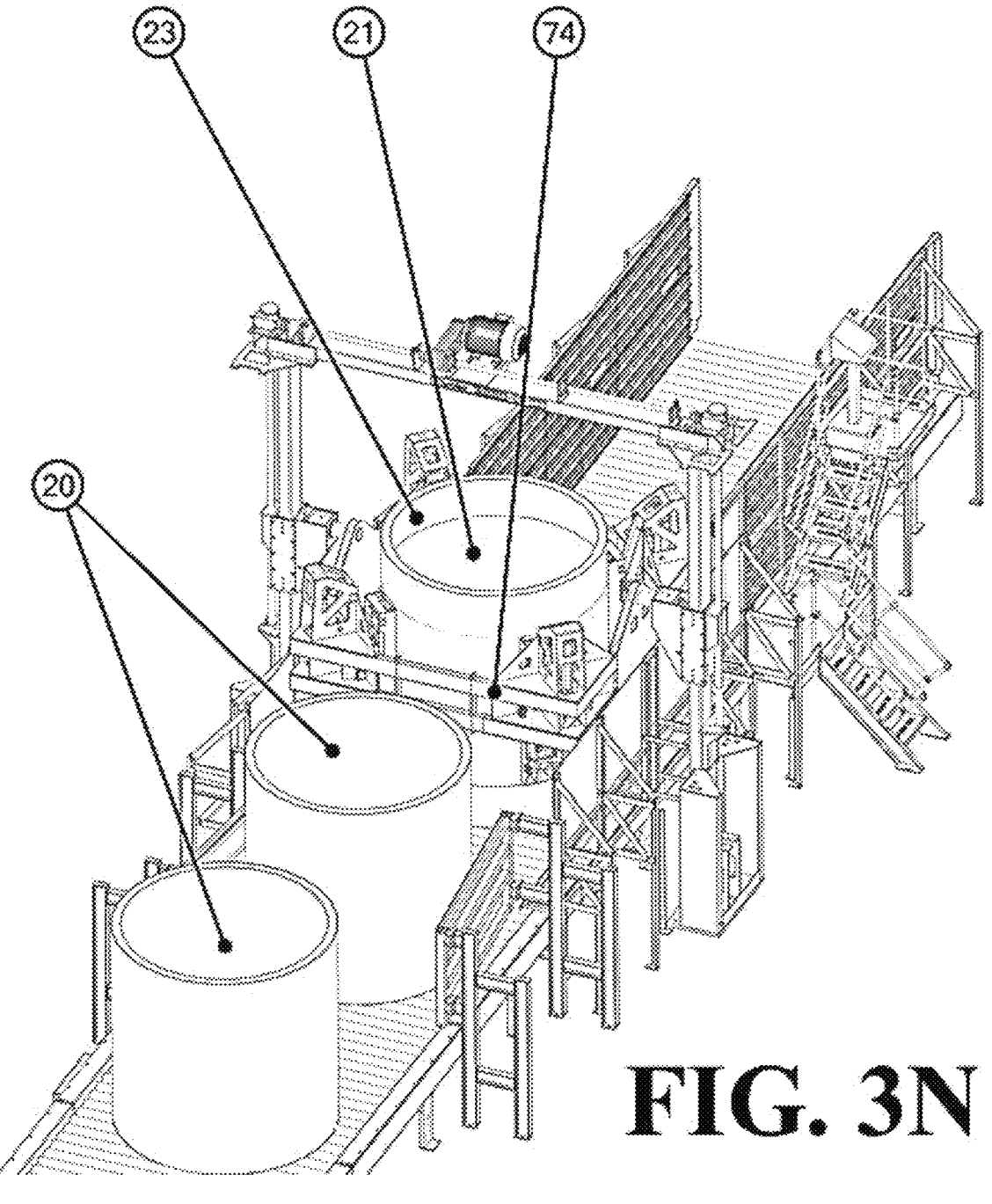
Figure 30:
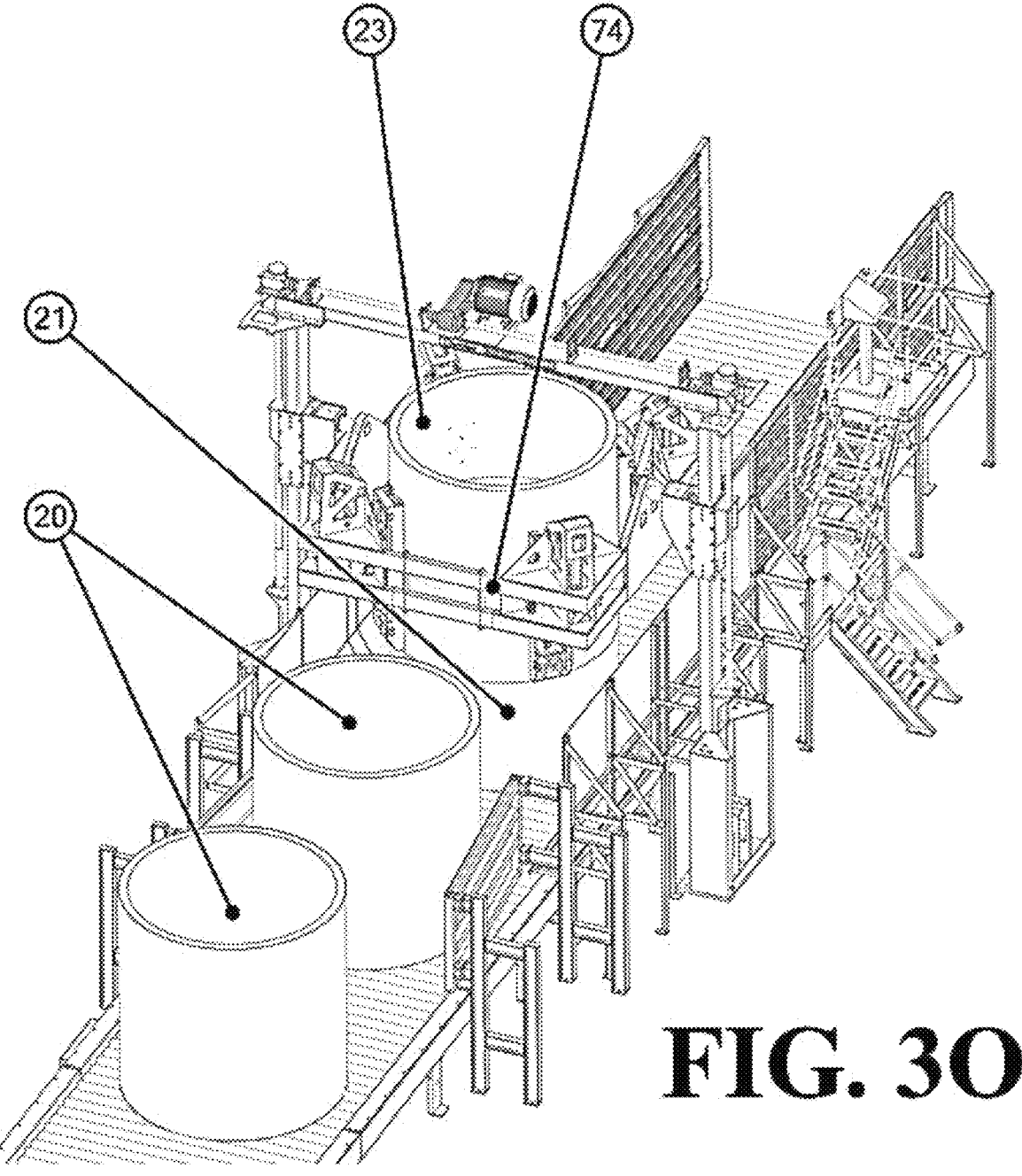
Figure 3P:
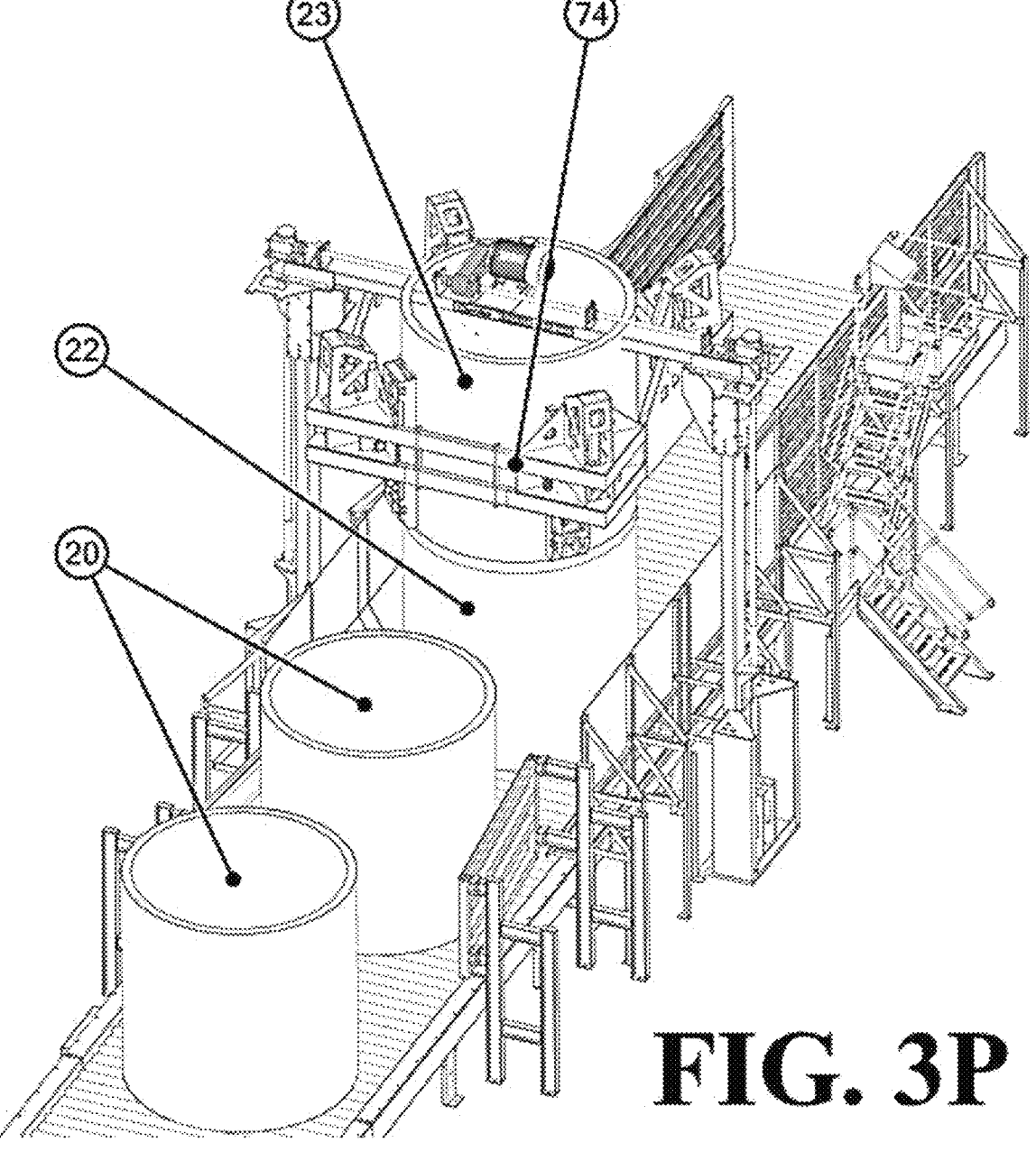
Figure 3Q:
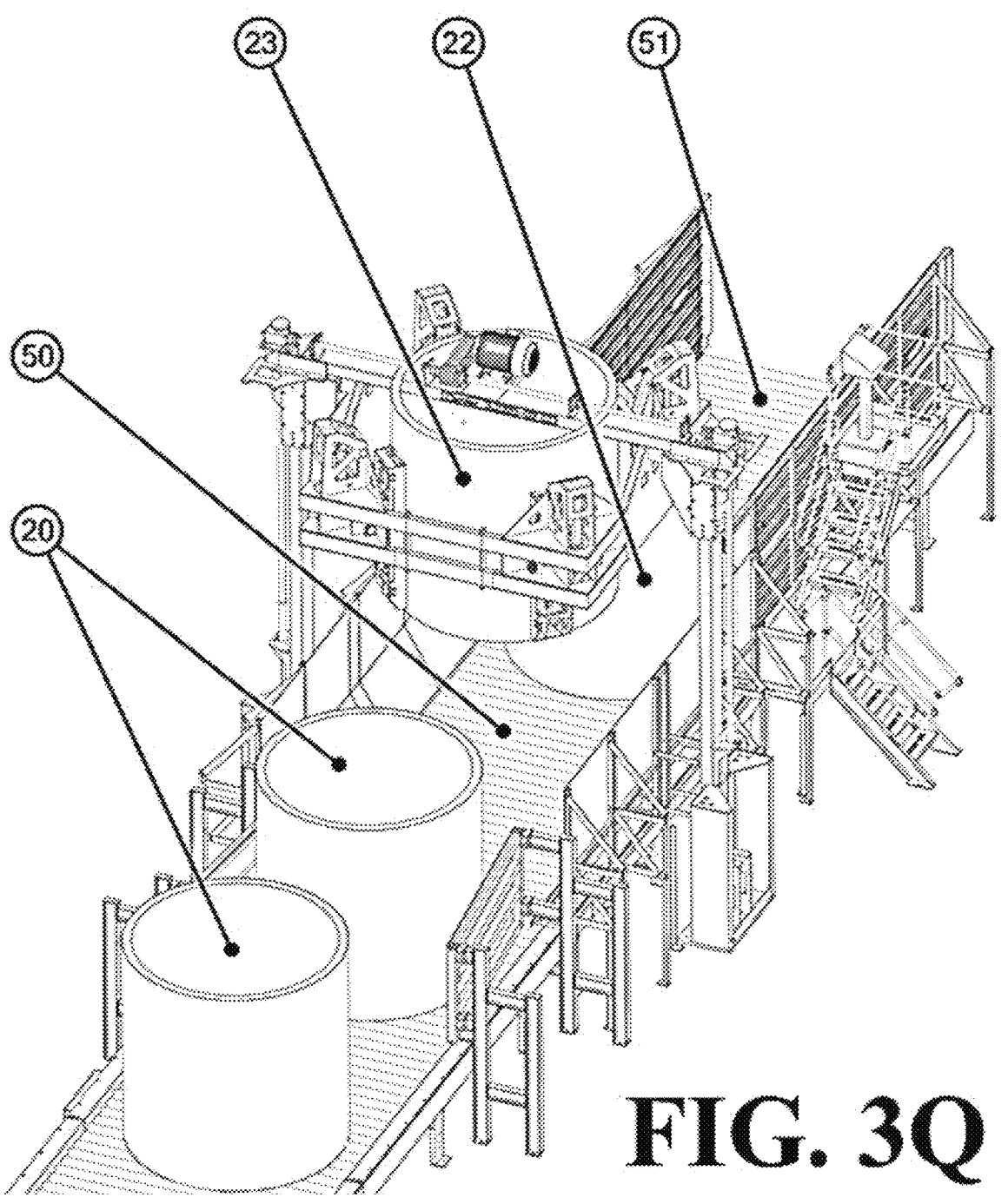
Figure 3R:
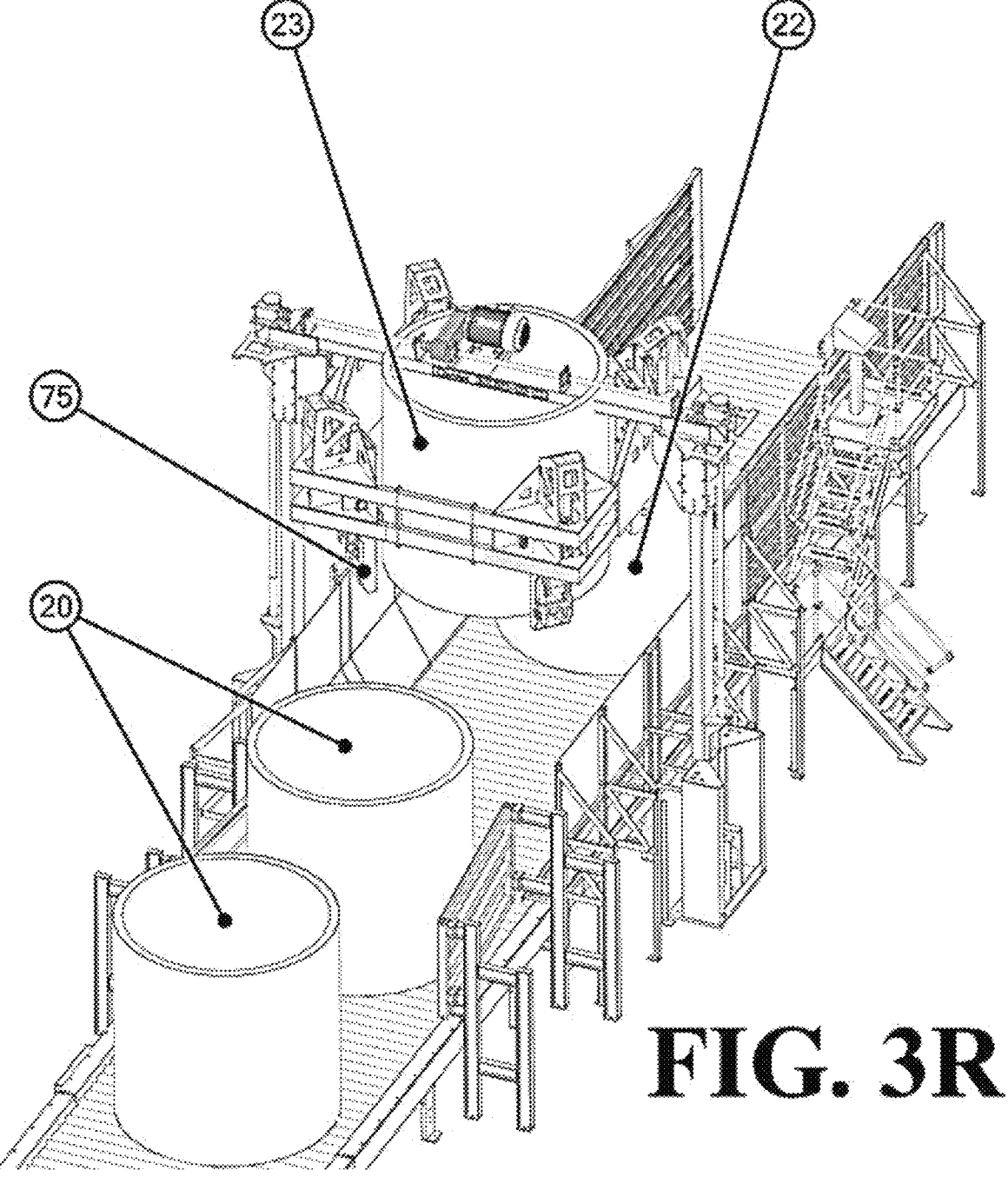
Figure 3S:
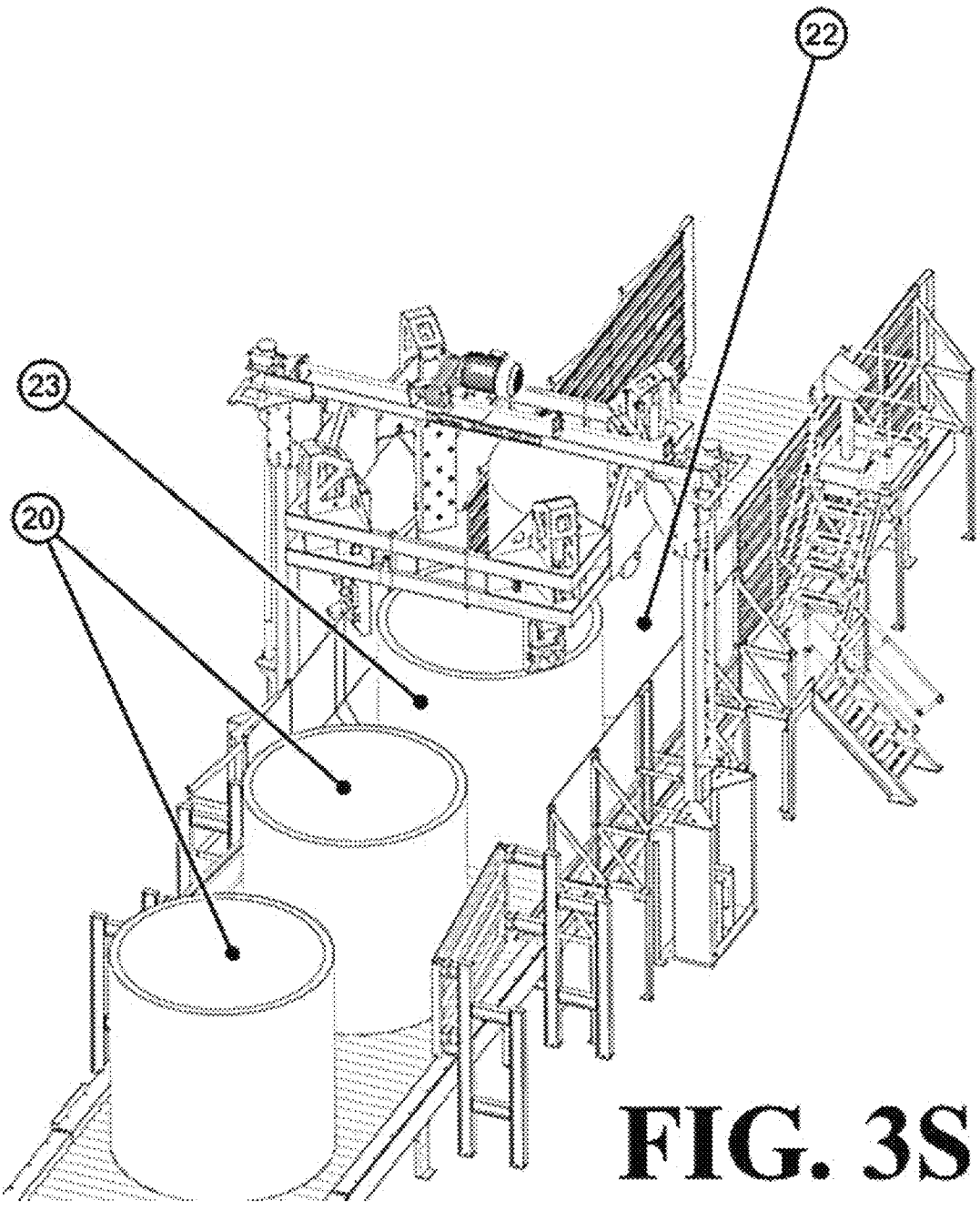
Figure 3T:
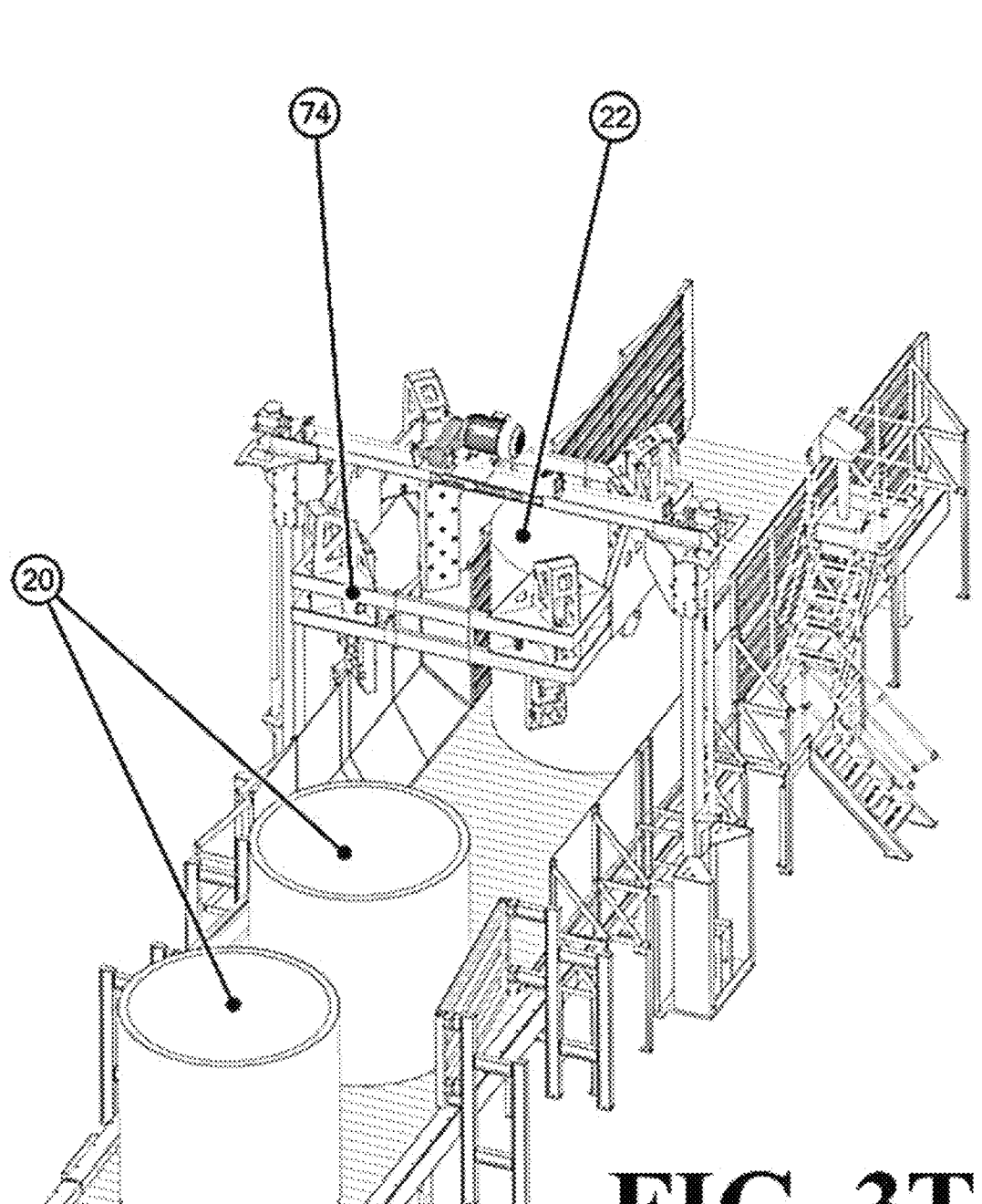

FIGS. 3C through 3T provide isometric views of the exemplary embodiment of the module unwrapping unit (100) performing a cotton module stage and strip sequence. Referring now generally to FIGS. 3C-3T, a plurality of wrapped cotton modules (20) are shown lined up along the intermediate bed conveyor (40) and approaching the unwrapper bed conveyor (50), where the cotton modules (20) will ultimately be unwrapped by the module unwrapping unit (100) and the newly unwrapped cotton may be moved along to a next downstream cotton ginning process by the unwrapped cotton bed conveyor (51). Unwrapped cotton bed conveyor (51) may comprise a conveyor similar to that of the intermediate bed conveyor (40) and unwrapper bed conveyor (50). In FIG. 3C, the first and second unwrapping sensors (52, 53) may be used to detect when a wrapped cotton module (20) is located in a position central to the module unwrapping unit (100). Once here, the signals from sensors (52, 53) are used to automatically stop the movement of wrapped cotton modules (20) along the unwrapping bed conveyor (50). In some embodiments, the operator platform (60) provides access to a set of operator controls (61). In this exemplary embodiment, the main columns (71) and cross beam (72) hold the carriages (73) of the module unwrapping unit (100).

When the frame (74) is vertically raised to a top position, unwrapper bed conveyor (50) functions to move wrapped modules (20) forward into the module unwrapping unit (100). The front-most module (20) is capable of being moved forward into the module unwrapping unit (100), while each of the proceeding modules (20) are also moved forward, such that the next module (20) is staged by the centering walls (42). Once unwrapping sensors (52, 53) sense the module (20) to be in the correct centralized position on the unwrapper bed conveyor (50), the movement of each following cotton module (20) is automatically stopped on the unwrapper bed (50). From this position, the unwrapper drive motor (85) moves the unwrapper drive shaft (86), which turns the ball screw jacks (79), which in turn lowers the unwrapper frame (74) around the centrally-staged, wrapped cotton module (20). In this exemplary embodiment, after the frame (74) is in its lowest operable position and surrounding the wrapped module (20), the clamp pad assemblies (75) are extended away from the frame (74) until they engage the outer wrapped surface of cotton module (20). In the exemplary embodiment, the clamp pad assemblies (75) may comprise a plurality of retractable spikes designed to engage and lift the wrapper positioned around cotton module (20). In some further embodiments, clamp pad assemblies (75) further comprise a plurality of sensors, such as hydraulic pressure sensors or the like, to sense when a sufficient amount of pressure for lifting the cotton module (20) has been applied to the module (20) by the clamp pad assemblies (75). It is known that the size and shape of cotton modules can have significant variance when they are brought in from the cotton fields. Accordingly, the clamp pad assembly sensors in such embodiments help the apparatus and method disclosed herein to account for the various shapes and sizes of cotton modules being processed.

After engaged with the wrapped cotton module (20), the clamp pad assemblies (75) and frame (74) simultaneously move in an upwards direction, towards a top position. As the wrapped cotton module (20) is lifted by the unwrapper frame (74), gravity begins to pull downwards on the cotton (21) contained within the wrap (23). In an exemplary embodiment, the cotton (21) falls downwards and out of the wrap (23) onto the unwrapper bed conveyor (50) as the clamp pad assemblies (75) and frame (74) lift the previously wrapped cotton module (20) upwards. In some embodiments, the positions of the clamp pad assemblies also may be further adjusted to facilitate the removal of cotton (21) from within the wrap (23) of the lifted cotton module (20). The unwrapper frame (74) continues to rise to the top position while all of the previously wrapped cotton (21) is freed from the wrap (23). Once at the top position, as seen in FIGS. 3P-3R, the newly unwrapped cotton (22) falls out of the bottom side of the previously wrapped cotton module (20) and travels from the unwrapper bed conveyor (50) to and along the unwrapped cotton bed conveyor (51), and ultimately towards a next downstream cotton ginning process, if any. Thereafter, the clamp pad assemblies (75) are relaxed (e.g., their applied pressure is reduced or removed), allowing for the removal of the wrap (23). In some embodiments, an automatic system may be provided for removal of the removed wrap (23). Next, the frame (74) is moved to the top position and the next wrapped cotton module (20) is staged within the module unwrapping unit (100), and the previously disclosed module unwrapping process begins again.

Figure 4A:
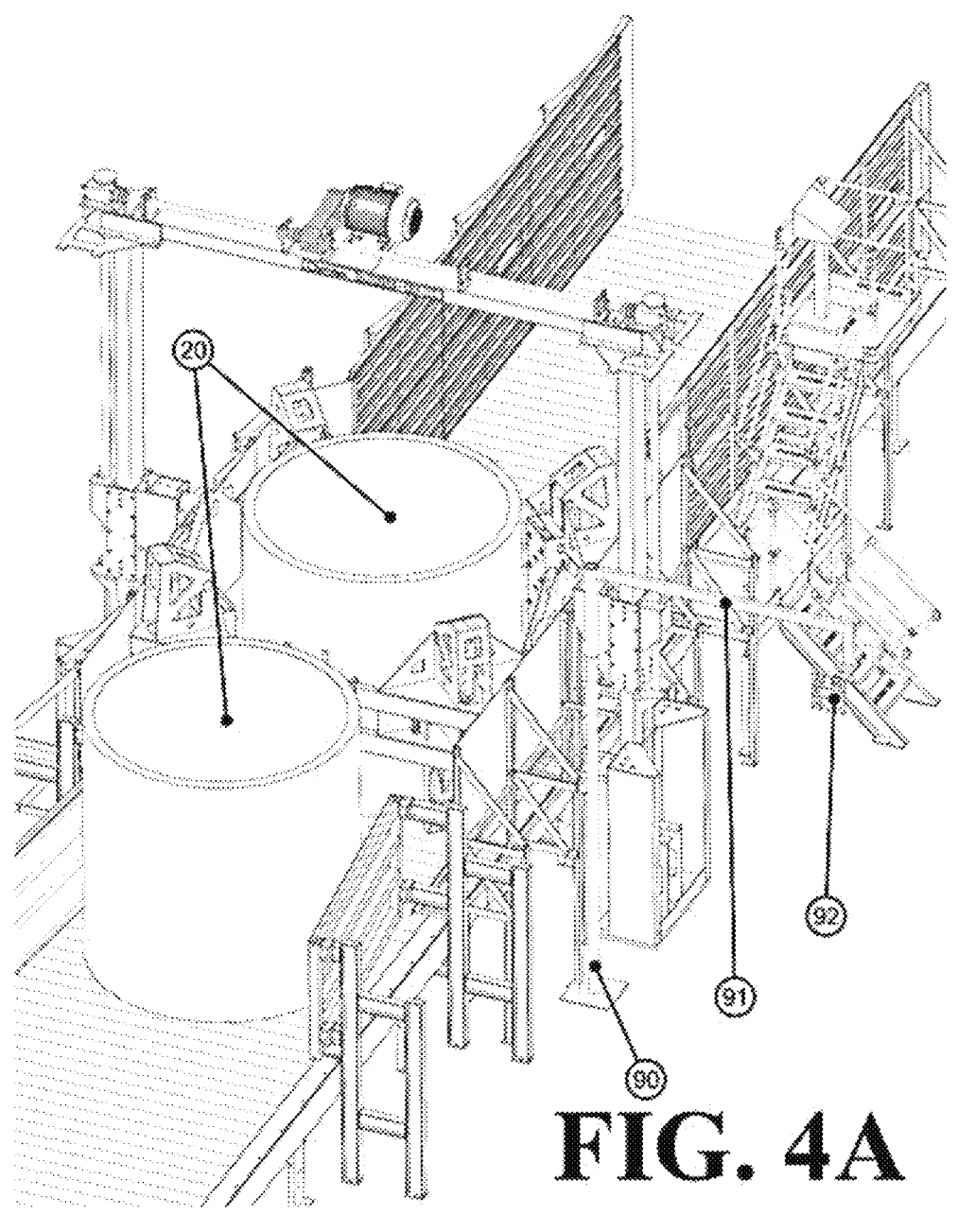
FIGS. 4A-4G are a sequence of exemplary isometric views of a cotton module wrap disposal sequence, in accordance with a first exemplary embodiment of the present disclosure.
Figure 4B:
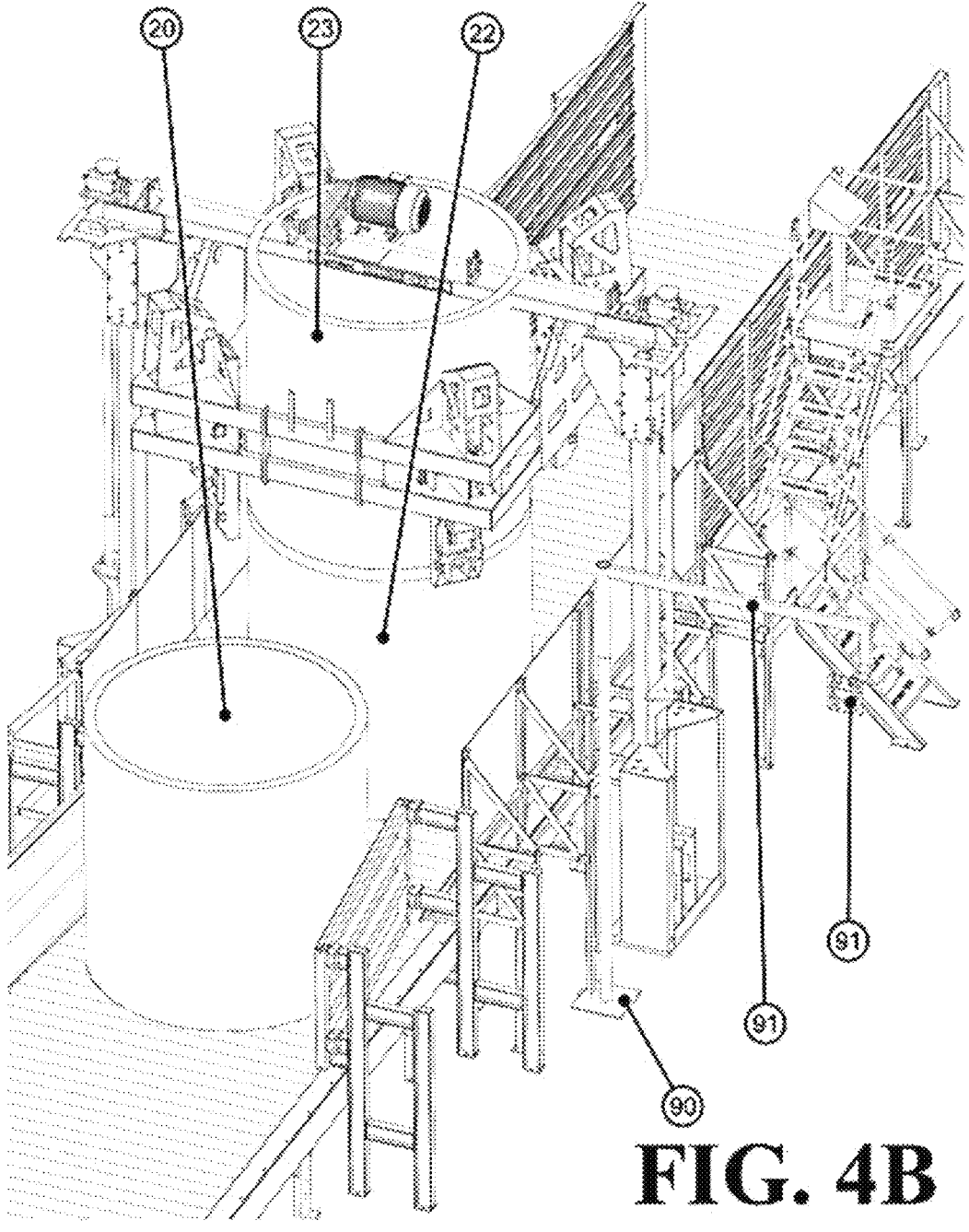

FIGS. 4A-4G are a series of isometric views of an exemplary cotton module wrap disposal sequence in accordance with a certain exemplary embodiment of the present disclosure. FIG. 4A shows a wrapped cotton module (20) that is in a position to be unwrapped. In this exemplary embodiment of a cotton module wrap disposal sequence, the wrap disposal base column (90), a wrap disposal rotating arm (91), and a wrap disposal grip (92) may start in a beginning or clear position. FIG. 4B shows a second cotton module (20) waiting to be positioned within the module unwrapping unit (100) while the front cotton module (20) has been unwrapped and the newly unwrapped cotton (22) has fallen down to the unwrapper bed conveyor (50).

Figure 4C:
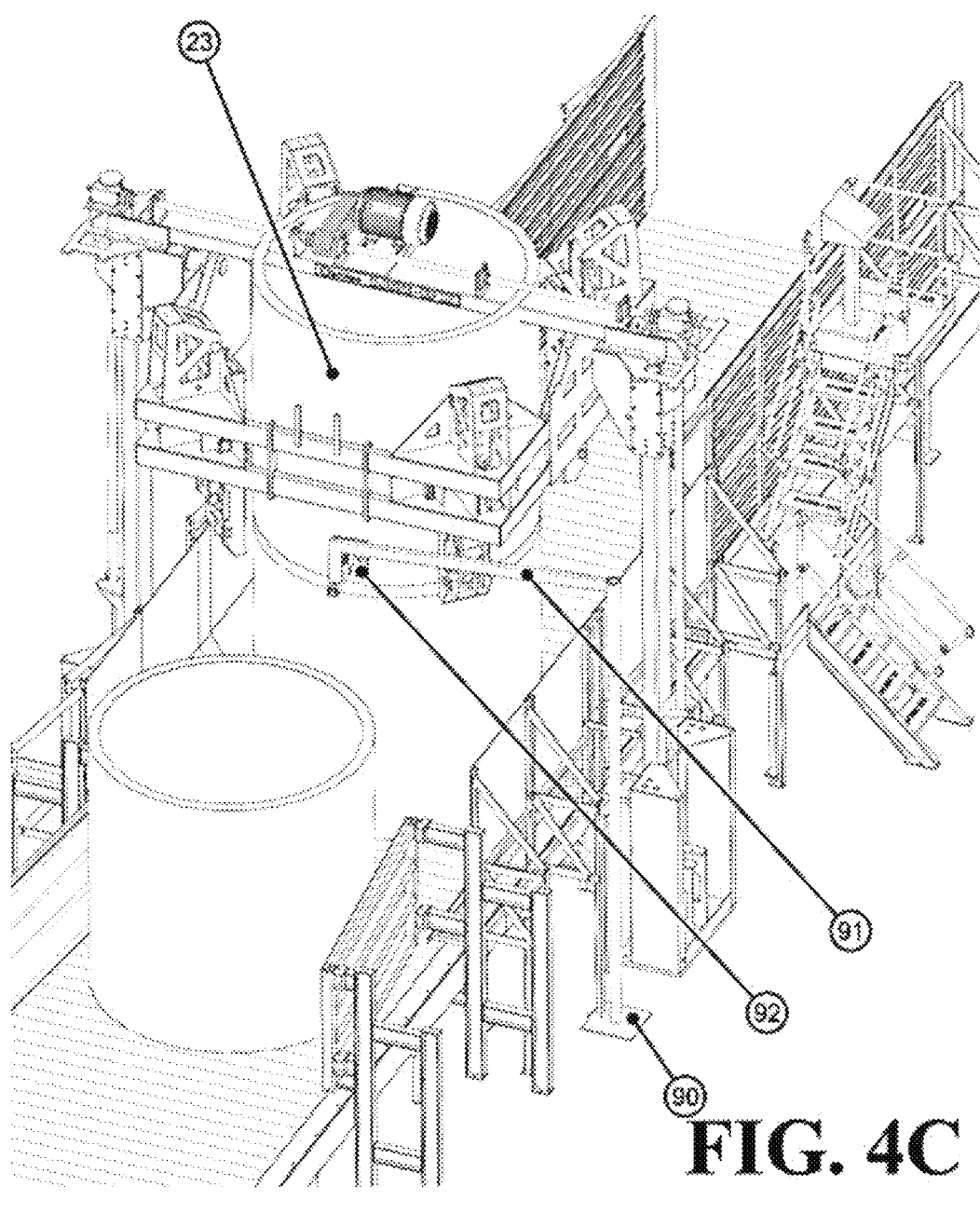
Figure 4D:
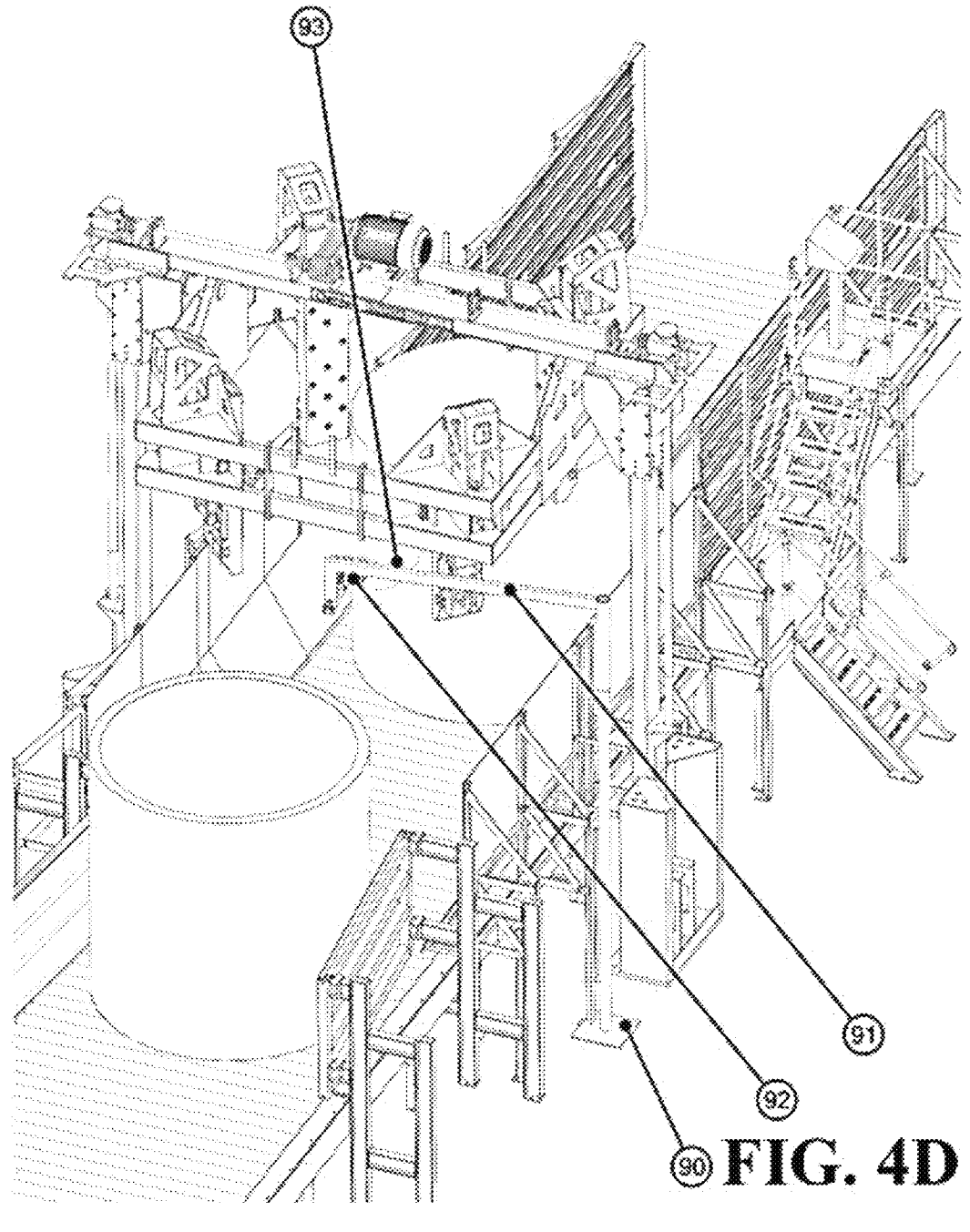
Figure 4E:
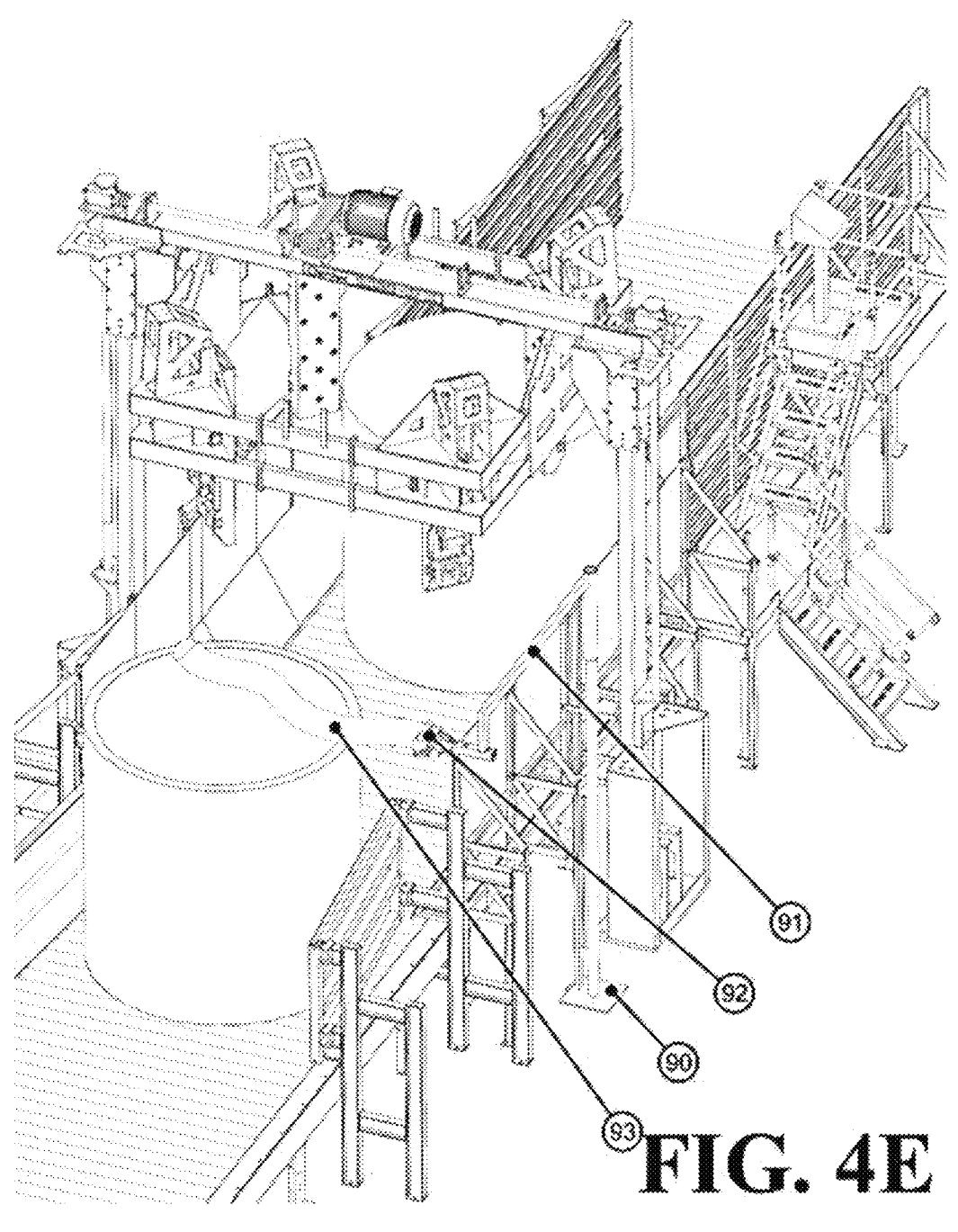

In FIG. 4C, the wrap disposal rotating arm (91) may be rotated about the wrap disposal base column (90) to a point where the wrap disposal grip (92) has contacted the module wrap (23) that has been separated from the previously wrapped cotton (21). Next, FIG. 4D shows the wrap disposal grip (92) holding the cotton-module wrap (93) that has been removed from the cotton module (20) after the wrap (93) has collapsed or otherwise changed shape after being released from the clamp pad assemblies (75) of the unwrapper frame (74) and after the wrap (93) has been grasped or otherwise secured by the wrap disposal grip (92). The wrap disposal rotating arm (91) is connected to and supported by the wrap disposal base column (90). FIG. 4E shows an exemplary embodiment of the wrap disposal arm (91) rotating about the wrap disposal base column (90). With this rotation, the wrap disposal grip (92) is pulling the module wrap (93) away from the module unwrapping unit (100).

Figure 4F:
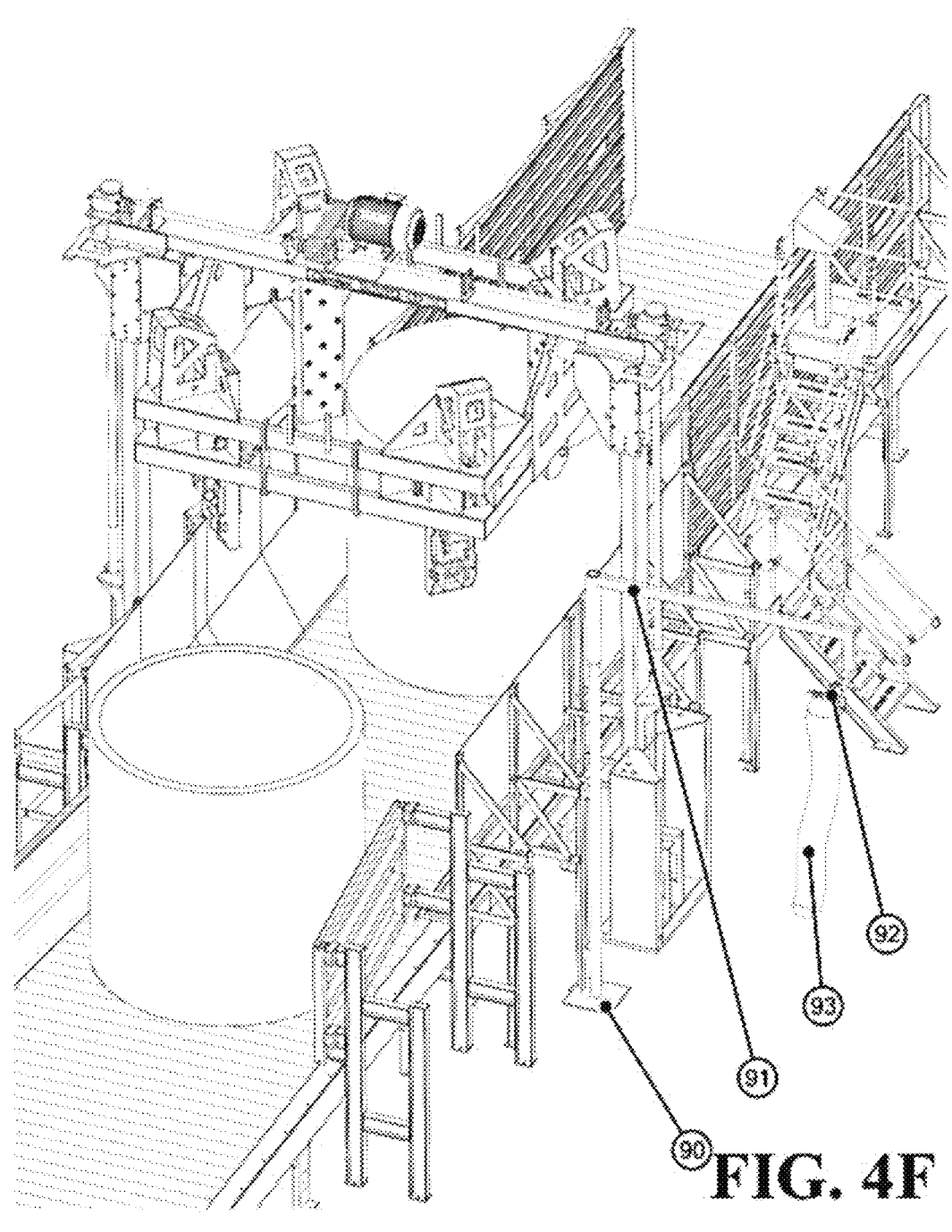
Figure 4G:
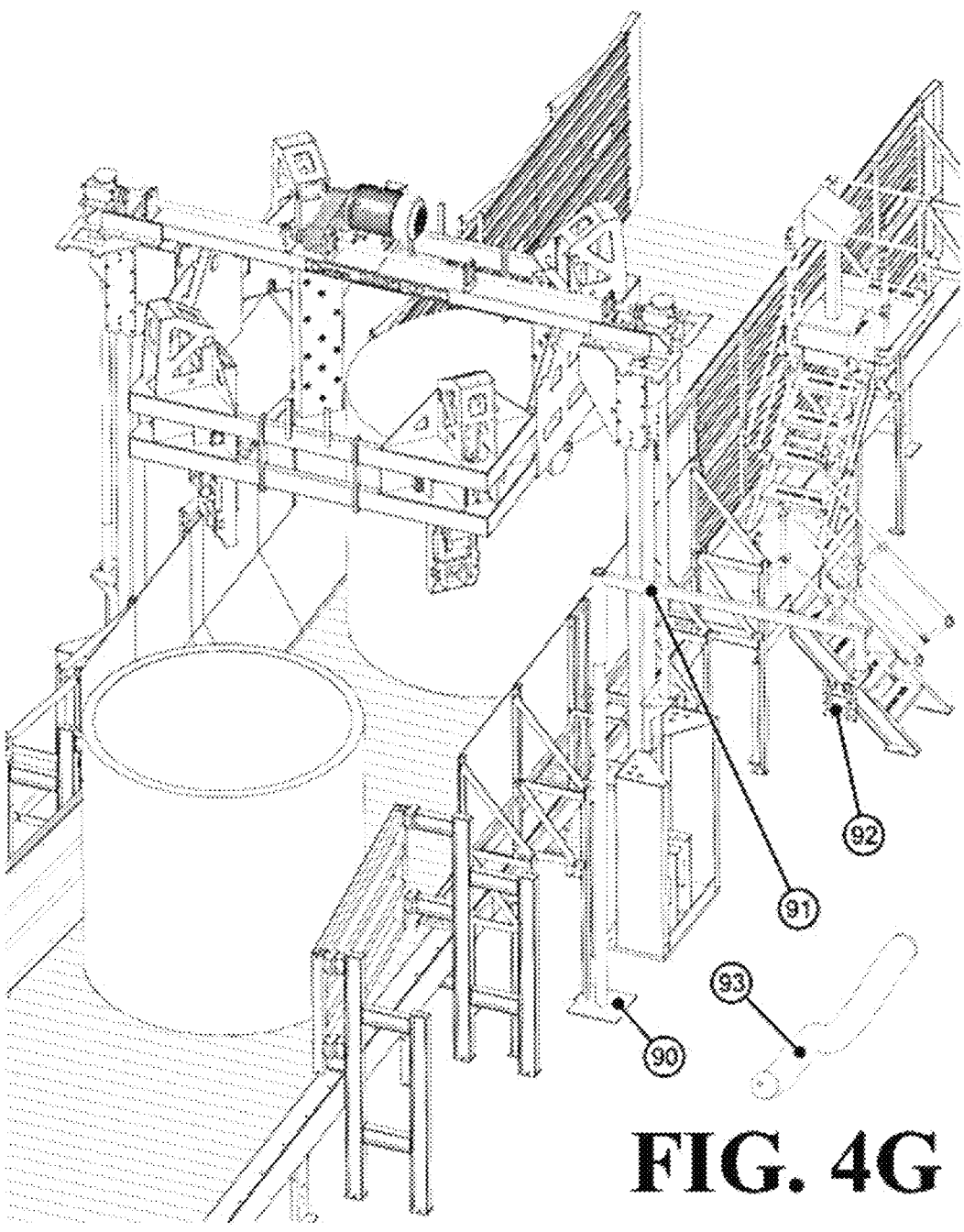

In FIG. 4F, the module wrap (93) is shown hanging from the wrap disposal grip (92). At this point, the wrap disposal rotating arm (91) has rotated about the wrap disposal base column (90) back to the starting position of the wrap disposal sequence seen in FIGS. 4A and 4B. Next, FIG. 4G shows the wrap disposal base column (90) and the wrap disposal rotating arm (91) at the start position. In this figure, the wrap disposal grip (92) has released the module wrap (93). After being released by the wrap disposal grip (92) in the start position, the removed wrap (93) can either be fed directly into a machine, such as a baler, or dropped on the floor for manual disposal.

FIGS. 5A-5G illustrate various perspective views of a wrap disposal unit (110) that may be used to dispose of a cotton-module wrap following removal by the module unwrapping unit, in another exemplary embodiment. In this exemplary embodiment, the wrap disposal unit (110) may comprise a wrap disposal arm (120) that is extendable and retractable by moving it toward and away from the module unwrapping unit (100), a wrap winding unit (130) configured to bundle a removed wrap, and a tramper (140) for expelling the bundled wrap to an area for disposal, such as a wrap disposal chute (150). In this exemplary embodiment, the wrap disposal unit (110) may be positioned proximate to the module unwrapping unit (100), and in an exemplary embodiment to a side of the module unwrapping unit (100), such that the wrap disposal arm (12) can extend into module unwrapping unit (100) in a horizontal direction to retrieve the removed wrap. As further illustrated in FIGS. 5A-5G, the various elements of the wrap disposal unit (110) can be operatively coupled to one or more controls (160) that may be executed by an operator.

Figure 5A:
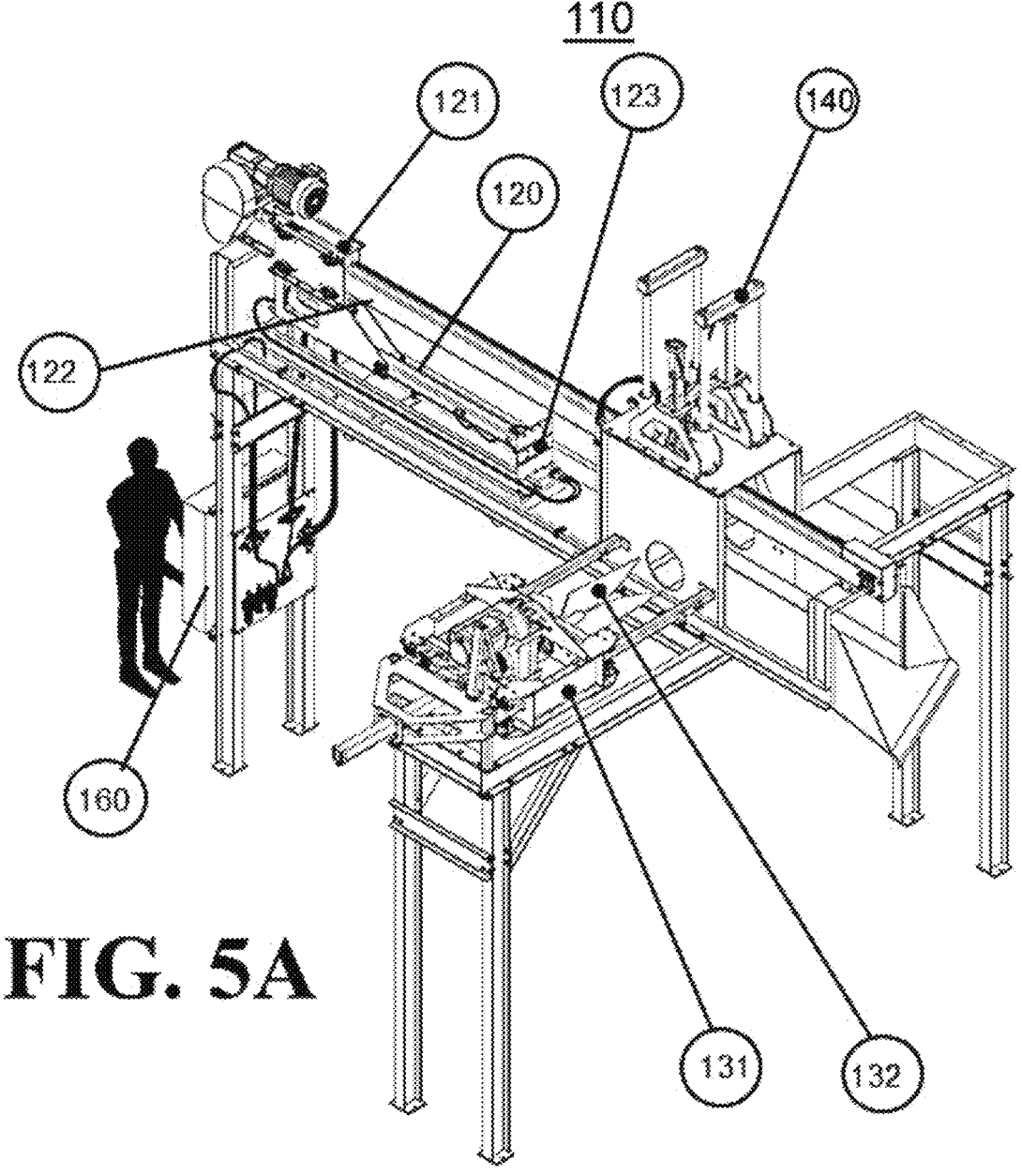
FIGS. 5A-5G are a sequence of perspective views depicting a wrap disposal unit and wrap disposal sequence for retrieving a removed wrap from the module unwrapping unit and disposing of it, in accordance with a second exemplary embodiment of the present disclosure.

As illustrated in FIG. 5A, wrap disposal arm (120) can be coupled to a trolley (121). Trolley (121) can be propelled along a track (122) in order to extend and retract wrap disposal arm (120) into a desired position during the wrap disposal sequence. Wrap disposal arm (120) may further comprise a gripper (123), which can be opened and closed in order to grip onto a removed wrap within the module unwrapping unit (100).

Additionally, as illustrated in FIG. 5A, a wrap winding unit (130) may comprise a winder carriage (131) coupled to a winder paddle (132). The winder carriage (131) is configured extend, retract, and rotate winder paddle (132) in order to bundle a wrap as discussed in greater detail with respect to FIGS. 6A and 6B.

In FIG. 5A, illustrates the exemplary wrap disposal unit (110) in a home or start position ready to retrieve a wrap from the module unwrapping unit (100) where the wrap disposal arm (120) and trolley (121) are in a fully retracted position, the gripper (123) of wrap disposal arm (120) is in an open position, the winder carriage (131) is fully retracted such that the winder paddle (132) is in a home or start position, and a tramper (140) is in a top position.

Figure 5B:
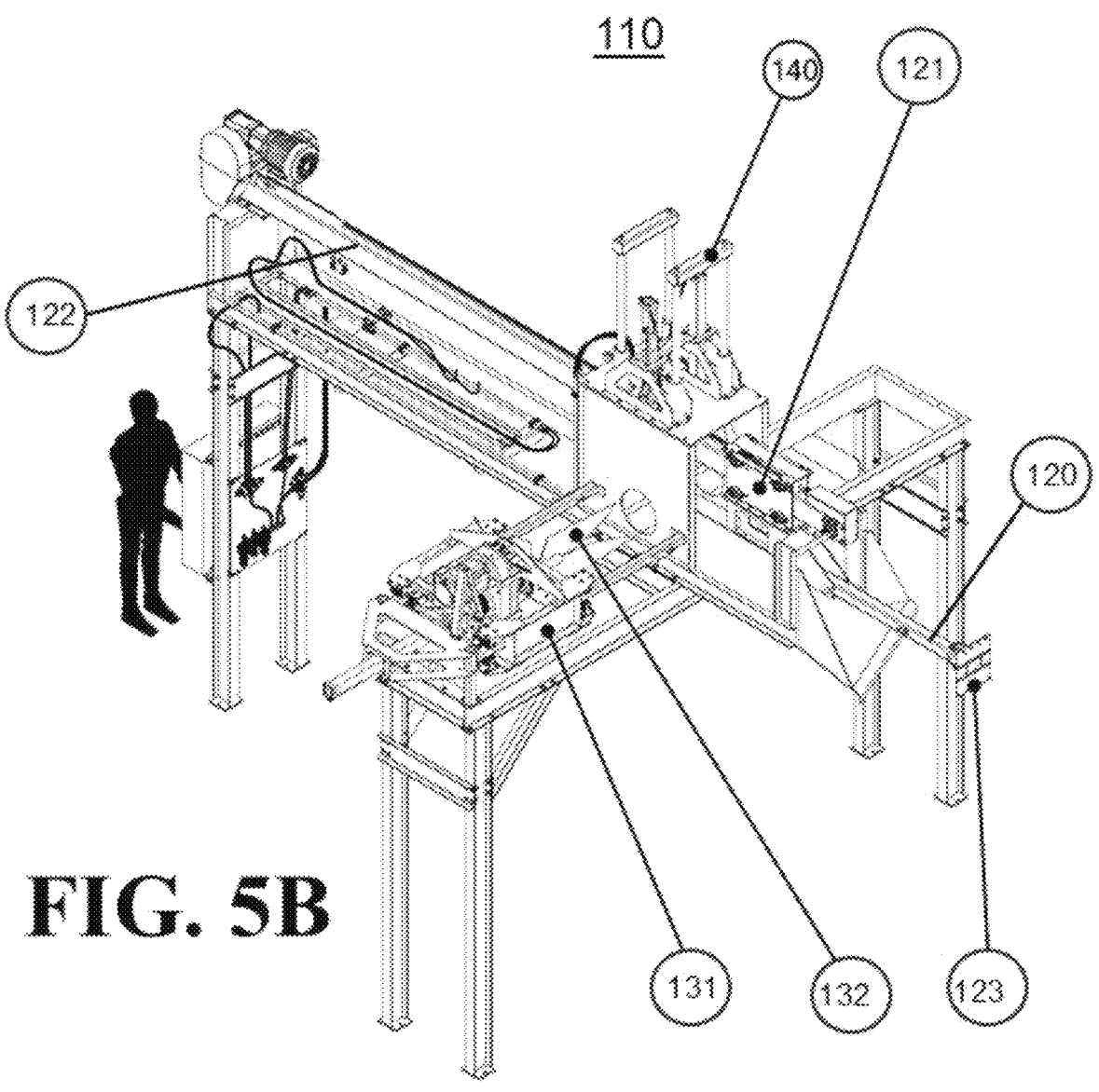
Figure 5C:
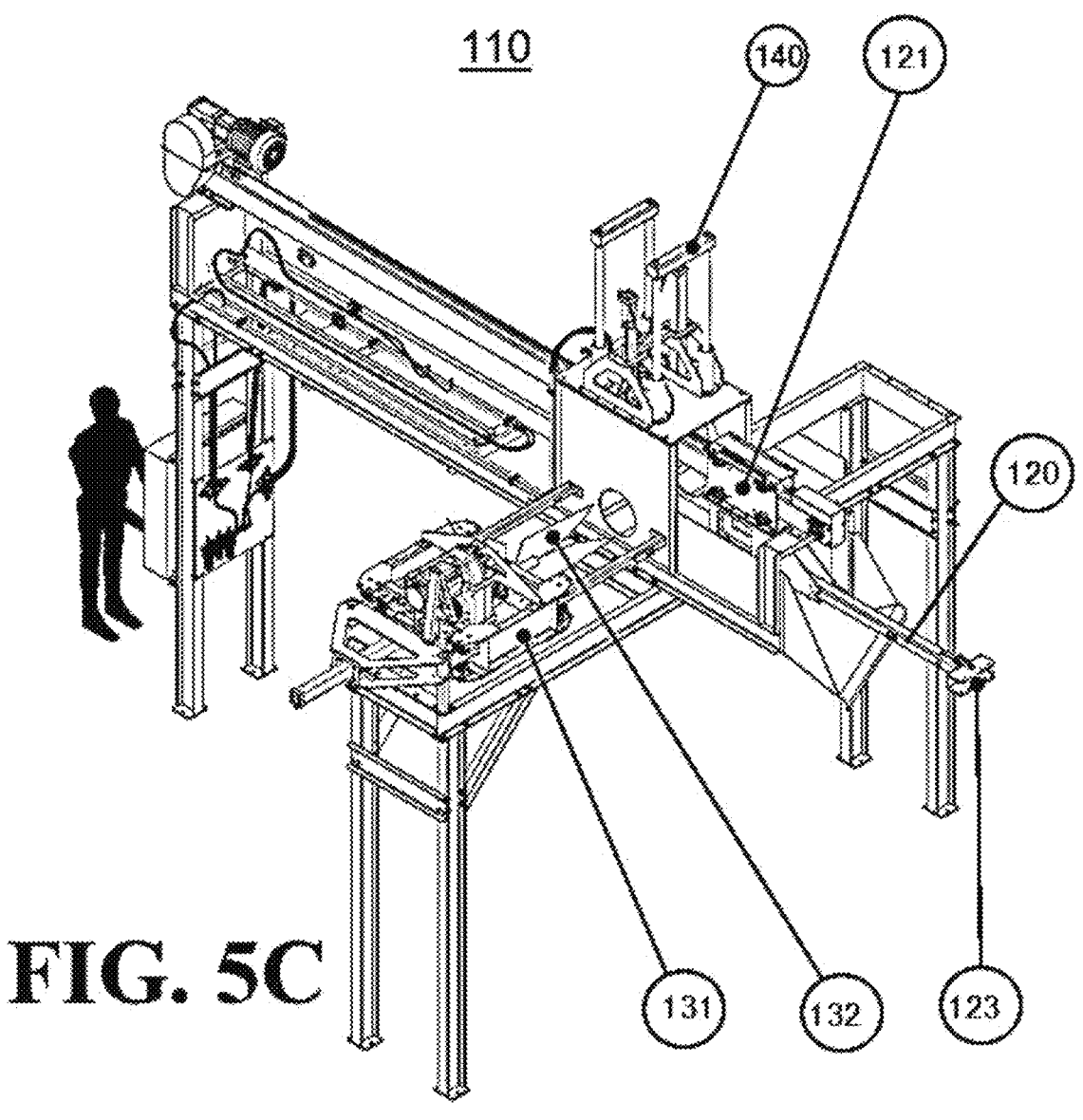
Figure 5D:
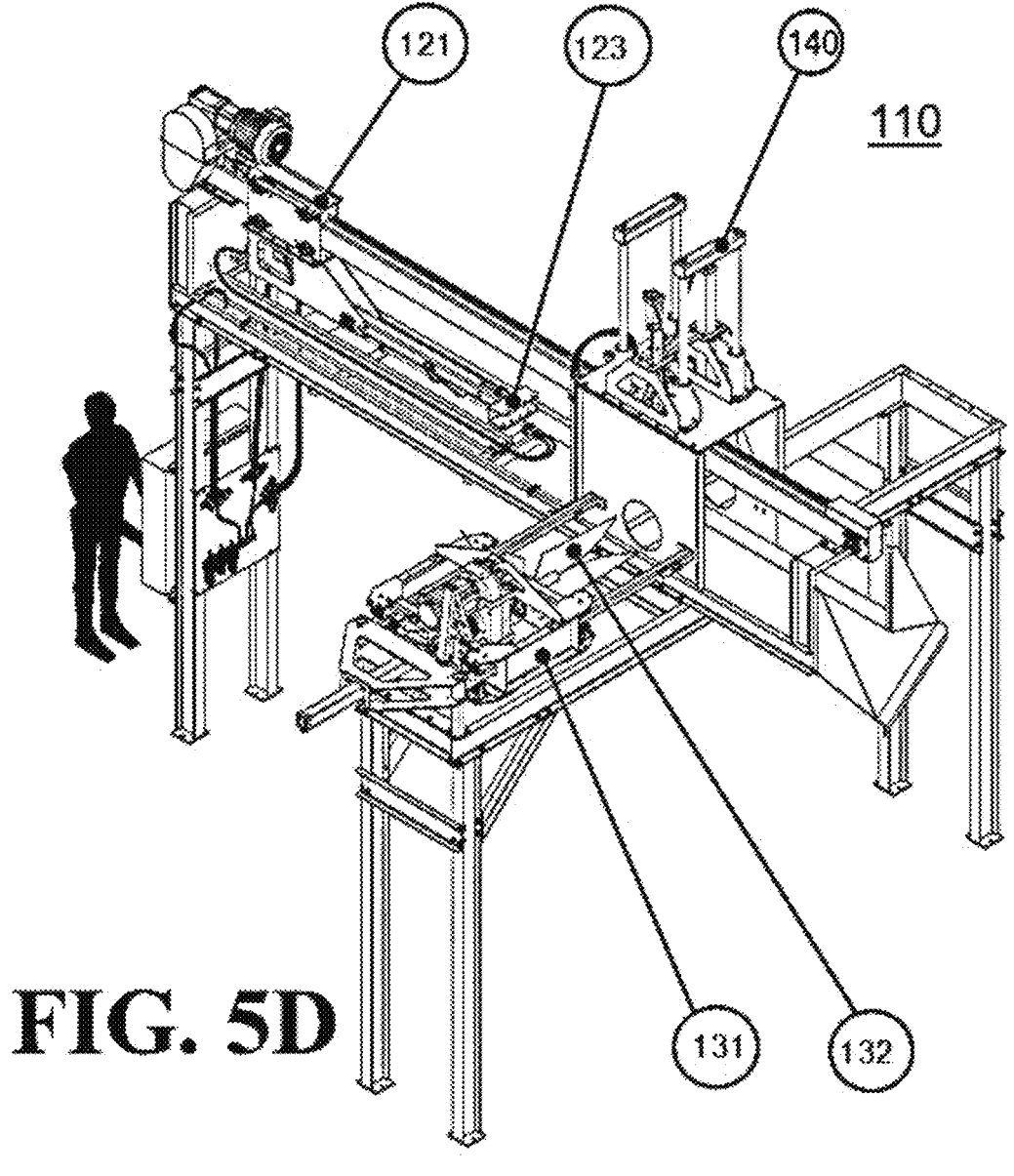

FIG. 5B illustrates a next step of the wrap removal sequence in which the wrap disposal arm (120) is positioned to retrieve a removed cotton-module wrap from the module unwrapping unit (100). In FIG. 5B, the trolley (121) has been propelled along the track (122), toward the module unwrapping unit (100), in order to extend the wrap disposal arm (120) into the module unwrapping unit (100) with the gripper (123) in an open position. In FIG. 5C, the gripper (123) is closed in order to engage and hold the cotton-module wrap within the module unwrapping unit (100). In FIG. 5D, the trolley (121) has been moved back along the track (122) in order to retract the wrap disposal arm (120) and removed wrap from the module unwrapping unit (100).

Figure 5E:
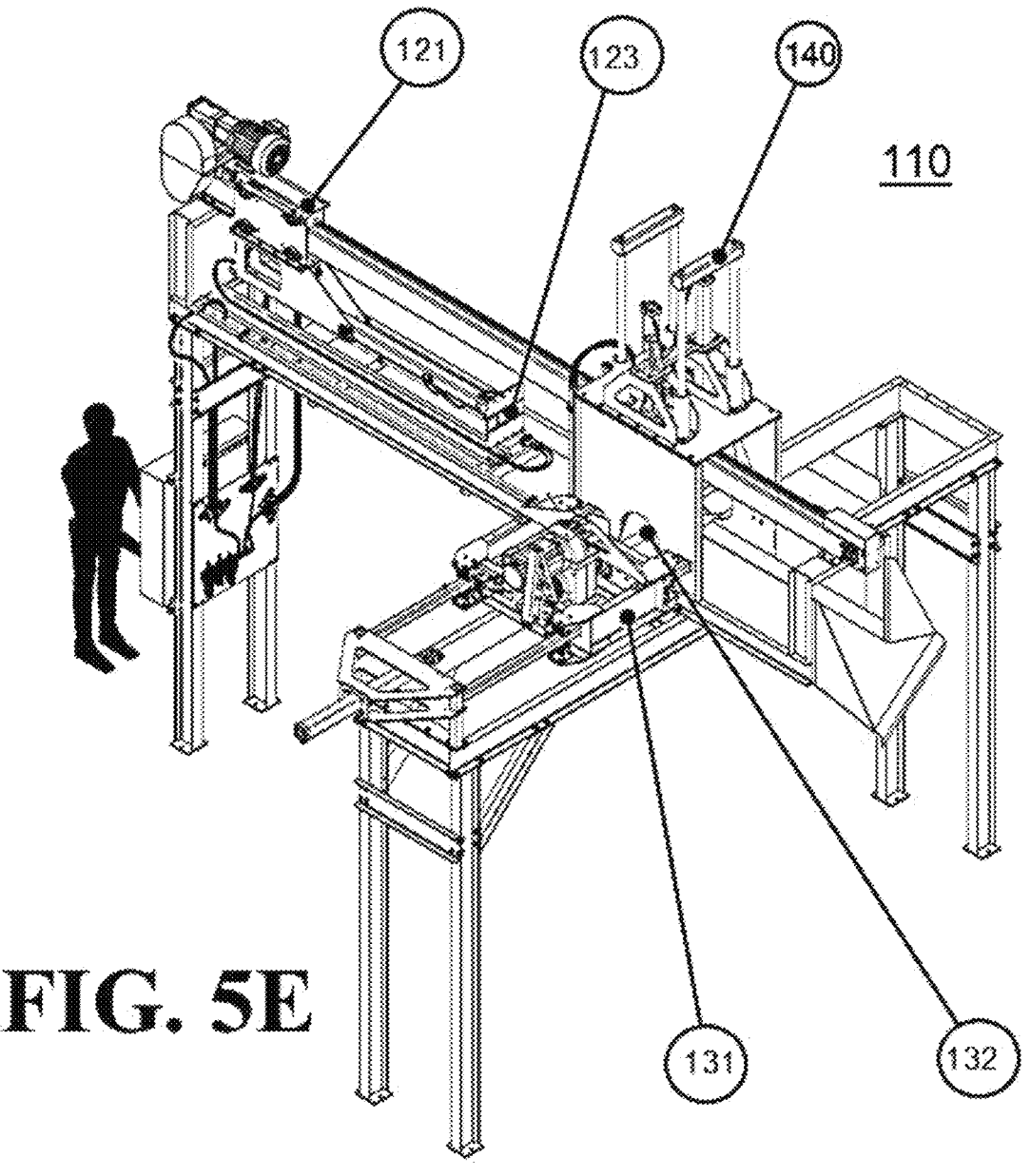
Figure 5F:
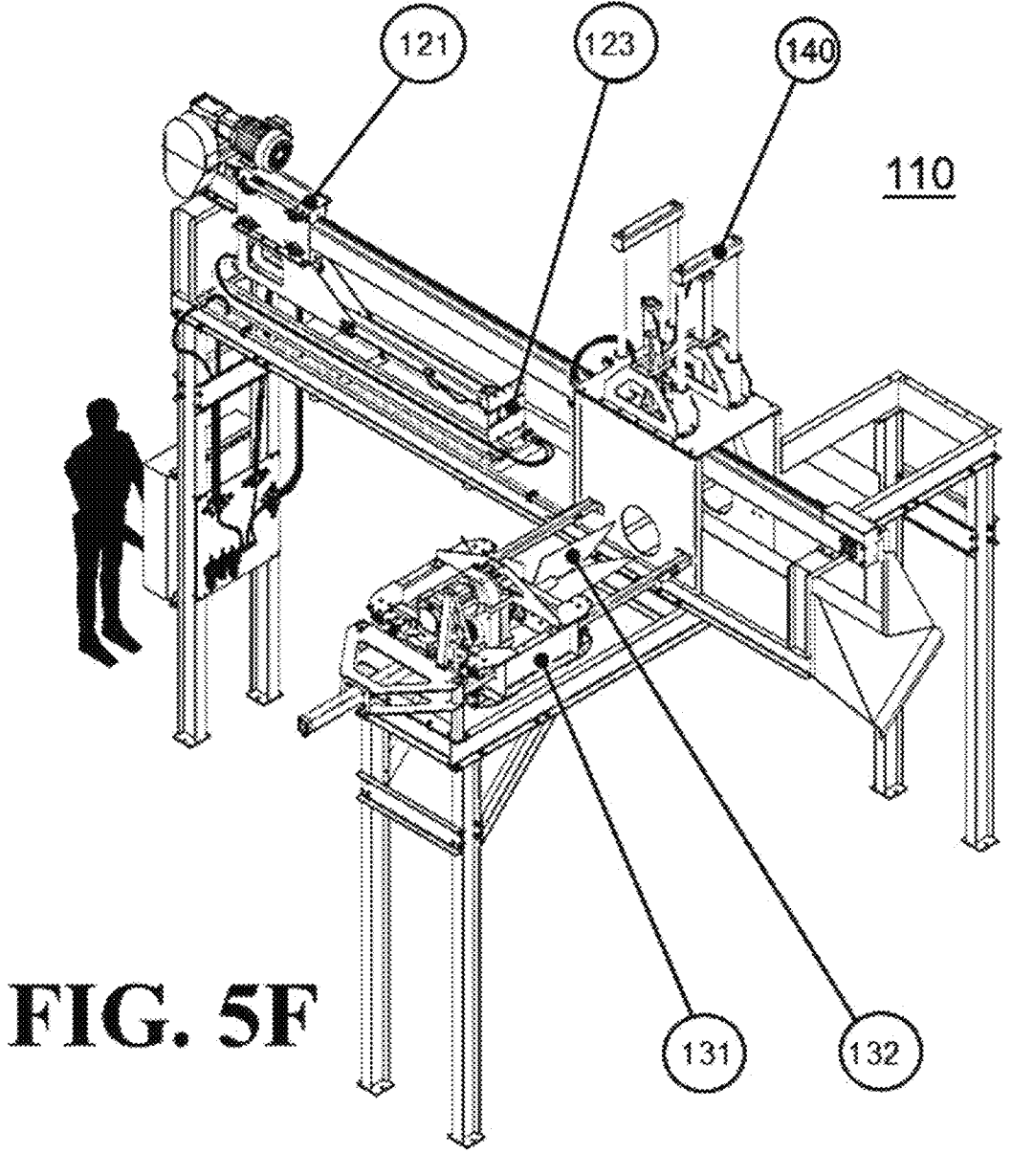
Figure 5G:
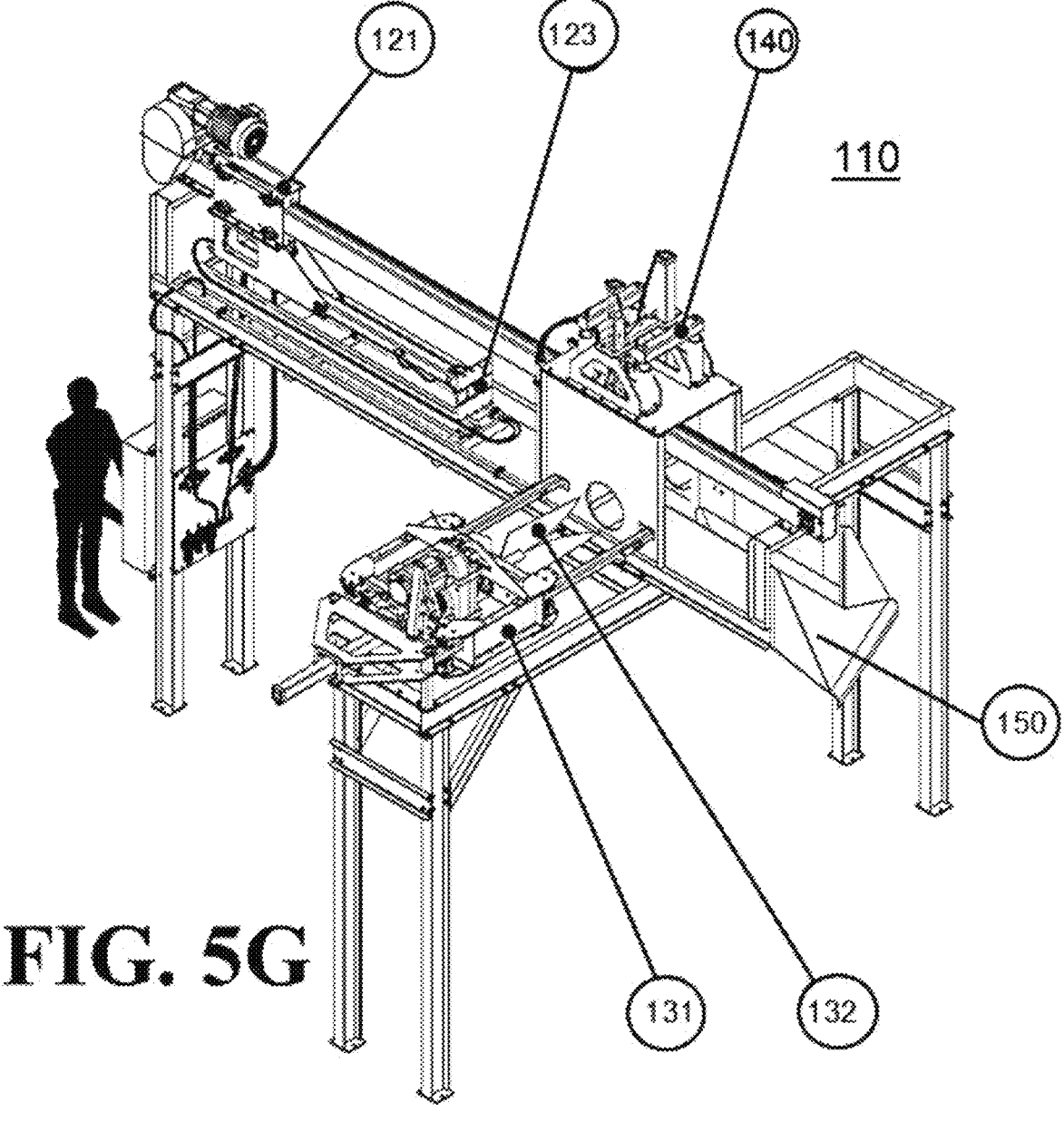

In FIG. 5E, the winder carriage (131) moves forward to extend the winder paddle (132) forward to engage with the removed wrap held by the wrap disposal arm (120). At this point the gripper (123) of the wrap disposal arm (120) is opened to release the wrap as the winder paddle (132) begins to rotate in order to bundle the wrap. In FIG. 5F, the winder carriage (131) retracts to remove winder paddle (132) back into its home position. As winder paddle (132) retracts, the bundled wrap is removed from the winder paddle (132) by the side of the machine. In FIG. 5G, tramper (140) is moved to a downward position to force the bundled wrap down a wrap removal chute (150) to be removed to make room for the next operation cycle. At this point, the wrap disposal unit (110) returns to its start position, as shown in FIG. 5A.

Figure 6A:
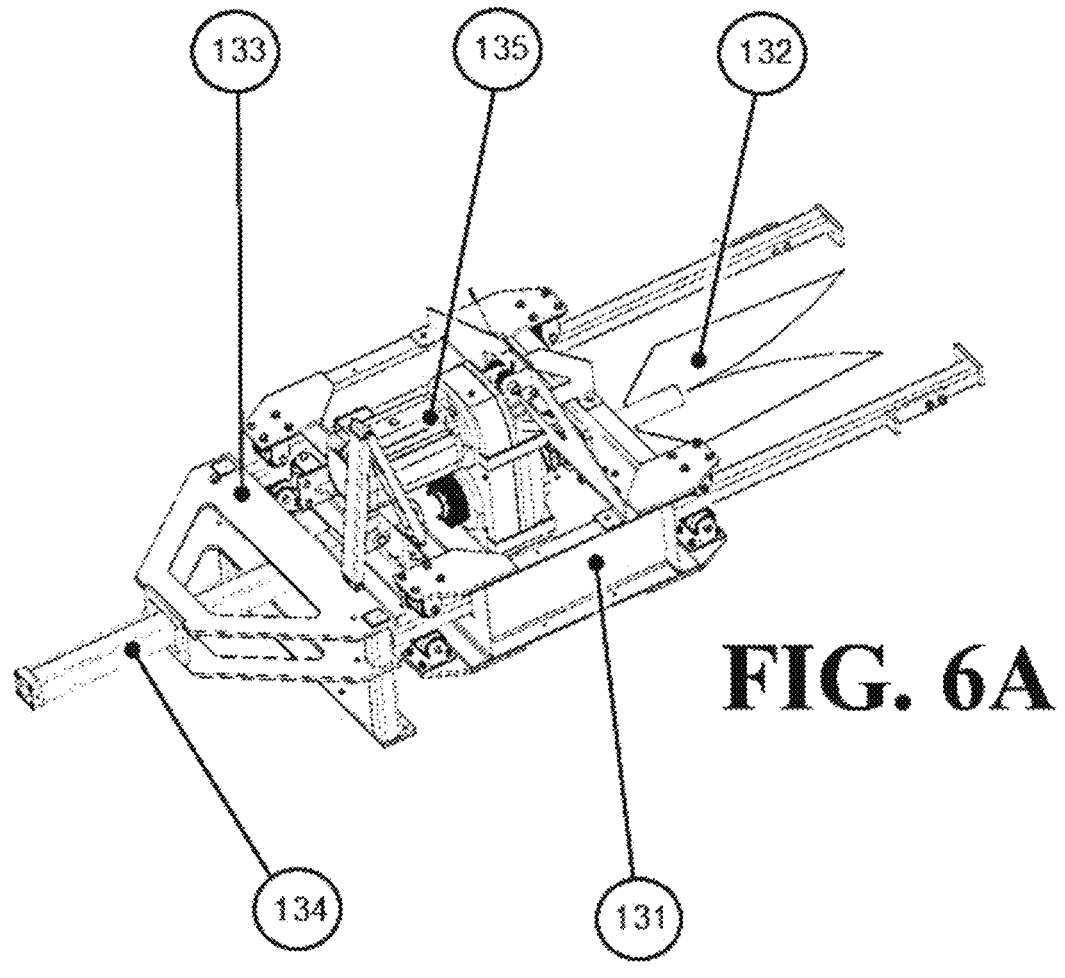
FIGS. 6A-6B are perspective views of an exemplary wrap-winder carriage and wrap-winder paddle in an extended position (FIG. 6A) and a retracted position (FIG. 6B), in accordance with the second exemplary embodiment of the present disclosure.
Figure 6B:
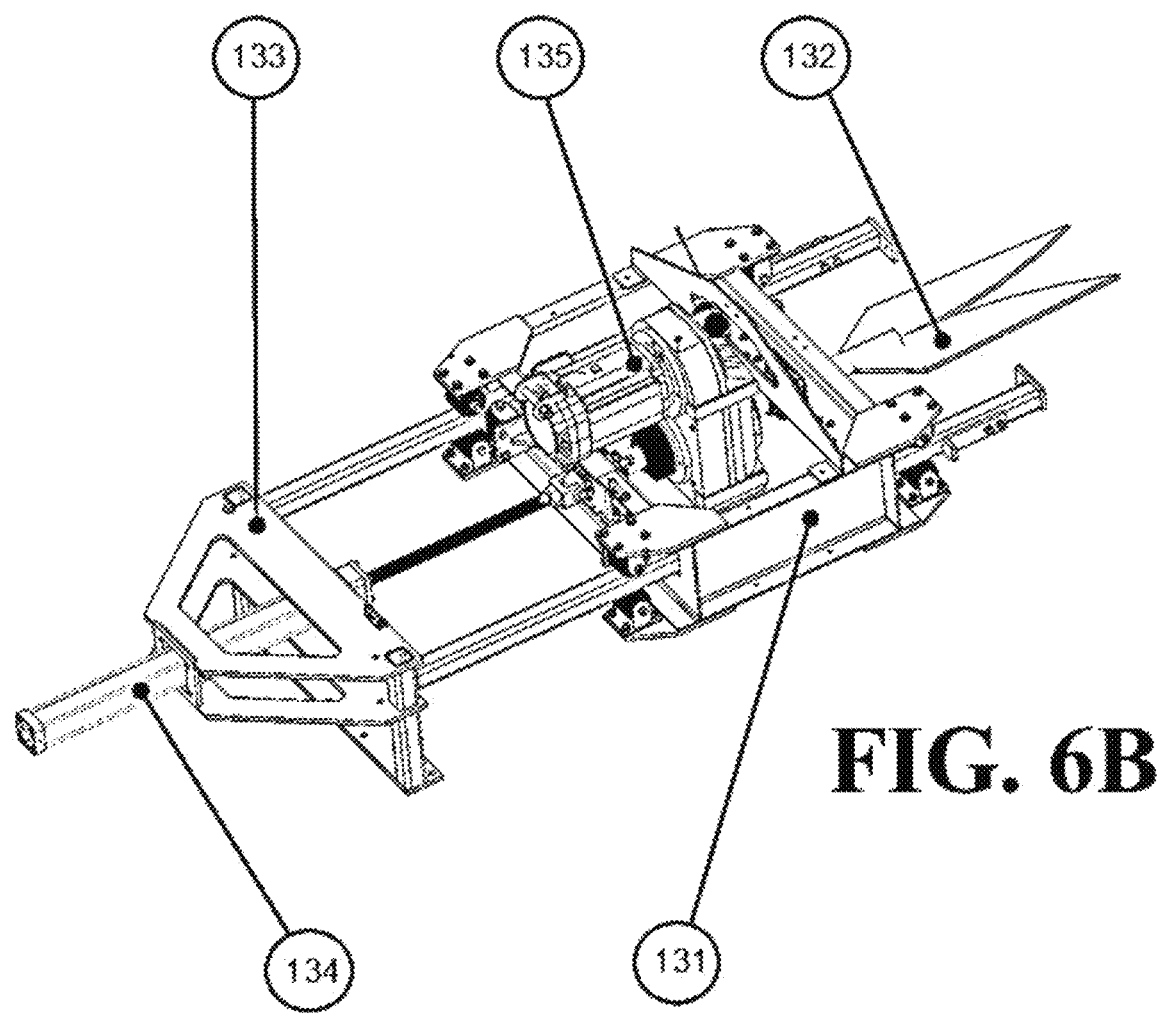

FIGS. 6A and 6B are close-up views of the exemplary winder carriage (131) in a home position (FIG. 5D), e.g., before the windle paddle (132) is moved to engage with a removed wrap, and in an extended position (FIG. 5E), e.g., where the winder paddle (132) has been moved to engage with and bundle a removed wrap. In this exemplary embodiment, the winder carriage (131) generally comprises a carriage frame (133) and an air cylinder (134) mounted to the frame for moving winder carriage (131) back and forth on frame (133). A gearbox (135) may be mounted to the carriage (131) and configured to rotate winder paddle (132).

The foregoing description has been directed to specific exemplary embodiments. It will be apparent, however, that other variations and modifications may be made to the described embodiments, with the attainment of some or all of their advantages. For example, those skilled in the art will recognize that one or more controllers (not shown in the figures) may be used to receive and process signals from the sensors that are described herein in the exemplary disclosed embodiments, and also generate and transmit signals for controlling and/or turning on and off one or more conveyors, signal lights, frames, and other components in the system consistent with their descriptions in the disclosed embodiments herein. Additionally, the various conveyors described may be separate conveyor systems or may be a single conveyor system or combinations thereof. For example, in some embodiments, one or more of the conveyors (30), (40), (50), and (51) may correspond to different portions of the same physical conveyor. Accordingly, this description is to be taken only by way of example and not to otherwise limit the scope of the embodiments herein. Therefore, it is the object of the appended claims to cover all such variations and modifications as come within the true spirit and scope of the embodiments herein.

We claim:

1. A system for unwrapping cotton modules, the system comprising:
   a first conveyor configured to transport a cotton module enveloped in a wrap;
   a module unwrapping unit positioned along the first conveyor, the module unwrapping unit comprising:
      one or more wrap gripping elements configured to removably grip the wrap of the cotton module to enable the cotton module to be lifted; and
      a module lift apparatus configured to raise the cotton module off the first conveyor and remove the wrap from the cotton module;
   a wrap disposal unit positioned proximate to the module unwrapping unit, the wrap disposal unit comprising a wrap disposal arm configured to retrieve the wrap from the one or more wrap gripping elements and remove the wrap from the module unwrapping unit.

2. The system of claim 1, further comprising:
   a module reorientation unit configured to reorient the cotton module enveloped in the wrap from a horizontal orientation to a vertical orientation, wherein the module reorientation unit is positioned upstream from the module unwrapping unit and comprises:
      a second conveyor positioned at a height above the first conveyor such that when the cotton module is conveyed from the second conveyor onto the first conveyor, the cotton module is tipped from a horizontal orientation to a vertical orientation due to gravity acting on the cotton module.

3. The system of claim 2, wherein the module reorientation unit further comprises a plurality of sensors positioned along the first conveyor and configured to detect a position of the cotton module along the first conveyor.

4. The system of claim 1, further comprising a plurality of centering walls positioned upstream from the module unwrapping unit and configured to center the cotton module before it enters the module unwrapping unit.

5. The system of claim 1, wherein the module unwrapping unit further comprises a plurality of main support columns, and wherein the module lift apparatus further comprises:
   a frame;
   one or more carriages coupled to the frame; and
   a drive motor connected to a drive shaft and operably connected to a plurality of ball screw jacks, wherein the combination of the drive motor, drive shaft, and the plurality of ball screw jacks is operable to move the one or more carriages and the frame in a vertical direction along the plurality of main support columns and thereby raise the cotton module off the first conveyor.

6. The system of claim 5, wherein the module unwrapping unit further comprises one or more wrap gripping elements coupled to the frame, and wherein the one or more wrap gripping elements comprise one or more clamp pad assemblies and one or more clamp sensors configured to sense when the clamp pad assemblies contact the wrap enveloping the cotton module.

7. The system of claim 6, wherein each of the one or more clamp pad assemblies further comprises a plurality of retractable spikes for removably gripping the wrap of the cotton module.

8. The system of claim 1, wherein the wrap disposal arm comprises a base column and an arm portion rotatable about the base column, and wherein the arm portion further comprises a grip for grabbing the wrap and removing it from module unwrapping unit.

9. The system of claim 1, wherein the wrap disposal unit further comprises a trolley coupled to the wrap disposal arm, wherein the trolley is operable to extend the wrap disposal arm to the module unwrapping unit in order to grab the wrap and retract the wrap disposal arm to move the wrap to the wrap disposal unit.

10. The system of claim 9, wherein the wrap disposal unit further comprises a wrap winding carriage configured to cause a winder paddle to extend to engage with the wrap and rotate the wrap into a bundle for disposal.

11. The system of claim 10, wherein the wrap disposal unit further comprises a tramper that is configured to force the wrap down a chute for disposal.

12. A method for unwrapping cotton modules, the method comprising:
   receiving a cotton module enveloped in a wrap from a first conveyor of a transport vehicle, the cotton module being positioned in a horizontal orientation;
   tipping the cotton module off the first conveyor to a second conveyor positioned a distance below the first conveyor in order to reorient the module from the horizontal orientation to a vertical orientation;
   conveying the cotton module along the second conveyor to a module unwrapping unit;
   gripping the wrap of the cotton module by the module unwrapping unit;
   removing the wrap from the cotton module by lifting the cotton module off of the second conveyor in a vertical direction; and
   removing the wrap from the module unwrapping unit; and disposing the wrap.

13. The method of claim 12, wherein removing the wrap from the module unwrapping unit further comprises:
   extending a wrap disposal arm to the module unwrapping unit using a trolley coupled to the wrap disposal arm;
   gripping the wrap using a wrap gripping element coupled to the wrap disposal arm; and
   retracting the wrap disposal arm using the trolley coupled to the wrap disposal arm.

14. The method of claim 13, wherein disposing the wrap further comprises:
   engaging the wrap with a winder paddle;
   rotating the winder paddle in order to bundle the wrap; and
   forcing the wrap down a wrap disposal chute using a tramper.

15. The method of claim 12, further comprising sensing a position of the cotton module along the second conveyor using one or more sensors.

16. The method of claim 12, wherein the module unwrapping unit further comprises: a plurality of main support columns and a module lift assembly comprising:
   a frame coupled to one or more wrap gripping elements; and
   one or more lift assembly carriages coupled to the unwrapper frame; and
   further wherein removing the wrap from the cotton module by lifting the cotton module off of the intermediate conveyor in a vertical direction comprises raising the plurality of lift assembly carriages and the frame in a vertical direction along the plurality of main support columns.

17. The method of claim 16, wherein gripping the wrap of the cotton module further comprises extending one or more retractable spikes of the wrap gripping elements to engage with the wrap of the cotton module.

18. An apparatus for unwrapping cotton modules comprising:

a module unwrapping unit comprising:

an first conveyor comprising a plurality of sensors;

a plurality of main support columns;

a plurality of carriages connected to the plurality of main support columns;

a frame connected to the plurality of carriages;

a plurality of wrap gripping elements; and a drive motor connected to a drive shaft and operably connected to a plurality of ball screw jacks, wherein the combination of the drive motor, drive shaft, and the plurality of ball screw jacks is operable to control the movement of the plurality of carriages and the frame along a vertical axis along the plurality of main support columns; and a wrap disposal unit comprising:

a retractable arm coupled to a trolley, the retractable arm comprising a wrap gripping element; and a wrap winding unit.

19. The apparatus of claim 18, wherein the wrap winding unit further comprises a wrap winder carriage and a wrap winder paddle.

20. The apparatus of claim 19, wherein the wrap disposal unit further comprises a tramper and a wrap disposal chute.

* * * * *